US012743539B2

(12) United States Patent
Ito et al.

(10) Patent No.: US 12,743,539 B2
(45) Date of Patent: Sep. 22, 2026

(54) SEARCH EXECUTION DEVICE, SEARCH EXECUTION METHOD, COMPUTER READABLE MEDIUM AND SEARCHABLE ENCRYPTION SYSTEM

(71) Applicant: Mitsubishi Electric Corporation, Tokyo (JP)

(72) Inventors: Takashi Ito, Tokyo (JP); Nori Matsuda, Tokyo (JP); Tadakazu Yamanaka, Tokyo (JP); Takato Hirano, Tokyo (JP); Yoshihiro Koseki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 342 days.

(21) Appl. No.: 18/531,278

(22) Filed: Dec. 6, 2023

(65) Prior Publication Data

US 2024/0126915 A1 Apr. 18, 2024

Related U.S. Application Data

(63) Continuation of application No. PCT/JP2021/027806, filed on Jul. 27, 2021.

(51) Int. Cl.
*G06F 21/62* (2013.01)
*G06F 21/60* (2013.01)
(Continued)

(52) U.S. Cl.
CPC ........ *G06F 21/6227* (2013.01); *G06F 21/602* (2013.01); *H04L 9/0861* (2013.01); *H04L 9/3093* (2013.01); *H04L 9/0866* (2013.01)

(58) Field of Classification Search
CPC ............... G06F 21/6227; G06F 21/602; G06F 16/24542; G06F 16/242; G06F 21/62;
(Continued)

(56) References Cited

U.S. PATENT DOCUMENTS 10,872,158 B2 * 12/2020 Hayasaka ............. H04L 9/0861
2008/0133935 A1 * 6/2008 Elovici ..................... H04L 9/14
713/193

(Continued)

FOREIGN PATENT DOCUMENTS

JP 2002-278970 A 9/2002
JP 2008-176040 A 7/2008

(Continued)

OTHER PUBLICATIONS

Boneh et al., "Public Key Encryption with Keyword Search", Eurocrypt 2004, Lecture Notes in Computer Science, vol. 3027, 2004. pp. 1-17.

(Continued)

*Primary Examiner* — Shaqueal D Wade-Wright

(74) *Attorney, Agent, or Firm* — BIRCH, STEWART, KOLASCH & BIRCH, LLP

(57) ABSTRACT

A search execution device receives a trapdoor generated based on a user secret key in which a search auxiliary key and an attribute of a user are set and a search keyword, together with a key identifier (ID) that identifies the search auxiliary key. The search execution device decrypts an encrypted tag in which an attribute of a user who is allowed retrieval and a search word are set, using the received trapdoor and the search auxiliary key indicated by the received key ID, so as to identify a tag that is retrievable for the attribute set in the user secret key and contains a search word corresponding to the search keyword.

10 Claims, 35 Drawing Sheets

(51) Int. Cl.
*H04L 9/08* (2006.01)
*H04L 9/30* (2006.01)

(58) Field of Classification Search
CPC ... G06F 21/604; H04L 9/0861; H04L 9/3093; H04L 9/088; H04L 9/0847; H04L 9/0866; H04L 9/0819; H04L 9/14
See application file for complete search history.

(56) References Cited

U.S. PATENT DOCUMENTS

| | | | | |
|---|---|---|---|---|
| 2010/0246827 | A1* | 9/2010 | Lauter | H04L 9/0836 380/278 |
| 2012/0297201 | A1 | 11/2012 | Matsuda et al. | |
| 2013/0287210 | A1* | 10/2013 | Matsuda | G06F 21/62 380/44 |
| 2014/0310521 | A1 | 10/2014 | Ichikawa et al. | |
| 2015/0207782 | A1* | 7/2015 | Hattori | G06F 21/6227 713/168 |
| 2016/0330022 | A1 | 11/2016 | Ito et al. | |
| 2018/0025172 | A1 | 1/2018 | Mori et al. | |
| 2020/0065305 | A1* | 2/2020 | Kawai | G06F 21/6227 |
| 2020/0412536 | A1 | 12/2020 | Hirano et al. | |
| 2024/0022397 | A1* | 1/2024 | Naito | G06F 21/6209 |

FOREIGN PATENT DOCUMENTS

| | | | |
|---|---|---|---|
| JP | 2008-288837 | A | 11/2008 |
| JP | 2012-79192 | A | 4/2012 |
| JP | 2018-97034 | A | 6/2018 |
| WO | WO 2011/086687 | A1 | 7/2011 |
| WO | WO 2013/094018 | A1 | 6/2013 |
| WO | WO 2015/107641 | A1 | 7/2015 |
| WO | WO 2016/103960 | A1 | 6/2016 |
| WO | WO 2016/132546 | A1 | 8/2016 |
| WO | WO 2019/215818 | A1 | 11/2019 |
| WO | WO 2019/224912 | A1 | 11/2019 |

OTHER PUBLICATIONS

International Search Report for PCT/JP2021/027806(PCT/ISA/210) mailed on Sep. 14, 2021.
Katz et al., “Predicate Encryption Supporting Disjunctions, Polynomial Equations, and Inner Products”, Eurocrypt 2008, Lecture Notes in Computer Science, vol. 4965, 2008, pp. 1-29.
Lewko et al., “Fully Secure Functional Encryption: Attribute-Based Encryption and (Hierarchical) Inner Product Encryption”, Eurocrypt 2010, Lecture Notes in Computer Science, vol. 6110, 2010, pp. 62-91.
Okamoto et al., “Hierarchical Predicate Encryption for Inner-Products”, Asiacrypt 2009, Lecture Notes in Computer Science, vol. 5912, 2009, pp. 1-18.
Okamoto et al., “Homomorphic encryption and signatures from vector decomposition”, Pairing 2008, Lecture Notes in Computer Science, vol. 5209, 2008, pp. 57-74.
Park et al., “Secure Index Search for Groups”, Trust Bus 2005, Lecture Notes in Computer Science, vol. 3592, 2005, pp. 128-140.
Wang et al., “Keyword Field-Free Conjunctive Keyword Searches on Encrypted Data and Extension for Dynamic Groups”, CANS 2008; Lecture Notes in Computer Science, vol. 5339, 2008, pp. 178-195.
Chinese Office Action and Search Report for Chinese Application No. 202180100742.X, dated Mar. 20, 2026, with English translation of the Office Action.

* cited by examiner

100: SEARCHABLE ENCRYPTION SYSTEM
(CRYPTOGRAPHIC PROCESSING SYSTEM)
DATA CENTER
401
NETWORK
101
102: COMPANY LAN
201
301a
301b
301m

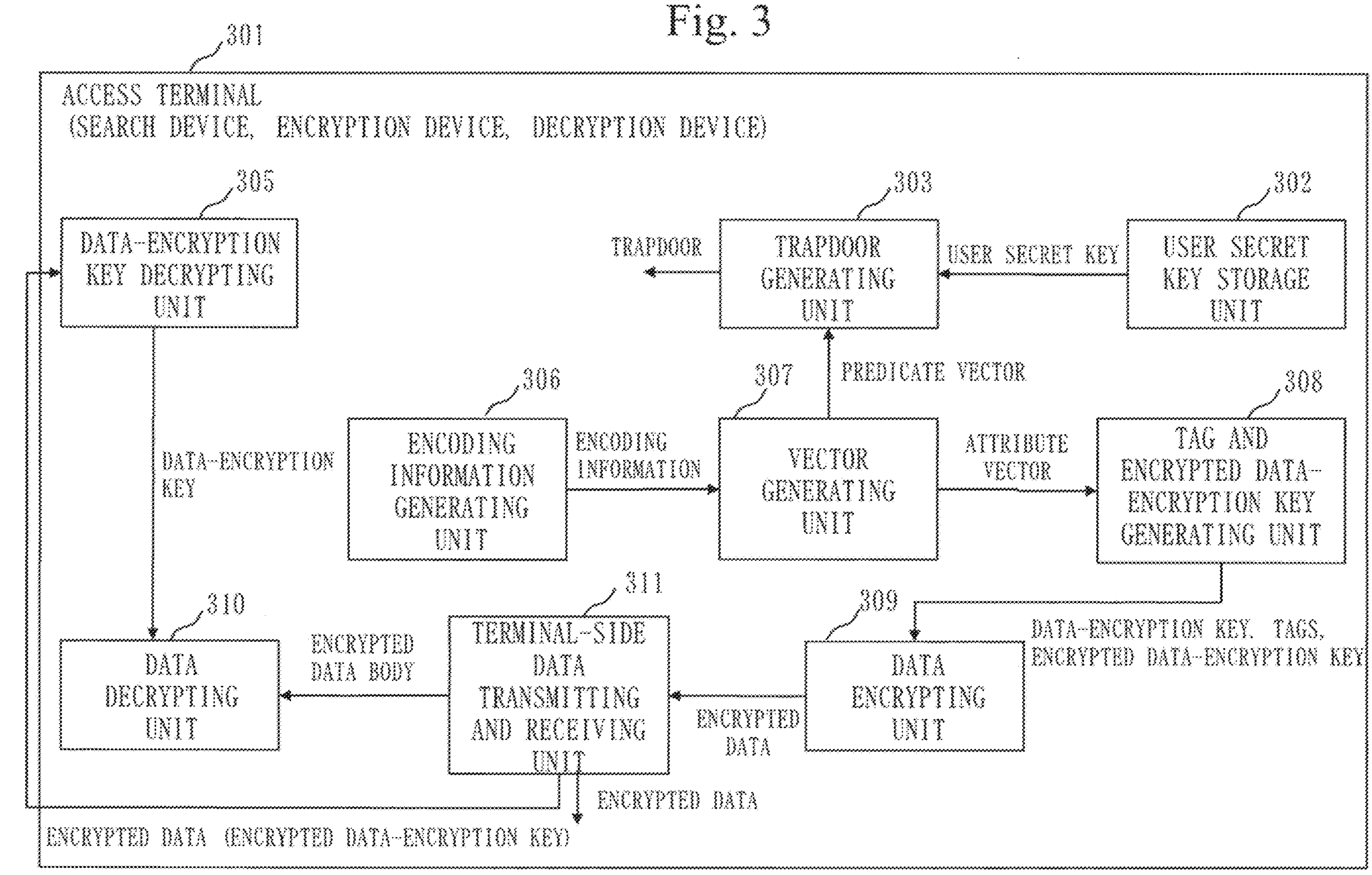
Fig. 3
301
ACCESS TERMINAL
(SEARCH DEVICE, ENCRYPTION DEVICE, DECRYPTION DEVICE)
305
DATA-ENCRYPTION KEY DECRYPTING UNIT
TRAPDOOR
303
TRAPDOOR GENERATING UNIT
USER SECRET KEY
302
USER SECRET KEY STORAGE UNIT
PREDICATE VECTOR
DATA-ENCRYPTION KEY
306
ENCODING INFORMATION GENERATING UNIT
ENCODING INFORMATION
307
VECTOR GENERATING UNIT
ATTRIBUTE VECTOR
308
TAG AND ENCRYPTED DATA-ENCRYPTION KEY GENERATING UNIT
310
DATA DECRYPTING UNIT
ENCRYPTED DATA BODY
311
TERMINAL-SIDE DATA TRANSMITTING AND RECEIVING UNIT
ENCRYPTED DATA
309
DATA ENCRYPTING UNIT
DATA-ENCRYPTION KEY, TAGS, ENCRYPTED DATA-ENCRYPTION KEY
ENCRYPTED DATA
ENCRYPTED DATA (ENCRYPTED DATA-ENCRYPTION KEY)

Fig. 4

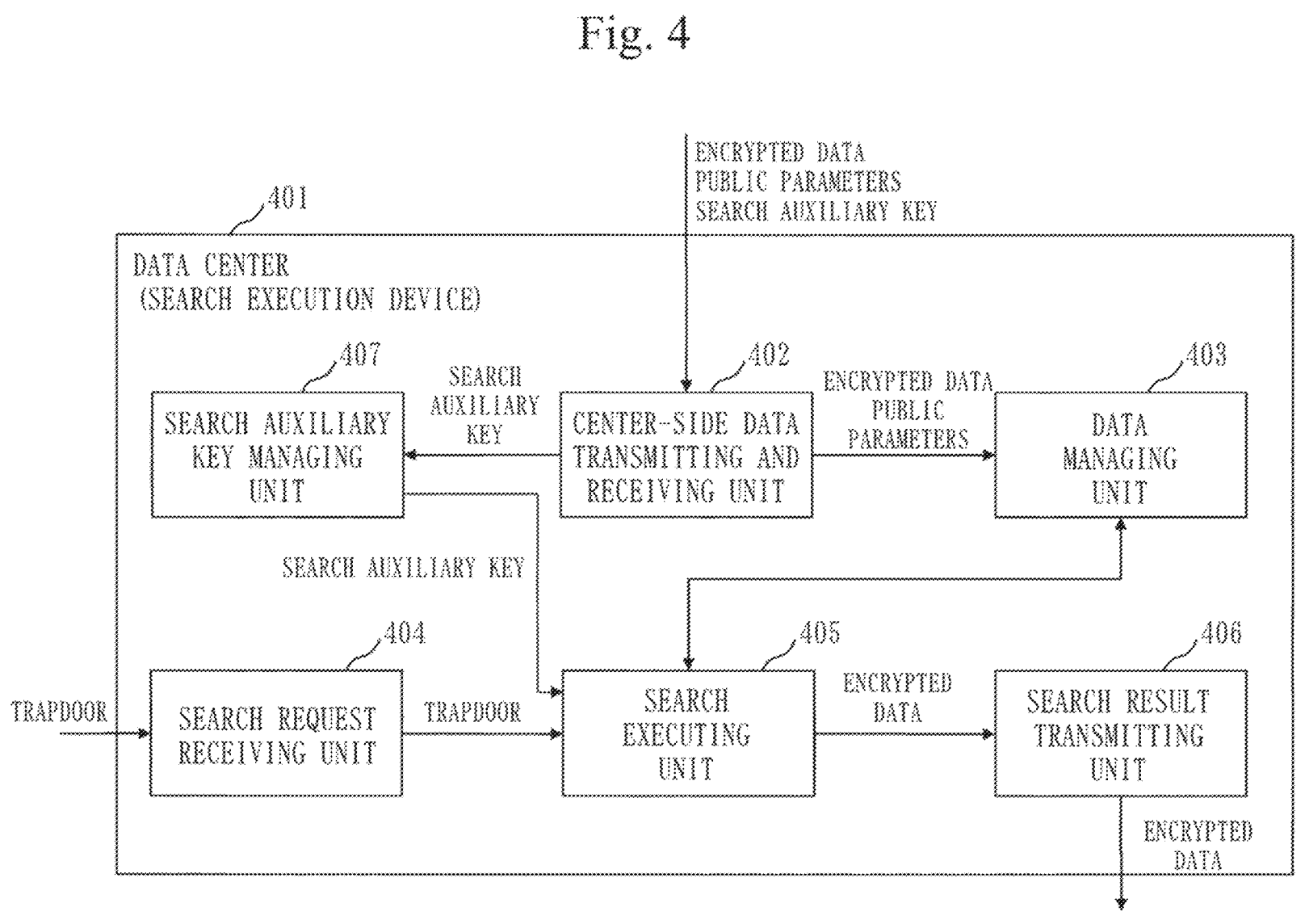

401 DATA CENTER (SEARCH EXECUTION DEVICE)

ENCRYPTED DATA
PUBLIC PARAMETERS
SEARCH AUXILIARY KEY

402 CENTER-SIDE DATA TRANSMITTING AND RECEIVING UNIT

ENCRYPTED DATA
PUBLIC PARAMETERS

403 DATA MANAGING UNIT

SEARCH AUXILIARY KEY

407 SEARCH AUXILIARY KEY MANAGING UNIT

SEARCH AUXILIARY KEY

405 SEARCH EXECUTING UNIT

ENCRYPTED DATA

406 SEARCH RESULT TRANSMITTING UNIT

ENCRYPTED DATA

TRAPDOOR

404 SEARCH REQUEST RECEIVING UNIT

TRAPDOOR

MASTER KEY
3201
PREDICATE VECTOR
3202
GENERATE
USER SECRET KEY
3203
SEARCH AUXILIARY KEY
3216
INNER PRODUCT 0
SEARCH KEYWORD
3209
GENERATE
3210
TRAPDOOR
ATTRIBUTE VECTOR
3204
3205
KEYWORD
GENERATE TAG
3207
TAG
TEST
TEST RESULT (VALUE 1)
3211
3206
DATA-ENCRYPTION KEY
ENCRYPT
3208
ENCRYPTED DATA-ENCRYPTION KEY
DECRYPT
DATA-ENCRYPTION KEY
3212

Fig. 8

INDIVIDUAL ID 1 PERSON A

INDIVIDUAL ID 3 PERSON B

INDIVIDUAL ID 2 PERSON A

INDIVIDUAL ID 4 *

BELONGING INFORMATION ENCODING ARRAY

COMPANY ID
601

OFFICE ID
602

DIVISION ID
603

SECTION ID
604

UNIT ID
605

Fig. 10

BELONGING INFORMATION ENCODING ARRAY 1

| COMPANY A | OFFICE B | DIVISION C | SECTION D | UNIT E |
|---|---|---|---|---|

BELONGING INFORMATION ENCODING ARRAY 2

| COMPANY A | OFFICE B | DIVISION C | SECTION D | * |
|---|---|---|---|---|

BELONGING INFORMATION ENCODING ARRAY 3

| COMPANY A | OFFICE B | DIVISION C | * | * |
|---|---|---|---|---|

BELONGING INFORMATION ENCODING ARRAY 4

| COMPANY A | OFFICE B | DIVISION C | SECTION E | * |
|---|---|---|---|---|

BELONGING INFORMATION ENCODING ARRAY 5

| COMPANY A | OFFICE B | DIVISION C | SECTION D | RANDOM NUMBER R |
|---|---|---|---|---|

Fig. 12

POSITION INFORMATION ENCODING ARRAY 1

| EXECUTIVE | OFFICE MANAGER | DIVISION MANAGER | SECTION MANAGER | UNIT MANAGER | STAFF MEMBER |
| --- | --- | --- | --- | --- | --- |
| * | * | * | 1 | * | * |

POSITION INFORMATION ENCODING ARRAY 2

| EXECUTIVE | OFFICE MANAGER | DIVISION MANAGER | SECTION MANAGER | UNIT MANAGER | STAFF MEMBER |
| --- | --- | --- | --- | --- | --- |
| * | * | * | * | 1 | * |

POSITION INFORMATION ENCODING ARRAY 3

| EXECUTIVE | OFFICE MANAGER | DIVISION MANAGER | SECTION MANAGER | UNIT MANAGER | STAFF MEMBER |
| --- | --- | --- | --- | --- | --- |
| R | R | 1 | 1 | R | R |

POSITION INFORMATION ENCODING ARRAY 4

| EXECUTIVE | OFFICE MANAGER | DIVISION MANAGER | SECTION MANAGER | UNIT MANAGER | STAFF MEMBER |
| --- | --- | --- | --- | --- | --- |
| R | R | 1 | 1 | 1 | 1 |

Fig. 13

POSITION INFORMATION ENCODING ARRAY 5

| EXECUTIVE | OFFICE MANAGER | DIVISION MANAGER | SECTION MANAGER | UNIT MANAGER | STAFF MEMBER |
|---|---|---|---|---|---|
| R | R | R | I | R | R |

POSITION INFORMATION ENCODING ARRAY 6

| EXECUTIVE | OFFICE MANAGER | DIVISION MANAGER | SECTION MANAGER | UNIT MANAGER | STAFF MEMBER |
|---|---|---|---|---|---|
| R | R | I | I | R | R |

POSITION INFORMATION ENCODING ARRAY 7

| EXECUTIVE | OFFICE MANAGER | DIVISION MANAGER | SECTION MANAGER | UNIT MANAGER | STAFF MEMBER |
|---|---|---|---|---|---|
| R | R | R | I | R | R |

POSITION INFORMATION ENCODING ARRAY 8

| EXECUTIVE | OFFICE MANAGER | DIVISION MANAGER | SECTION MANAGER | UNIT MANAGER | STAFF MEMBER |
|---|---|---|---|---|---|
| R | R | I | R | R | R |

Fig. 15

CATEGORY ENCODING ARRAY 1

| LARGE CLASSIFICATION | MIDDLE CLASSIFICATION | SMALL CLASSIFICATION |
|---|---|---|
| * | * | * |

CATEGORY ENCODING ARRAY 2

| LARGE CLASSIFICATION | MIDDLE CLASSIFICATION | SMALL CLASSIFICATION |
|---|---|---|
| DEVELOPMENT A | * | * |

CATEGORY ENCODING ARRAY 3

| LARGE CLASSIFICATION | MIDDLE CLASSIFICATION | SMALL CLASSIFICATION |
|---|---|---|
| DEVELOPMENT A | SPECIFICATIONS | EXTERNAL SPECIFICATIONS |

CATEGORY ENCODING ARRAY 4

| LARGE CLASSIFICATION | MIDDLE CLASSIFICATION | SMALL CLASSIFICATION |
|---|---|---|
| BUDGET PLAN | YEAR 2009 | PERSONNEL EXPENSE |

Fig. 17

CONFIDENTIALITY LEVEL ENCODING ARRAY 1

| STRICTLY-CONFIDENTIAL | CONFIDENTIAL | CONFIDENTIAL-INTERNAL-ONLY | NOT-APPLICABLE |
| --- | --- | --- | --- |
| R | 1 | 1 | 1 |

CONFIDENTIALITY LEVEL ENCODING ARRAY 2

| STRICTLY-CONFIDENTIAL | CONFIDENTIAL | CONFIDENTIAL-INTERNAL-ONLY | NOT-APPLICABLE |
| --- | --- | --- | --- |
| 1 | 1 | 1 | 1 |

CONFIDENTIALITY LEVEL ENCODING ARRAY 3

| STRICTLY-CONFIDENTIAL | CONFIDENTIAL | CONFIDENTIAL-INTERNAL-ONLY | NOT-APPLICABLE |
| --- | --- | --- | --- |
| * | 1 | * | * |

CONFIDENTIALITY LEVEL ENCODING ARRAY 4

| STRICTLY-CONFIDENTIAL | CONFIDENTIAL | CONFIDENTIAL-INTERNAL-ONLY | NOT-APPLICABLE |
| --- | --- | --- | --- |
| 1 | * | * | * |

Fig. 18

CONFIDENTIALITY LEVEL ENCODING ARRAY 5

| STRICTLY-CONFIDENTIAL | CONFIDENTIAL | CONFIDENTIAL-INTERNAL-ONLY | NOT-APPLICABLE |
| --- | --- | --- | --- |
| R | 1 | R | R |

CONFIDENTIALITY LEVEL ENCODING ARRAY 6

| STRICTLY-CONFIDENTIAL | CONFIDENTIAL | CONFIDENTIAL-INTERNAL-ONLY | NOT-APPLICABLE |
| --- | --- | --- | --- |
| 1 | R | R | R |

Fig. 19

SEARCH WORD ENCODING ARRAY 1

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| 1 | YEAR 2009 | MONTH 10 | DAY 5 | PC | 3 UNITS | ¥100, 000 | PURCHASE |

SEARCH WORD ENCODING ARRAY 2

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| 2 | YEAR 2009 | MONTH 11 | DAY 10 | PC | 2 UNITS | ¥80, 000 | PURCHASE |

SEARCH WORD ENCODING ARRAY 3

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| 3 | YEAR 2010 | MONTH 1 | DAY 15 | PC | 1 UNIT | — | DISPOSAL |

SEARCH WORD ENCODING ARRAY 4

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

SEARCH WORD ENCODING ARRAY 5

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | YEAR 2009 | * | * | PC | * | * | PURCHASE |

Fig. 20

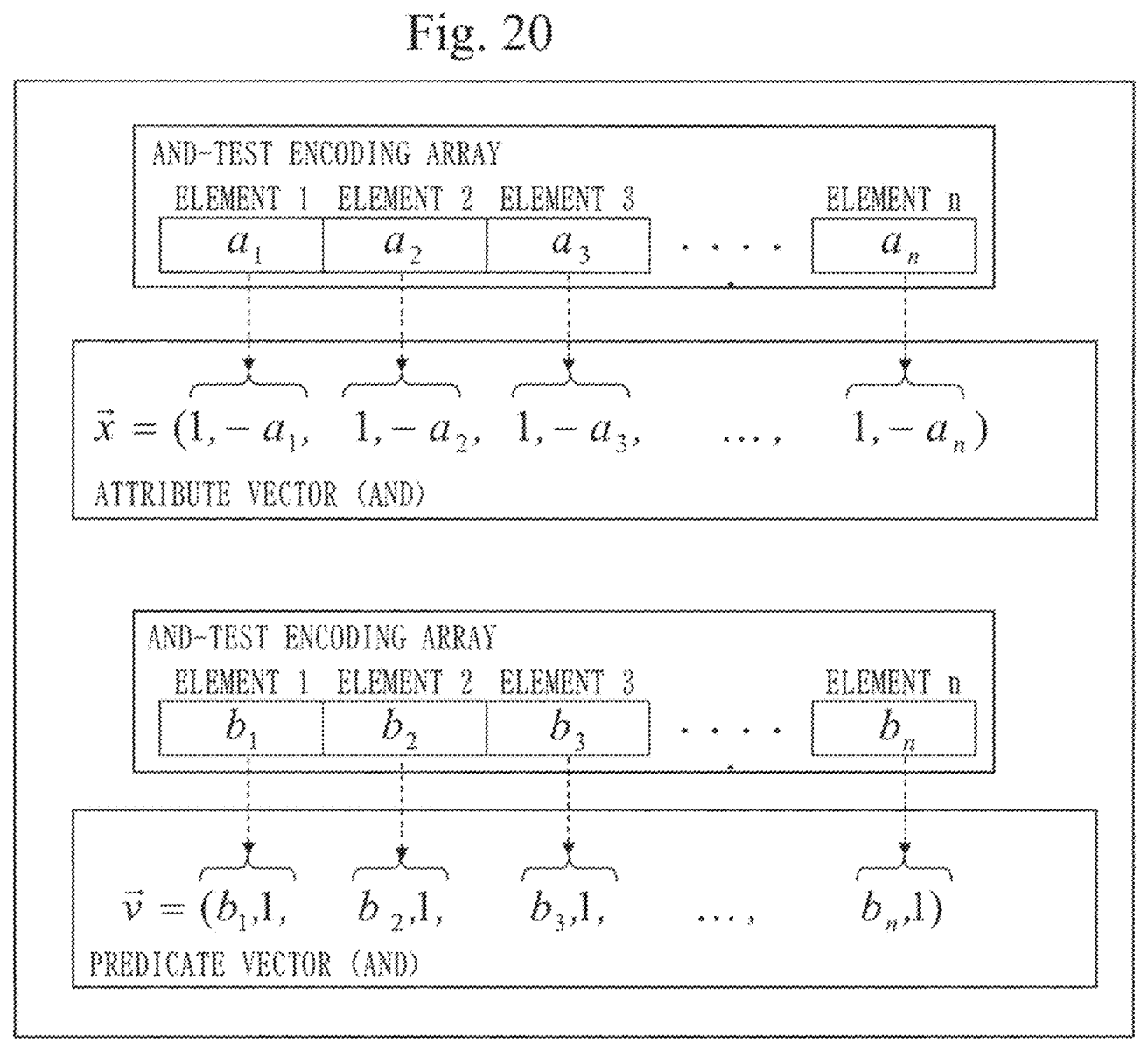

AND-TEST ENCODING ARRAY

ELEMENT 1 ELEMENT 2 ELEMENT 3 ELEMENT n $a_1$ $a_2$ $a_3$ . . . . $a_n$ $\vec{x} = (1, -a_1,\ 1, -a_2,\ 1, -a_3,\ \ldots,\ 1, -a_n)$

ATTRIBUTE VECTOR (AND)

AND-TEST ENCODING ARRAY

ELEMENT 1 ELEMENT 2 ELEMENT 3 ELEMENT n $b_1$ $b_2$ $b_3$ . . . . $b_n$ $\vec{v} = (b_1, 1,\ b_2, 1,\ b_3, 1,\ \ldots,\ b_n, 1)$

PREDICATE VECTOR (AND)

OR-TEST ENCODING ARRAY
ELEMENT 1
ELEMENT 2
ELEMENT 3
$a_1$
$a_2$
$a_3$
ATTRIBUTE VECTOR (OR)
$\vec{x} = (1, -a_3, -a_2, -a_1, a_2a_3, a_1a_3, a_1a_2, -a_1a_2a_3)$
OR-TEST ENCODING ARRAY
ELEMENT 1
ELEMENT 2
ELEMENT 3
$b_1$
$b_2$
$b_3$
PREDICATE VECTOR (OR)
$\vec{v} = (b_1b_2b_3, b_1b_2, b_1b_3, b_2b_3, b_1, b_2, b_3, 1)$

Fig. 22

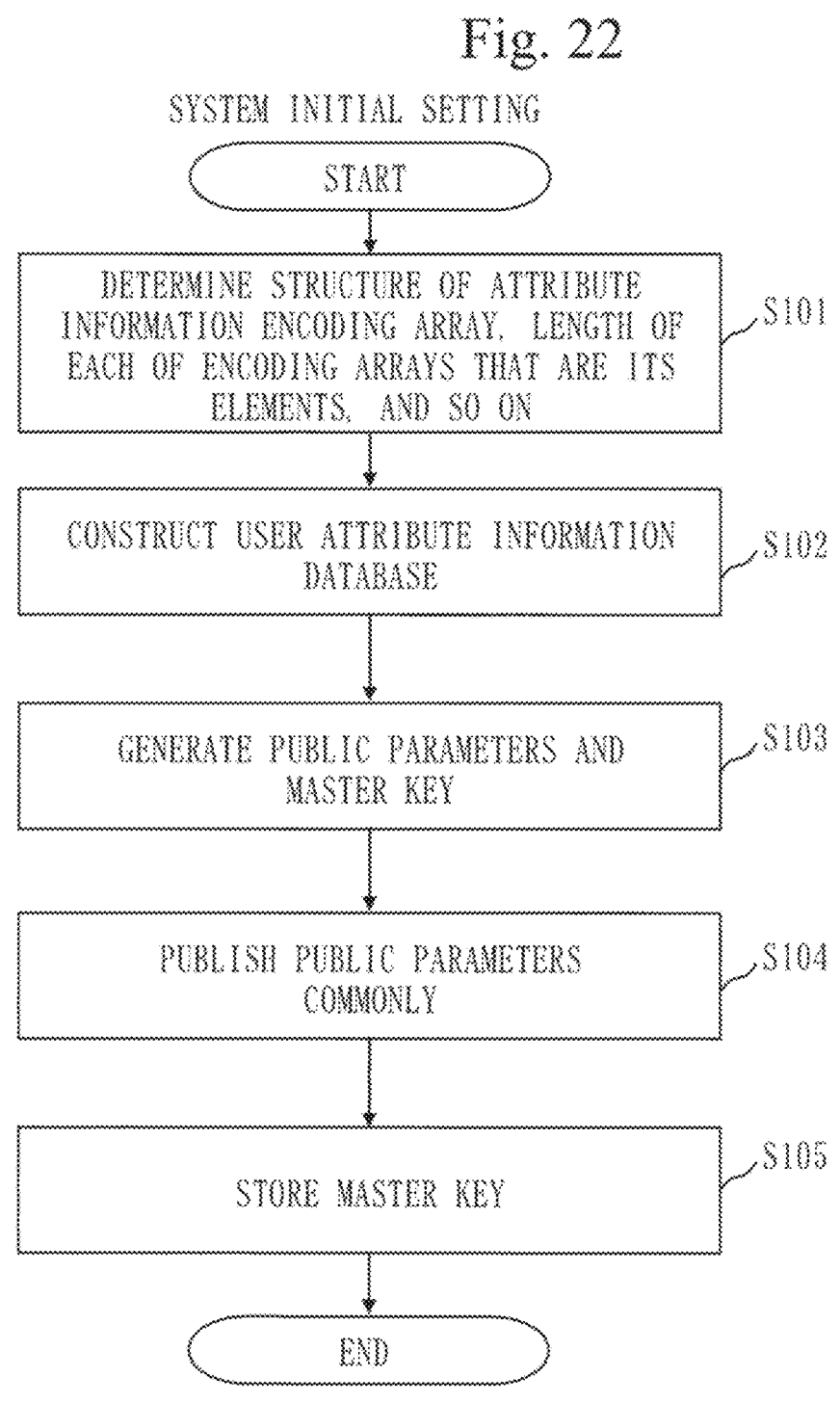

SYSTEM INITIAL SETTING

START

DETERMINE STRUCTURE OF ATTRIBUTE INFORMATION ENCODING ARRAY, LENGTH OF EACH OF ENCODING ARRAYS THAT ARE ITS ELEMENTS, AND SO ON — S101

CONSTRUCT USER ATTRIBUTE INFORMATION DATABASE — S102

GENERATE PUBLIC PARAMETERS AND MASTER KEY — S103

PUBLISH PUBLIC PARAMETERS COMMONLY — S104

STORE MASTER KEY — S105

END

Fig. 24
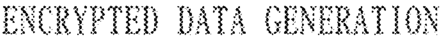
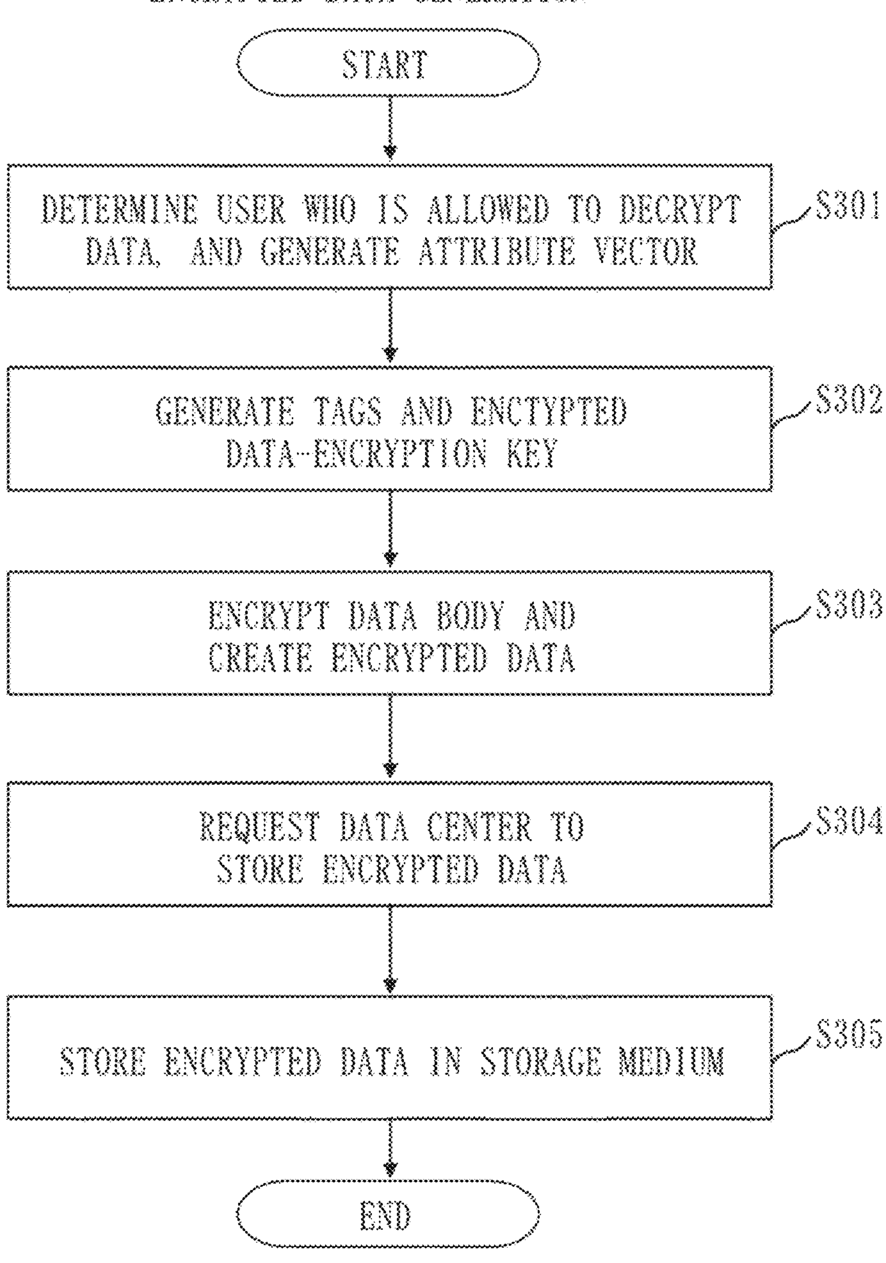

Fig. 27

SYSTEM COMMON ATTRIBUTE INFORMATION ENCODING ARRAY

| INDIVIDUAL ID |
| --- |
| * |

BELONGING INFORMATION ENCODING ARRAY

| COMPANY | OFFICE | DIVISION | SECTION | UNIT |
| --- | --- | --- | --- | --- |
| * | * | * | * | * |

POSITION INFORMATION ENCODING ARRAY

| EXECUTIVE | OFFICE MANAGER | DIVISION MANAGER | SECTION MANAGER | UNIT MANAGER | STAFF MEMBER |
| --- | --- | --- | --- | --- | --- |
| * | * | * | * | * | * |

CATEGORY ENCODING ARRAY

| LARGE CLASSIFICATION | MIDDLE CLASSIFICATION | SMALL CLASSIFICATION |
| --- | --- | --- |
| * | * | * |

CONFIDENTIALITY LEVEL ENCODING ARRAY

| STRICTLY-CONFIDENTIAL | CONFIDENTIAL | CONFIDENTIAL-INTERNAL-ONLY | NOT-APPLICABLE |
| --- | --- | --- | --- |
| * | * | * | * |

SEARCH WORD ENCODING ARRAY

| COLUMN 1 | COLUMN 2 | COLUMN 3 | COLUMN 4 | COLUMN 5 | COLUMN 6 | COLUMN 7 | COLUMN 8 |
| --- | --- | --- | --- | --- | --- | --- | --- |
| * | * | * | * | * | * | * | * |

Fig. 30

AID=7
BI=13~66

POSITION INFORMATION ENCODING ARRAY

| EXECUTIVE | OFFICE MANAGER | DIVISION MANAGER | SECTION MANAGER | UNIT MANAGER | STAFF MEMBER |
|---|---|---|---|---|---|
| * | * | * | * | * | * |

Fig. 31

USER ATTRIBUTE INFORMATION DATABASE

| INDIVIDUAL ID | BELONGING INFORMATION | POSITION INFORMATION | DATA CATEGORY | CONFIDENTIALITY LEVEL | TENURE |
|---|---|---|---|---|---|
| TANAKA | HEAD OFFICE/ ACCOUNTING DIVISION | DIVISION MANAGER | ALL | ALL | 2005/4~ |
| ⋮ | ⋮ | ⋮ | ⋮ | ⋮ | ⋮ |

Fig. 32

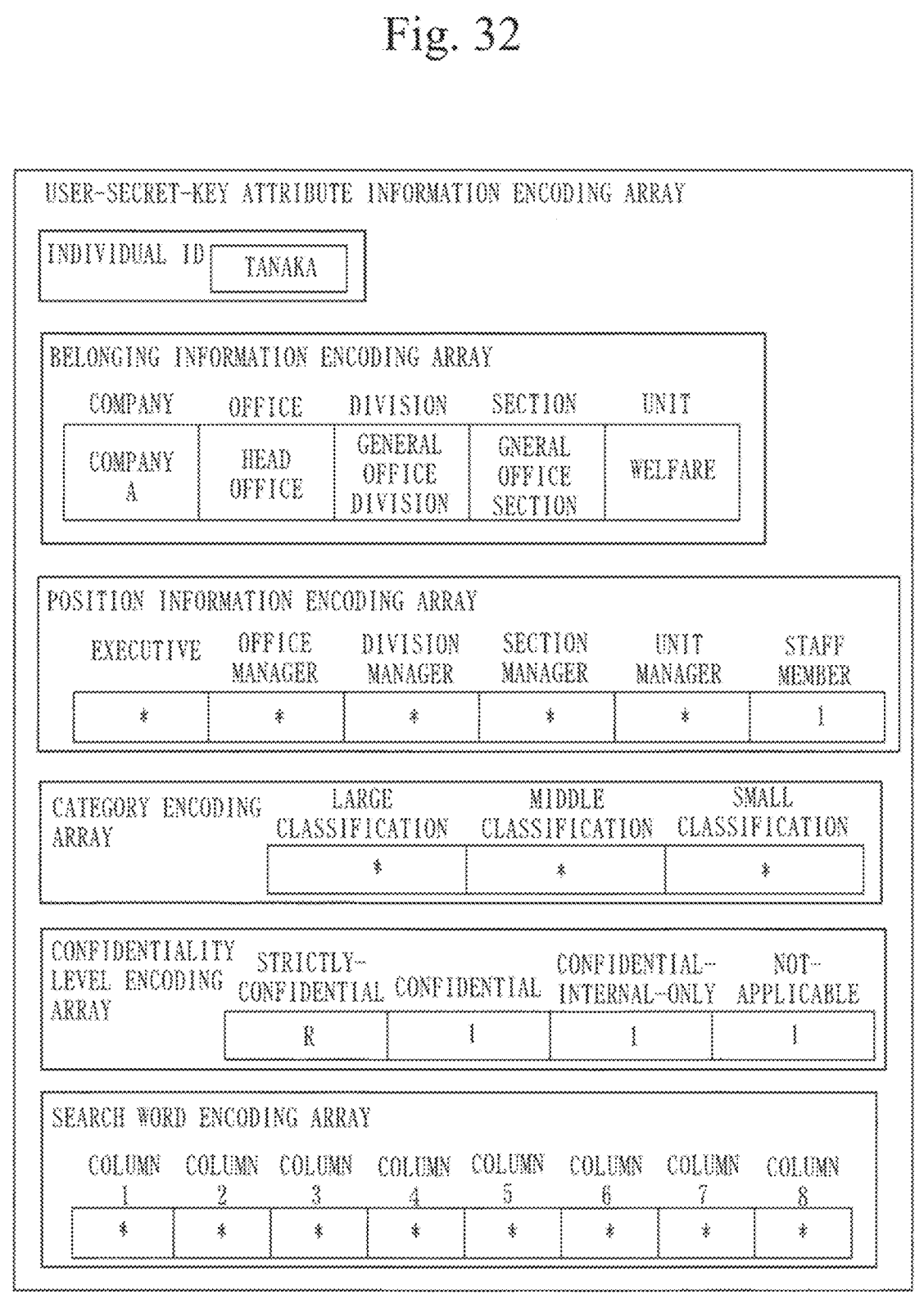

USER-SECRET-KEY ATTRIBUTE INFORMATION ENCODING ARRAY

| INDIVIDUAL ID | TANAKA |
|---|---|

BELONGING INFORMATION ENCODING ARRAY

| COMPANY | OFFICE | DIVISION | SECTION | UNIT |
|---|---|---|---|---|
| COMPANY A | HEAD OFFICE | GENERAL OFFICE DIVISION | GNERAL OFFICE SECTION | WELFARE |

POSITION INFORMATION ENCODING ARRAY

| EXECUTIVE | OFFICE MANAGER | DIVISION MANAGER | SECTION MANAGER | UNIT MANAGER | STAFF MEMBER |
|---|---|---|---|---|---|
| * | * | * | * | * | 1 |

CATEGORY ENCODING ARRAY

| LARGE CLASSIFICATION | MIDDLE CLASSIFICATION | SMALL CLASSIFICATION |
|---|---|---|
| * | * | * |

CONFIDENTIALITY LEVEL ENCODING ARRAY

| STRICTLY-CONFIDENTIAL | CONFIDENTIAL | CONFIDENTIAL-INTERNAL-ONLY | NOT-APPLICABLE |
|---|---|---|---|
| R | 1 | 1 | 1 |

SEARCH WORD ENCODING ARRAY

| COLUMN 1 | COLUMN 2 | COLUMN 3 | COLUMN 4 | COLUMN 5 | COLUMN 6 | COLUMN 7 | COLUMN 8 |
|---|---|---|---|---|---|---|---|
| * | * | * | * | * | * | * | * |

Fig. 33

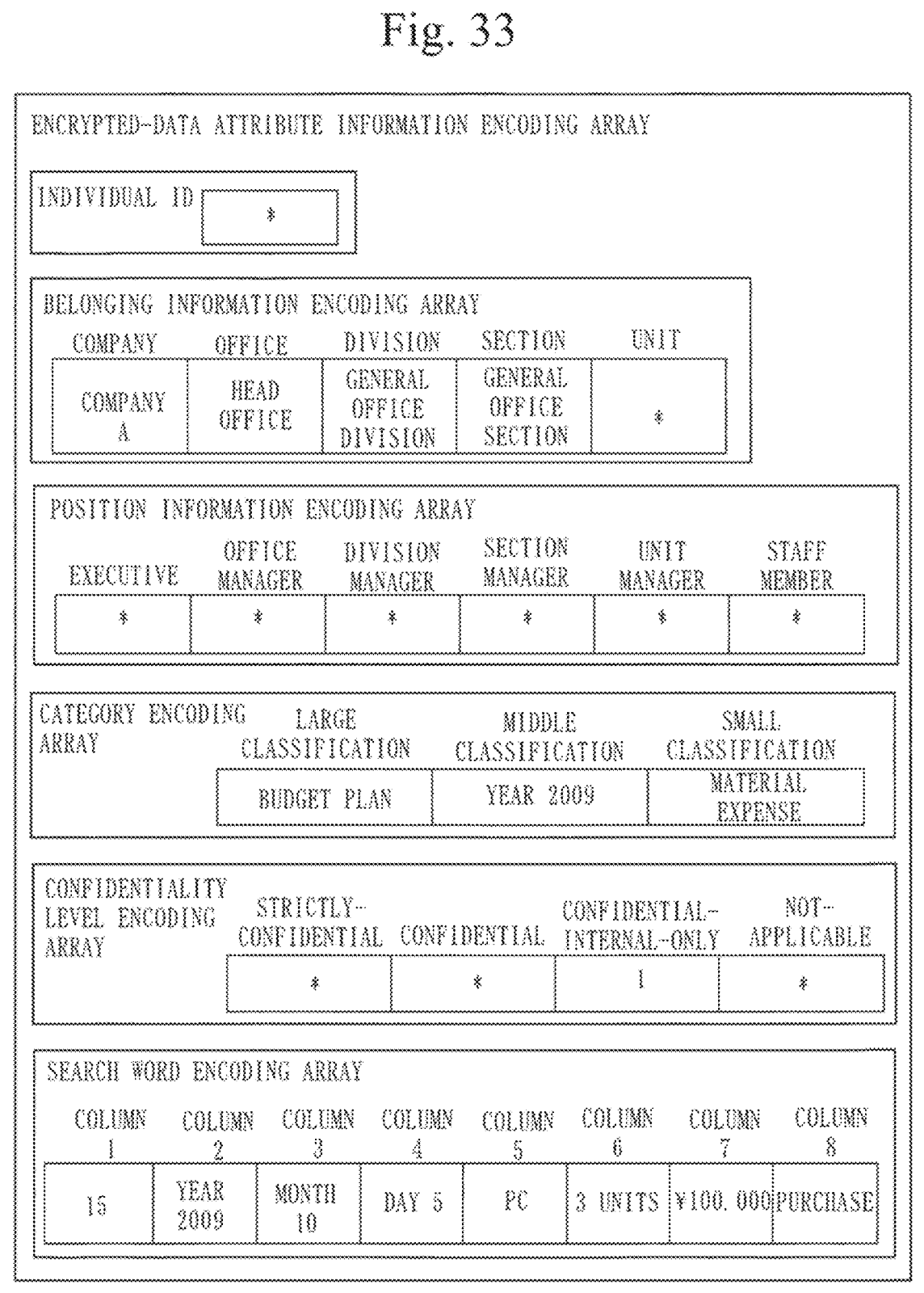

ENCRYPTED-DATA ATTRIBUTE INFORMATION ENCODING ARRAY

| INDIVIDUAL ID |
| --- |
| * |

BELONGING INFORMATION ENCODING ARRAY

| COMPANY | OFFICE | DIVISION | SECTION | UNIT |
| --- | --- | --- | --- | --- |
| COMPANY A | HEAD OFFICE | GENERAL OFFICE DIVISION | GENERAL OFFICE SECTION | * |

POSITION INFORMATION ENCODING ARRAY

| EXECUTIVE | OFFICE MANAGER | DIVISION MANAGER | SECTION MANAGER | UNIT MANAGER | STAFF MEMBER |
| --- | --- | --- | --- | --- | --- |
| * | * | * | * | * | * |

CATEGORY ENCODING ARRAY

| LARGE CLASSIFICATION | MIDDLE CLASSIFICATION | SMALL CLASSIFICATION |
| --- | --- | --- |
| BUDGET PLAN | YEAR 2009 | MATERIAL EXPENSE |

CONFIDENTIALITY LEVEL ENCODING ARRAY

| STRICTLY-CONFIDENTIAL | CONFIDENTIAL | CONFIDENTIAL-INTERNAL-ONLY | NOT-APPLICABLE |
| --- | --- | --- | --- |
| * | * | 1 | * |

SEARCH WORD ENCODING ARRAY

| COLUMN 1 | COLUMN 2 | COLUMN 3 | COLUMN 4 | COLUMN 5 | COLUMN 6 | COLUMN 7 | COLUMN 8 |
| --- | --- | --- | --- | --- | --- | --- | --- |
| 15 | YEAR 2009 | MONTH 10 | DAY 5 | PC | 3 UNITS | ¥100. 000 | PURCHASE |

Fig. 34

SEARCH WORD ENCODING ARRAY

| COLUMN 1 | COLUMN 2 | COLUMN 3 | COLUMN 4 | COLUMN 5 | COLUMN 6 | COLUMN 7 | COLUMN 8 |
| --- | --- | --- | --- | --- | --- | --- | --- |
| * | YEAR 2009 | * | * | * | * | * | PURCHASE |

201 301 401
(EXAMPLE OF PROCESSING DEVICE)
1911
CPU
1912: BUS
1920
MAGNETIC DISK DEVICE
(EXAMPLE OF STORAGE DEVICE)
1921
OS
1922
WINDOW SYSTEM
1923
PROGRAMS
1924
FILES
1913
ROM
(EXAMPLE OF STORAGE DEVICE)
1914
RAM
(EXAMPLE OF SOTRAGE DEVICE)
1901
LCD
(EXAMPLE OF DISPLAY DEVICE)
1902
K/B
(EXAMPLE OF INPUT DEVICE)
1915
COMM
COMMUNICATION BOARD

SEARCH EXECUTION DEVICE, SEARCH EXECUTION METHOD, COMPUTER READABLE MEDIUM AND SEARCHABLE ENCRYPTION SYSTEM

CROSS REFERENCE TO RELATED APPLICATION

This application is a Continuation of PCT International Application No. PCT/JP2021/027806, filed on Jul. 27, 2021, which is hereby expressly incorporated by reference into the present application.

TECHNICAL FIELD

The present disclosure relates to predicate encryption for inner products and searchable encryption that uses predicate encryption for inner products to search for information while the information is in an encrypted state.

BACKGROUND ART

In recent years, in order to protect the confidentiality of data, it is becoming common to encrypt the data with a common key of a user who is the administrator of the data when the data is stored on a recording medium such as a hard disk. In this case, the user can decrypt the encrypted data with the user's own common key and use the data.

For example, Windows (registered trademark) from Microsoft (registered trademark) has realized an encrypting file system called EFS. In this encrypting file system, files (data) stored on a hard disk are encrypted using a common key managed in association with a login name in Windows (registered trademark).

However, the contents of encrypted data cannot be known unless it is decrypted. Therefore, a weakness is that in order to perform a search to find out whether a predetermined keyword is contained in data, all pieces of data have to be decrypted once.

For example, it is becoming common within a company to centrally manage confidential information on a file server. It is assumed here that data stored on that server is encrypted. In this case, it is necessary to download all pieces of encrypted data stored on the server into a terminal and further decrypt them, and then perform a keyword search. Therefore, there are problems such as that it may take an extremely long time and that it may cause a delay in communication for other users, depending on the communication path.

As a method for solving these problems, there is a technology called searchable encryption that enables keyword searches for encrypted data in an encrypted state without decrypting the encrypted data.

Patent Literature 1 and Non-Patent Literature 3 describe searchable encryption schemes that enable keyword searches without decrypting encrypted data by adding information called tags to the encrypted data.

In searchable encryption described in Non-Patent Literature 3, when any user encrypts data for a user A, the user encrypts a keyword to generate a tag using a public key of the user A, attaches the tag to encrypted data, and stores it on a server. In this scheme, only the user A who has a secret key corresponding to the public key used to encrypt the keyword can retrieve the encrypted data.

While searchable encryption described in Non-Patent Literature 3 is realized based on public key encryption, searchable encryption described in Patent Literature 1 is realized based on common key encryption such as a Caesar cipher. Therefore, only users who know the common key can encrypt data (generate tags) and retrieve it.

In these types of searchable encryption, if data is shared in a group, it is not possible to flexibly control data that can be retrieved depending on the role or privilege of a user. In contrast to this, searchable encryption described in Patent Literature 4 includes a searchable encryption scheme that can flexibly control data that can be retrieved depending on the role or privilege of a user if data is shared in a group. Specifically, in searchable encryption described in Patent Literature 4, predicate encryption is used to set an attribute vector depending on the role or privilege a user who is allowed retrieval, and also to set a predicate vector depending on the role or privilege of a user who uses a key vector, so as to realize flexible control of a search privilege.

CITATION LIST

Patent Literature

Patent Literature 1: JP 2002-278970 A
Patent Literature 2: JP 2008-176040 A
Patent Literature 3: JP 2008-288837 A
Patent Literature 4: JP WO2011-086687 A
Patent Literature 5: JP 2018-097034 A
Patent Literature 6: JP WO2019-215818 A

Non-Patent Literature

Non-Patent Literature 1: T. Okamoto, K. Takashima, "Homomorphic encryption and signatures from vector decomposition", Pairing 2008, Lecture Notes in Computer Science, Vol. 5209, 2008.

Non-Patent Literature 2: T. Okamoto, K. Takashima, "Hierarchical Predicate Encryption for Inner-Products", ASIACRYPT 2009, Lecture Notes in Computer Science, Vol. 5912, 2009.

Non-Patent Literature 3: D. Boneh, G. D. Crescenzo, R. Ostrovsky, G. Persiano, "Public Key Encryption with Keyword Search". EUROCRYPT 2004, Lecture Notes in Computer Science, Vol. 3027, 2004.

Non-Patent Literature 4: J. Katz, A. Sahai, B. Waters, "Predicate Encryption Supporting Disjunctions, Polynomial Equations, and Inner Products", EUROCRYPT 2008, Lecture Notes in Computer Science, Vol. 4965, 2008.

Non-Patent Literature 5: H. A. Park, J. W. Byun, D. H. Lee. "Secure Index Search for Groups", TrustBus 2005, Lecture Notes in Computer Science, Vol. 3592, 2005.

Non-Patent Literature 6: P. Wang. H. Wang, J. Pieprzyk, "Keyword Field-Free Conjunctive Keyword Searches on Encrypted Data and Extension for Dynamic Groups", CANS 2008, Lecture Notes in Computer Science, Vol. 5339, 2008.

Non-Patent Literature 7: A. Lewko, T. Okamoto, A. Sahai, K. Takashima, B. Waters, "Fully Secure Functional Encryption: Attribute-Based Encryption and (Hierarchical) Inner Product Encryption", EUROCRYPT 2010, Lecture Notes in Computer Science, Vol. 6110, 2010.

SUMMARY OF INVENTION

Technical Problem

For example, within a company, when a user has been transferred or resigned from the company, it is necessary to change an access privilege of the user so that the user cannot access data that can be accessed before the transfer or resignation (i.e., revoke an access privilege). In searchable encryption, this corresponds to disabling retrieval of data that can be retrieved before the transfer or resignation (i.e., revoking a search privilege).

In existing searchable encryption, most searchable encryption schemes do not give consideration to revocation, so that in order to revoke a search privilege it is necessary to perform one of the following: (1) re-encrypt tags for searchable encryption, (2) perform access control on the server (do not accept a search request from the revoked user), and (3) delete or collect the secret key owned by the revoked user. However, there are problems such as described below. In (1), if the amount of data is large, the load of re-encryption is large. (2) does not work if data is leaked from the server. (3) does not work if confidential information is leaked from the user.

As a scheme that takes revocation into consideration, searchable encryption described in Patent Literature 5 realizes revocation management through an approach different from the above (1) to (3) by introducing a key version to a user secret key and checking the key version when a search is performed.

In searchable encryption described in Patent Literature 6, a conversion key is generated based on a registration key and a search key and is stored on the server, and when a search is to be performed, the server performs re-encryption using the conversion key and then performs a confidential search. In this scheme, revocation can be realized by deleting the conversion key from the server.

However, neither searchable encryption of Patent Literature 5 nor searchable encryption of Patent Literature 6 can realize flexible access control using predicate encryption as in searchable encryption of Patent Literature 4.

An object of the present disclosure is to make it possible to realize searchable encryption that, if data is shared in a group, can flexibly control data that can be retrieved depending on the role or privilege of a user, and can also efficiently and securely revoke a search privilege.

Solution to Problem

A search execution device according to the present disclosure includes a search request receiving unit to receive a trapdoor generated based on a user secret key in which a search auxiliary key and an attribute of a user are set and a search keyword, together with a key identifier (ID) that identifies the search auxiliary key; and a search executing unit to decrypt an encrypted tag in which an attribute of a user who is allowed retrieval and a search word are set, using the trapdoor received by the search request receiving unit and the search auxiliary key indicated by the key ID received by the search request receiving unit, so as to identify a tag that is retrievable for the attribute set in the user secret key and contains a search word corresponding to the search keyword.

Advantageous Effects of Invention

In the present disclosure, a search requires a search auxiliary key in addition to a trapdoor. Therefore, by deleting the search auxiliary key, a search privilege can be revoked. This makes it possible to realize searchable encryption that, if data is shared in a group, can flexibly control data that can be retrieved depending on the role or privilege of a user, and can also efficiently and securely revoke a search privilege.

BRIEF DESCRIPTION OF DRAWINGS

FIG. 3 is a functional block diagram illustrating functions of an access terminal 301;

FIG. 4 is a functional block diagram illustrating functions of a data center 401;

FIG. 8 is a figure illustrating an example of setting of an individual ID 502;

FIG. 9 is a figure illustrating an example of a configuration of a belonging information encoding array 503;

FIG. 10 is a figure illustrating an example of setting of the belonging information encoding array 503;

FIG. 12 is a figure illustrating an example of setting of the position information encoding array 504 in a first example of setting;

FIG. 13 is a figure illustrating an example of setting of the position information encoding array 504 in a second example of setting;

FIG. 15 is a figure illustrating an example of setting of the category encoding array 505;

FIG. 17 is a figure illustrating an example of setting of the confidentiality level encoding array 506 in a first example of setting;

FIG. 18 is a figure illustrating an example of setting of the confidentiality level encoding array 506 in a second example of setting;

FIG. 19 is a figure illustrating a setting example 1 of a search word encoding array 511;

FIG. 20 is a figure describing a vectorization method in a case where encoding arrays in the attribute information encoding array 501 are compared by an AND test;

FIG. 22 is a flowchart illustrating a flow of a process of (1) system initial setting;

FIG. 24 is a flowchart illustrating a flow of a process of (3) encrypted data generation;

FIG. 27 is a figure illustrating an example of a structure of the attribute information encoding array 501 used in the searchable encryption system 100;

FIG. 30 is a figure illustrating an example of assignment of AIDs, which are attribute IDs for the AND test, and assignment of index number BIs;

FIG. 31 is a figure illustrating an example of a configuration of a user attribute information database;

FIG. 32 is a figure illustrating an example of a user-secret-key attribute information encoding array;

FIG. 33 is a figure illustrating an example of an encrypted-data attribute information encoding array;

FIG. 34 is a figure illustrating an example of a search word encoding array.

DESCRIPTION OF EMBODIMENTS

Figure 1:
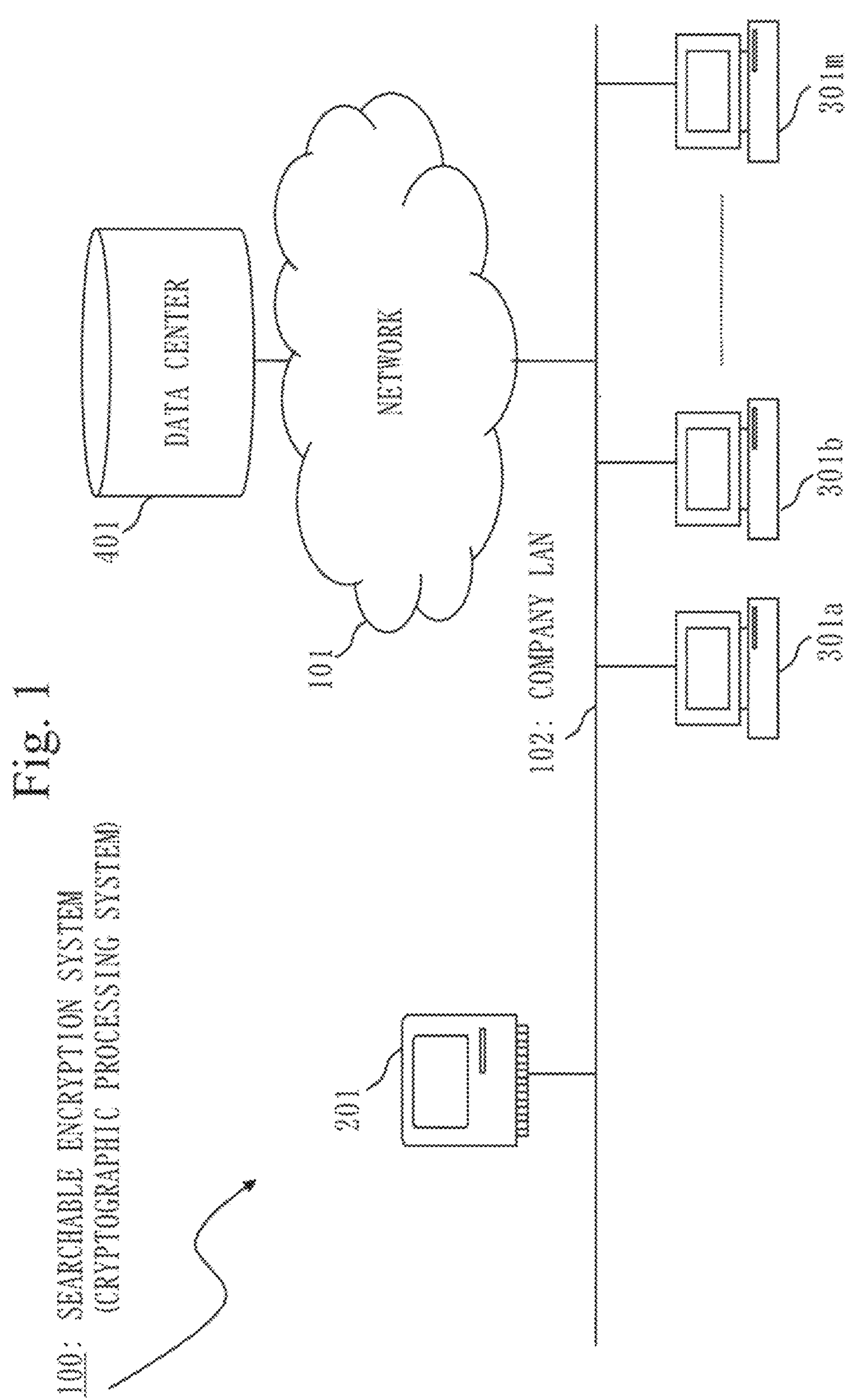
FIG. 1 is a figure illustrating an example of a configuration of a searchable encryption system 100.

The embodiment of the present invention will be described hereinafter based on the drawings.

In the following description, Formula 101 represents that y is uniformly selected from A. That is, in Formula 101, y is a uniform random number.

[Formula 101]

$$y \xleftarrow{U} A$$

In the following description, a processing device is a CPU 1911 to be described later or the like. A storage device is a ROM 1913, a RAM 1914, a magnetic disk 1920 to be described later, or the like. A communication device is a communication board 1915 to be described later or the like. An input device is a keyboard 1902, the communication board 1915 to be described later, or the like. That is, the processing device, the storage device, the communication device, and the input device are hardware.

In the following description, in generating encrypted data and generating tags, encryption called predicate encryption is used to specify an attribute of a user who is allowed retrieval. In predicate encryption, when data M is encrypted to generate encrypted data C, an attribute x can be specified, and when a secret key sk is generated, a predicate fv can be specified. Furthermore, it is an encryption scheme characterized in that only a user who has the secret key sk that satisfies a certain condition (for example, fv(x)=1) can decrypt the encrypted data C encrypted with the attribute x. Specific algorithms of this predicate encryption are described in Non-Patent Literature 2, Non-Patent Literature 4, and Non-Patent Literature 7. These schemes are algorithms of a type called predicate encryption for inner products among types of predicate encryption. In this predicate encryption for inner products, a user attribute is represented by an attribute vector $x^{\rightarrow}=(x_1, \ldots, x_N)$, and this vector is embedded in encrypted data C. A predicate is represented by a predicate vector $v^{\rightarrow}=(v_1, v_2, \ldots, v_N)$. and this is embedded in a secret key sk. Only if an inner product of the attribute vector and the predicate vector is a predetermined value (the predetermined value will be described as "0" herein), the owner of the secret key sk can decrypt the data.

To realize searchable encryption that enables control of a range to be allowed retrieval or a range to be allowed decryption depending on the role or privilege of a user, it is necessary to generate an attribute vector and a predicate vector that are appropriate for an in-company system, taking into consideration attributes such as organizational information of a company, positions of employees, and types or confidentiality levels of documents.

For example, Person C of Section B in Department A has a privilege that allows decryption of encrypted data for Department A and encrypted data for Section B. However, issuing a plurality of keys, such as a secret key for Department A and a secret key for Section B, to one user complicates an effort to manage user keys. Therefore, it is desirable that all pieces of data for which an access privilege is given can be retrieved and decrypted with one secret key. In the following embodiment, such an attribute vector and a predicate vector that can reduce the effort to manage secret keys are generated.

The algorithms of predicate encryption for inner products described in Non-Patent Literature 2 will be briefly described here by limiting to a range necessary for the following description (for details, see Non-Patent Literature 2).

Predicate encryption for inner products described in Non-Patent Literature 2 is encryption using pairing vector spaces that are defined using elliptic curves. There are a plurality of methods to construct the pairing vector spaces, and the following description is based on a method of construction using an inner product of elliptic curves. Note that, in general, operations on groups on elliptic curves are often described as operations of additive groups, but all operations including those on finite fields will be described as operations of multiplicative groups here. The following will be described using symmetrical pairings, which can be described most simply, but it is easy to extend it to a general method using asymmetrical pairings.

Let G and $G_T$ each be a group of prime order q, and $F_q=\{0, 1, \ldots, q-1\}$. Let e: $G\times G\rightarrow G_T$ be a pairing that satisfies bilinearity (property that $e(u^a, v^b)=e(u, v)^{ab}$ for any u, v$\in$G, a, and b$\in F_q$) and non-degeneracy (property that there exists g$\in$G such that e(g, g)$\neq$1). Let a direct product set of N groups G be V=G×G× . . . ×G. An element $x=(g^{x1}, g^{x2}, \ldots, g^{xN})\in V$ of the direct product set is associated with $x^{\rightarrow}=(x_1, x_2, \ldots, x_N)=F^N_q$.

In this case, if the following is defined for $x=(g^{x1}, g^{x2}, \ldots, g^{xN})\in V$, $y=(g^{y1}, g^{y2}, \ldots, g^{yN})\in V$, and $\alpha\in F_q$, V constitutes a vector space.

$$x+y=\left(g^{x1+y1}, g^{x2+y2}, \ldots, g^{xN+yN}\right), \alpha x=\left(g^{\alpha x1}, g^{\alpha x2}, \ldots, g^{\alpha xN}\right)$$

As a pairing of this vector space V, a pairing of $u=(u_1, u_2, \ldots, u_N)\in V$ and $v=(v_1, v_2, \ldots, v_N)\in V$ is defined as indicated in Formula 102.

[Formula 102]

$$e(u, v)=\prod_{i=1}^{N} e(u_i, v_i)$$

In the vector space V, the following vectors are defined.

$$a_1=(g, 1, 1, \ldots, 1), a_2=(1, g, \ldots, 1), \ldots, a_N=(1, 1, 1, \ldots, g)$$

In this case, $A=(a_1, a_2, \ldots, a_N)$ is a basis of the vector space V. This basis A is called a canonical basis.

When there are two vectors, vectors $x=(g^{x1}, g^{x2}, \ldots, g^{xN}) \in V$ and $y=(g^{y1}, g^{y2}, \ldots, g^{yN}) \in V$, they can be represented as $x=x_1a_1+x_2a_2+\ldots+x_Na_N$ and $y=y_1a_1+y_2a_2+\ldots+y_Na_N$, using the canonical basis A.

The canonical basis A satisfies Formula 103.

$$e(a_i, a_j) = e(g, g)^{\delta_{i,j}} \quad \text{[Formula 103]}$$

Note that $\delta_{i,j}$ is the Kronecker delta. Therefore, if vectors $x=x_1a_1+x_2a_2+\ldots+x_Na_N$ and $y=y_1a_1+y_2a_2+\ldots+y_Na_N$ are given, it is known that their pairing is Formula 104.

$$e(x, y) = \prod_{i=1}^{N} e(g, g)^{x_i \cdot y_i} \quad \text{[Formula 104]}$$

Let $X=(x_{i,j})$ be a square matrix with N rows and N columns in which each element is a value uniformly randomly selected from $F_q$. X constructed in this way has an extremely high probability of being a regular matrix. Formula 105 is defined using such a regular matrix.

$$b_i = \sum_{j=1}^{N} \chi_{i,j} a_j \quad \text{[Formula 105]}$$

Then, $B=(b_1, b_2, \ldots, b_N)$ is also a basis of the vector space V. The basis B is called a random basis. Each of elements $b_1, b_2, \ldots, b_N$ of the basis B is called a basis vector of the basis B.

Using an inverse matrix of a transposed matrix of the matrix X, $(v_{i,j})=(X^T)^{-1}$ is defined. Using this matrix $(v_{i,j})$, Formula 106 is defined.

$$b_i^* = \sum_{j=1}^{N} v_{i,j} a_j \quad \text{[Formula 106]}$$

Then, $B^*=(b^*_1, b^*_2, \ldots, b^*_N)$ is also a random basis of the vector space V. Each of elements $b^*_1, b^*_2, \ldots, b^*_N$ of the basis B is also called a basis vector of the basis B*.

Also in the random bases B and B*, Formula 107 is satisfied as in the canonical basis A.

$$e(b_i, b_j^*) = e(g, g)^{\delta_{i,j}} \quad \text{[Formula 107]}$$

Note that $\delta_{i,j}$ is the Kronecker delta.

Based on the above, when vector $x=x_1b_1+x_2b_2+\ldots+x_Nb_N$ is expressed using the random basis B and vector $y=y_1b^*_1+y_2b^*_2+\ldots+y_Nb^*_N$ is expressed using the random basis B*, it is known that Formula 108 holds.

$$e(x, y) = \prod_{i=1}^{N} e(g, g)^{x_i \cdot y_i} \quad \text{[Formula 108]}$$

According to Non-Patent Literature 1, the following property holds regarding the random basis $B=(b_1, b_2, \ldots, b_N)$ in the vector space V. If elements $(x_1, x_2, \ldots, x_N)$ of $F^N_q$ are given, it is easy to obtain $x=x_1b_1+x_2b_2+\ldots+x_Nb_N$. However, if $x=x_1b_1+x_2b_2+\ldots+x_Lb_L$ $(1<L<N)$ is given, obtaining vector $y=y_1b^*_1+y_2b^*_2+\ldots+y_1b^*_1$ $(1\leq 1<L)$ without using $X=(x_{i,j})$ is as difficult as the generalized Diffie-Hellman computational problem.

Non-Patent Literature 2 utilizes the above property to construct algorithms of predicate encryption for inner products.

Embodiment 1

In Embodiment 1, a searchable encryption system 100 (cryptographic processing system) that can search for information in an encrypted state and can also efficiently and securely revoke a search privilege will be described.

In Embodiment 1, focusing on a process to realize revocation of a search privilege, a method for generating tags used for searches, a method for executing searches, a method for managing keys necessary for searches, and so on will be described. For encryption, decryption, access control, key management, and so on concerning data itself, existing common key encryption (Advanced Encryption Standard (AES), etc.) or existing public key encryption (Rivest-Shamir-Adleman (RSA) cryptosystem, predicate encryption for inner products, etc.) can be used, so that they will be described only as "using an existing encryption scheme" and detailed description will be omitted.

Embodiment 1 will be described in the following order.

To start with, the point of the searchable encryption system 100 according to Embodiment 1 will be described.

First, a configuration and functions of the searchable encryption system 100 will be described.

Second, a structure of encrypted data will be described. Flows of encrypted data and other pieces of data will also be described.

Third, methods for generating an attribute vector and a predicate vector will be described. An attribute information encoding array 501 will be described first. The attribute information encoding array 501 is used to generate encoding information based on which an attribute vector or a predicate vector is generated. Then, methods for generating an attribute vector and a predicate vector based on the encoding information generated using the attribute information encoding array 501 will be described.

Fourth, operation of the searchable encryption system 100 will be described. That is, a specific method by which the searchable encryption system 100 realizes searchable encryption will be described. The operation of the searchable encryption system 100 will be described by dividing it into five processes.

Here, a situation is assumed such that pieces of data (documents, etc.) created within a company are stored in the data center 401, and each piece of data is shared on a per division basis or on a per section basis. Based on an attribute associated with each user (employee), such as where the user belongs to, a user secret key is issued to each user. When data is stored in the data center 401, the data is encrypted by setting attribute information that indicates a range to be allowed decryption and a range to be allowed retrieval, so as to allow the encrypted data to be decrypted and retrieved only by users who have a privilege.

0. Point of the Searchable Encryption System 100 According to Embodiment 1

As disclosed in Patent Literature 4 and so on, it is known that searchable encryption can be constructed based on predicate encryption for inner products.

The point of Embodiment 1 is that a section where a secret key is generated in the key generation algorithm of existing predicate encryption for inner products is modified so that a pair of a secret key and a search auxiliary key is generated, and the decryption algorithm is also modified so that both the secret key and the search auxiliary key are required. If searchable encryption is constructed based on predicate encryption for inner products modified as described above, both the secret key and the search auxiliary key are required when a confidential search is performed, so that this property is used for revocation management.

In Embodiment 1, based on predicate encryption for inner products described in Non-Patent Literature 7, predicate encryption for inner-products with the above modifications is constructed, and searchable encryption is realized using the modified predicate encryption for inner products. Predicate encryption for inner products of Non-Patent Literature 7 is called hierarchical predicate encryption for inner products, and is characterized in that attributes and predicates have a hierarchical structure, and "key delegation" to generate a lower-layer secret key from a certain secret key is possible. A lower-layer secret key is a secret key that can decrypt only some of pieces of encrypted data that can be decrypted by an upper-layer secret key. This point is different from predicate encryption for inner products of Non-Patent Literature 2 described above.

The algorithms of Non-Patent Literature 7 will be described by limiting only to a range necessary for the following description (for details, see Non-Patent Literature 7).

An initial setting algorithm (Setup) is as indicated in Formula 109, where $\lambda$ is a security parameter, d is the number of layers, $\mu_i$ is a vector length of up to the i-th layer, $\mu_0=0<\mu_1<\mu_2< \ldots <\mu_d=n$, $g_{ob}$ is an algorithm that randomly generates a vector space and a basis, sk is a master key, and pk is public parameters.

[Formula 109]

$$\mathrm{Setup}\left(1^\lambda, \vec{\mu} := (n, d; \mu_1, \ldots, \mu_d)\right):$$

$$(param_{\mathbb{V}}, \mathbb{B}, \mathbb{B}^*) \xleftarrow{R} \mathcal{G}_{ob}(1^\lambda, 2n+3),$$

$$\hat{\mathbb{B}} := (b_1, \ldots, b_n, b_{2n+1}, b_{2n+3}),\ sk := \mathbb{B}^*,\ \mathrm{pk} := \left(1^\lambda, param_{\mathbb{V}}, \hat{\mathbb{B}}\right),$$

$$\text{return } sk, pk.$$

A key generation algorithm (KeyGen) is as indicated in Formula 110, where 1 is a layer number targeted for key generation, $(v^{\rightarrow}_1, \ldots, v^{\rightarrow}_1)$ is a predicate vector, $\sigma$, $\eta$, and $\psi$ are random numbers, $k^{\rightarrow *}_1$ is a secret key in which $k^*_{1,dec}$ is an element for decryption, $k^*_{1,ran,j}$ is an element for randomization, and $k^*_{1,del,j}$ is an element for key delegation.

(Formula 110]

$$KeyGen\left(pk, sk, (\vec{v}_1, \ldots, \vec{v}_l\right) := \left(\left(v_1, \ldots, v_{\mu_1}\right), \ldots, \left(v_{\mu_{l-1}+1}, \ldots, v_{\mu_l}\right)\right)):$$

$$\sigma_{dec,t}, \eta_{dec}, \sigma_{ran,j,t}, \eta_{ran,j}(j = 1, \ldots, i+1),$$

$$\sigma_{del,j,t}, \eta_{del,j}(j = 1, \ldots, n), \psi \xleftarrow{U} \mathbb{F}_q \text{ for } t = 1, \ldots, i,$$

$$k^*_{l,dec} := \sum_{t=1}^{l} \sigma_{dec,t}\left(\sum_{i=\mu_{t-1}+1}^{\mu_t} v_i b^*_i\right) + b^*_{2n+1} + \eta_{dec} b^*_{2n+2},$$

-continued $$k^*_{l,ran,j} := \sum_{t=1}^{l} \sigma_{ran,j,t}\left(\sum_{i=\mu_{t-1}+1}^{\mu_t} v_i b^*_i\right) + \eta_{ran,j} b^*_{2n+2} \text{ for } j = 1, \ldots, l+1,$$

$$k^*_{l,del,j} := \sum_{t=1}^{l} \sigma_{del,j,t}\left(\sum_{i=\mu_{t-1}+1}^{\mu_t} v_i b^*_i\right) + \psi b^*_j + \eta_{del,j} b^*_{2n+2}$$

$$\text{for } j = \mu_l + 1, \ldots, n,$$

$$\text{return } \vec{k}^*_l := \left(k^*_{l,dec}, k^*_{l,ran,1}, \ldots, k^*_{l,ran,l+1}, k^*_{l,del,\mu_l+1}, \ldots, k^*_{l,del,n}\right).$$

An encryption algorithm (Enc) is as indicated in Formula 111, where m is a message, 1 is a layer number specified as a destination of encryption, $(x^{\rightarrow}_1, \ldots, x^{\rightarrow}_1)$ is an attribute vector, $(x^{\rightarrow}_{1+1}, \ldots, x^{\rightarrow}_d)$, $\delta$, and $\zeta$ are random numbers, $g_T:=e(g, g)\neq 1$, and $(c_1, c_2)$ is an encrypted message.

[Formula 111]

$$Enc\left(pk, m \in \mathbb{G}_T, (\vec{x}_1, \ldots, \vec{x}_l\right) := \left(\left(x_1, x_{\mu_1}\right), \ldots, \left(x_{\mu_{l-1}+1}, \ldots, x_{\mu_l}\right)\right)):$$

$$\left(\vec{x}_{l+1}, \ldots, \vec{x}_d\right) \xleftarrow{U} \mathbb{F}_q^{\mu_{l+1} 0 \mu_l} \times \ldots \times \mathbb{F}_q^{n-\mu_{d-1}}, \delta_1, \ldots, \delta_l, \delta_{2n+3}, \zeta \xleftarrow{U} \mathbb{F}_q,$$

$$c_1 := \sum_{t=1}^{l} \delta_t\left(\sum_{i=\mu_{t-1}+1}^{\mu_t} x_i b_i\right) + \zeta b_{2n+1} + \delta_{2n+3} b_{2n+3},\ c_2 := g_T^{\zeta} m,$$

$$\text{return } (c_1, c_2).$$

A decryption algorithm (Dec) is as indicated in Formula 112, where m' is a decrypted message.

[Formula 112]

$$\mathrm{Dec}\left(\mathrm{pk}, k^*_{l,dec}, c_1, c_2\right):$$

$$m' := c_2 / e\left(c_1, k^*_{l,dec}\right),$$

$$\text{return } m'.$$

A key delegation algorithm (Delegate) is as indicated in Formula 113, where 1 is a layer number of a secret key before key delegation, $v^{\rightarrow}_{1+1}$ is a predicate vector to be added at a key delegation destination, and $\alpha$, $\sigma$, and $\psi'$ are random numbers.

[Formula 113]

$$\mathrm{Delegate}_l\left(pk, \vec{k}^*_l, \vec{v}_{l+1} := \left(v_{\mu_l+1}, \ldots, v_{\mu_{l+1}}\right)\right):$$

$$\alpha_{dec,t}, \sigma_{dec}, \alpha_{ran,j,t}, \sigma_{ran,j}(j = 1, \ldots, l+2), \alpha_{del,j,t},$$

$$\sigma_{del,j}(j = 1, \ldots, n), \psi' \xleftarrow{U} \mathbb{F}_q \text{ for } t = 1, \ldots, l+1,$$

$$k^*_{l+1,dec} := k^*_{l,dec} + \sum_{t=1}^{l+1} \alpha_{dec,t} k^*_{i,ran,t} + \sigma_{dec}\left(\sum_{i=\mu_l+1}^{\mu_{i+2}} v_i k^*_{l,del,i}\right),$$

$$k^*_{l+1,ran,j} := \sum_{t=1}^{l+1} \alpha_{ran,j,t} k^*_{i,ran,t} + \sigma_{ran,j}\left(\sum_{i=\mu_l+1}^{\mu_{l+1}} v_i k^*_{l,del,i}\right),$$

$$\text{for } j = 1, \ldots, l+2,$$

$$k^*_{l+1,del,j} := \sum_{t=1}^{l+1} \alpha_{del,j,t} k^*_{i,ran,t} + \sigma_{del,j}\left(\sum_{i=\mu_l+1}^{\mu_{l+1}} v_i k^*_{l,del,i}\right) + \psi' k^*_{i,del,j}$$

$$\text{for } j = \mu_{i+1} + 1, \ldots, n,$$

$$\text{return } \vec{k}^*_{l+1} := \begin{pmatrix} k^*_{l+1,dec}, k^*_{l+1,ran,1}, \ldots, k^*_{l+1,ran,l+2}, \\ k^*_{i+1,del,\mu_{l+1},1}, \ldots, k^*_{i+1,del,n} \end{pmatrix}.$$

In Embodiment 1, the key generation algorithm (KeyGen) is modified so that the key generation algorithm generates a pair of a secret key and a search auxiliary key. The modified key generation algorithm is as indicated in Formula 114.

That is, a random number θ is generated and used to calculate $k^*_{l,dec}$, and θ is output as the search auxiliary key at the same time.

(Formula 114]

$$KeyGen(pk, sk, (\vec{v}_1, \ldots, \vec{v}_l) := ((v_1, \ldots, v_{\mu_1}), \ldots, (v_{\mu_{l-1}+1}, \ldots, v_{\mu_l}))):$$

$$\sigma_{dec,t}, \eta_{dec}, \sigma_{ran,j,t}, \eta_{ran,j}(j = 1, \ldots, l+1), \sigma_{del,j,t},$$

$$\eta_{del,j}(j = 1, \ldots, n), \psi, \theta \xleftarrow{U} \mathbb{F}_q \text{ for } t = 1, \ldots, i,$$

$$k^*_{l,dec} := \sum_{t=1}^{l} \sigma_{dec,t}\left(\sum_{i=\mu_{t-1}+1}^{\mu_t} v_i b^*_i\right) + \theta^{-1} b^*_{2n+1} + \eta_{dec} b^*_{2n+2},$$

$$k^*_{l,ran,j} := \sum_{t=1}^{l} \sigma_{ran,j,t}\left(\sum_{i=\mu_{t-1}+1}^{\mu_t} v_i b^*_i\right) + \eta_{ran,j} b^*_{2n+2} \text{ for } j = 1, \ldots, l+1,$$

$$k^*_{l,del,j} := \sum_{t=1}^{l} \sigma_{del,j,t}\left(\sum_{i=\mu_{t-1}+1}^{\mu_t} v_i b^*_i\right) + \psi b^*_j + \eta_{del,j} b^*_{2n+2}$$

$$\text{for } j = \mu_l + 1, \ldots, n,$$

$$\text{return } \vec{k}^*_l := (k^*_{l,dec}, k^*_{l,ran,1}, \ldots, k^*_{l,ran,l+1}, k^*_{l,del,\mu_l+1}, \ldots, k^*_{l,del,n}), \theta.$$

The decryption algorithm (Dec) is also modified accordingly. The modified decryption algorithm is as indicated in Formula 115. That is, the search auxiliary key θ is used to calculate m'. The point is that decryption is not possible unless both $k^*_{l,dec}$, which is (the element for decryption of) the secret key, and the search auxiliary key θ are available.

[Formula 115]

$$\text{Dec}(\text{pk}, k^*_{l,dec}, \theta, c_1, c_2):$$

$$m' := c_2 / e(c_1, k^*_{l,dec})^{\theta},$$

$$\text{return } m'.$$

The other algorithms are the same as those of Non-Patent Literature 7. With this arrangement, predicate encryption for inner products in which the search auxiliary key is introduced in addition to the secret key can be constructed. In the following, predicate encryption for inner products of Non-Patent Literature 7 in which the key generation algorithm and the decryption algorithm are modified as described above will be referred to as "predicate encryption for inner products supporting revocation". In Embodiment 1, searchable encryption is constructed using predicate encryption for inner products supporting revocation.

1. Configuration and Functions of the Searchable Encryption System 100

FIG. 1 is a figure illustrating an example of a configuration of the searchable encryption system 100.

The searchable encryption system 100 includes a key management server 201, access terminals 301 (301*a* to 301*m*), and a data center 401. The key management server 201 and the access terminals 301 are connected to a company LAN 102. The company LAN 102 is connected with the data center 401 via a network 101.

The key management server 201 (key generation device) generates public parameters for encryption, and generates a master key used to issue a user secret key to a user. The key management server 201 also manages attribute information of each user, such as where each user belongs to or a position of each user, and issues user secret keys to employees based on the attribute information. At the same time as issuing a user secret key, the key management server 201 also issues a search auxiliary key to the data center 401 as information for efficiently realizing a search privilege revocation function.

The access terminal 301 (search device, encryption device, decryption device) is a personal computer (PC) used by users in the company. The access terminal 301 creates data, then encrypts the data, and stores it in the data center 401, and also searches for data accumulated in the data center 401 and decrypts and edits encrypted data retrieved from the data center 401.

The data center 401 (search execution device) is a server with a large-capacity storage device to store encrypted data created in the company. Since data is stored in an encrypted state, the content cannot be viewed in the data center 401. The data center 401 may be composed of a plurality of servers instead of one server. For example, the data center 401 may be composed of a server that performs processing such as searching and one or more servers that accumulate encrypted data. The search execution device may refer to the entirety of the data center 401 or may refer only to the server, in the data center 401, that performs processing such as searching.

The network 101 is a communication path that connects the company LAN 102 and the data center 401. For example, the Internet or the like is a typical example of the network 101.

The company LAN 102 is a communication path installed in the company, and various servers or personal computers used in the company are connected to it. If there are offices in a plurality of buildings, the communication path will be configured in a complex manner involving routers, dedicated lines, or the like.

Figure 2:
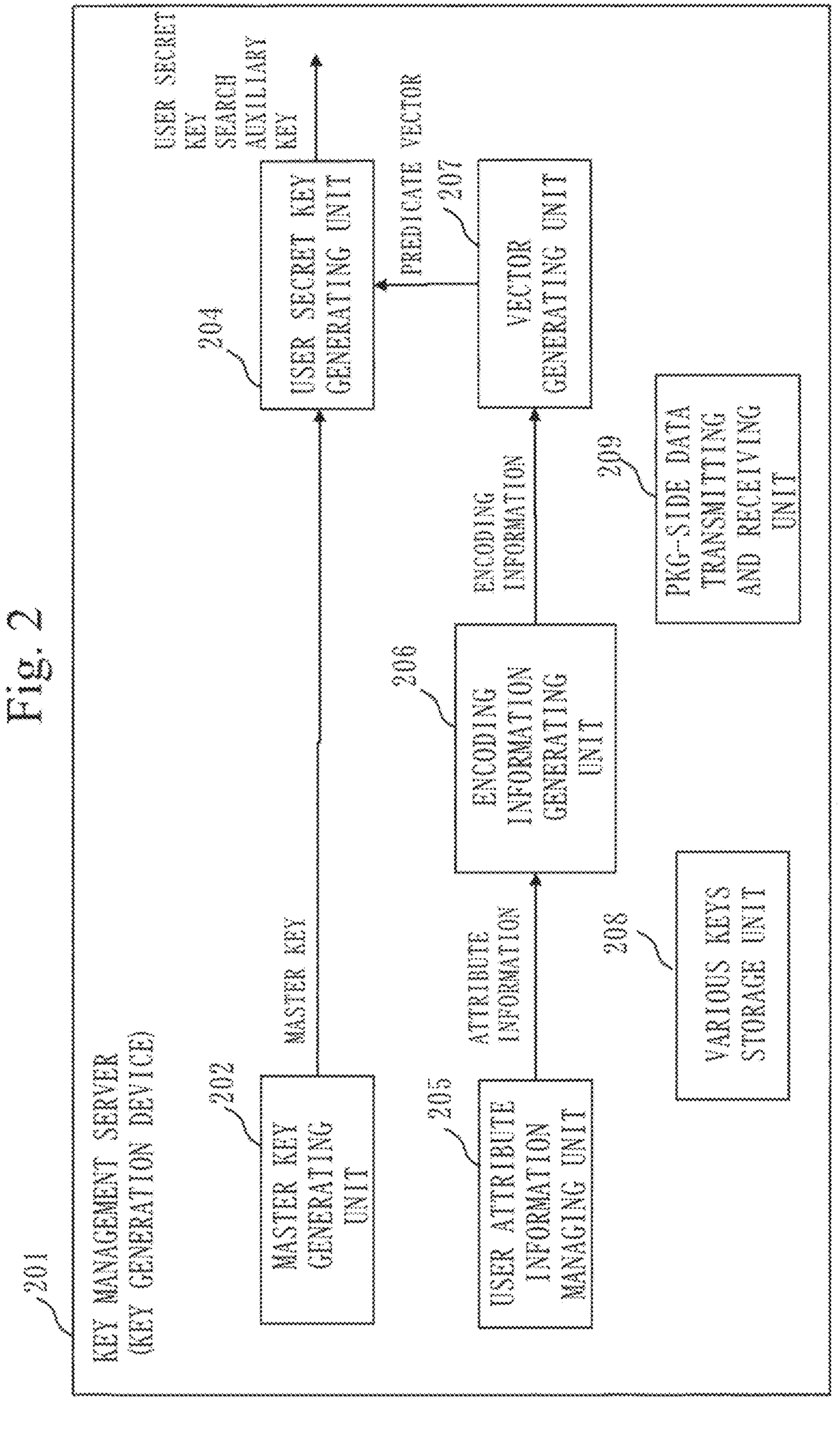
FIG. 2 is a functional block diagram illustrating functions of a key management server 201.

FIG. 2 is a functional block diagram illustrating functions of the key management server 201.

The key management server 201 includes a master key generating unit 202, a user secret key generating unit 204, a user attribute information managing unit 205, an encoding information generating unit 206, a vector generating unit 207, a various keys storage unit 208, and a PKG-side data transmitting and receiving unit 209.

The master key generating unit 202 uses a processing device to generate public parameters to be commonly used by all users who use searchable encryption, based on a key length used in the system, and uses the processing device to generate a master key based on which various secret keys are to be generated.

The user secret key generating unit 204 uses the processing device to generate a user secret key and a search auxiliary key based on the master key, using a predicate vector generated by the vector generating unit 207 to be described later.

The user attribute information managing unit 205 uses a storage device to manage attribute information that indicates various attributes such as where each user belongs to or a position of each user and a confidentiality level of documents that can be accessed. The user attribute information managing unit 205 manages not only current attribute information but also past attribute information as a history.

The encoding information generating unit 206 (second encoding information generating unit) uses the processing device to generate encoding information (second encoding information), based on the attribute information managed by the user attribute information managing unit 205.

The vector generating unit 207 uses the processing device to generate a predicate vector, based on the encoding information generated by the encoding information generating unit 206.

The various keys storage unit 208 (key storage unit) stores, in the storage device, the master key generated in the master key generating unit 202 and the user secret key and the search auxiliary key generated in the user secret key generating unit 204.

The PKG-side data transmitting and receiving unit 209 transmits, via a communication device, the public parameters and the user secret key to the access terminal 301 that is used by the user. The PKG-side data transmitting and receiving unit 209 also transmits the search auxiliary key to the data center 401 via the communication device.

FIG. 3 is a functional block diagram illustrating functions of the access terminal 301.

The access terminal 301 includes a user secret key storage unit 302, a trapdoor generating unit 303, a data-encryption key decrypting unit 305, a terminal-side data transmitting and receiving unit 311, an encoding information generating unit 306, a vector generating unit 307, a tag and encrypted data-encryption key generating unit 308, a data encrypting unit 309, and a data decrypting unit 310.

The user secret key storage unit 302 (key storage unit) stores the user secret keys individually issued to users and the public parameters in a storage device.

The trapdoor generating unit 303 uses a processing device to generate a trapdoor, which is equivalent to a search request, based on a user secret key stored in the user secret key storage unit 302 and a predicate vector generated based on a keyword to be searched for.

The data-encryption key decrypting unit 305 (common key acquiring unit) decrypts an encrypted data-encryption key attached to encrypted data received from the data center 401 by the terminal-side data transmitting and receiving unit 311 to be described later. By this, the data-encryption key decrypting unit 305 retrieves a data-encryption key, using the processing device.

The structure of encrypted data will be described later.

The encoding information generating unit 306 (first encoding information generating unit) automatically extracts keywords that will be searched for from data, and also receives keywords that will be searched for from users. Then, the encoding information generating unit 306 uses the processing device to generate encoding information (first encoding information) based on the keywords.

The encoding information generating unit 306 also receives attribute information that indicates attributes of users who are allowed retrieval from a user. Then, the encoding information generating unit 306 uses the processing device to generate encoding information (first encoding information) based on the attribute information.

The vector generating unit 307 uses the processing device to generate an attribute vector or a predicate vector, based on the encoding information generated by the encoding information generating unit 306.

The tag and encrypted data-encryption key generating unit 308 (encrypted data generating unit) uses the processing device to generate a plurality of tags, based on the attribute vector generated by the vector generating unit 307 and random numbers. The tag and encrypted data-encryption key generating unit 308 uses the processing device to generate a data-encryption key. Then, the tag and encrypted data-encryption key generating unit 308 uses the processing device to encrypt the generated data-encryption key so as to generate an encrypted data-encryption key.

The data encrypting unit 309 uses the processing device to encrypt a data body using the data-encryption key generated by the tag and encrypted data-encryption key generating unit 308 so as to generate an encrypted data body. Furthermore, the data encrypting unit 309 uses the processing device to generate encrypted data by adding the plurality of tags and the encrypted data-encryption key generated by the tag and encrypted data-encryption key generating unit 308 to the encrypted data body.

The data decrypting unit 310 uses the processing device to decrypt the encrypted data body included in the encrypted data received from the data center 401, using the data-encryption key acquired in the data-encryption key decrypting unit 305.

The terminal-side data transmitting and receiving unit 311 (data transmitting unit) transmits encrypted data created in the access terminal 301 to the data center 401 via a communication device, and receives encrypted data stored in the data center 401 via the communication device.

The terminal-side data transmitting and receiving unit 311 receives a user secret key from the key management server 201 via the communication device.

FIG. 4 is a functional block diagram illustrating functions of the data center 401.

The data center 401 includes a center-side data transmitting and receiving unit 402, a data managing unit 403, a search request receiving unit 404, a search executing unit 405, a search result transmitting unit 406, and a search auxiliary key managing unit 407.

The center-side data transmitting and receiving unit 402 receives encrypted data from the access terminal 301 via a communication device.

The center-side data transmitting and receiving unit 402 also receives public parameters and a search auxiliary key from the key management server 201 via the communication device.

The data managing unit 403 (encrypted data accumulating unit) stores the encrypted data received from the access terminal 301 and the public parameters received from the key management server 201 in a storage device.

The search request receiving unit 404 receives a trapdoor, which is a search request for encrypted data, from the access terminal 301 via the communication device.

The search executing unit 405 uses a processing device to execute a test process on the trapdoor received by the search request receiving unit 404 and the tags of encrypted data stored by the data managing unit 403, using the search auxiliary key stored by the search auxiliary key managing unit 407. By this, the search executing unit 405 determines whether the encrypted data stored by the data managing unit 403 includes encrypted data with a matching keyword.

The search result transmitting unit 406 transmits, as a result of the search request received from the access terminal 301, encrypted data that is found as a hit in the search to the access terminal 301 via the communication device.

The search auxiliary key managing unit 407 stores the search auxiliary key received from the key management server 201 in the storage device.

2. Structure of Encrypted Data and Flows of Data

The structure of encrypted data will be described.

Figure 5:
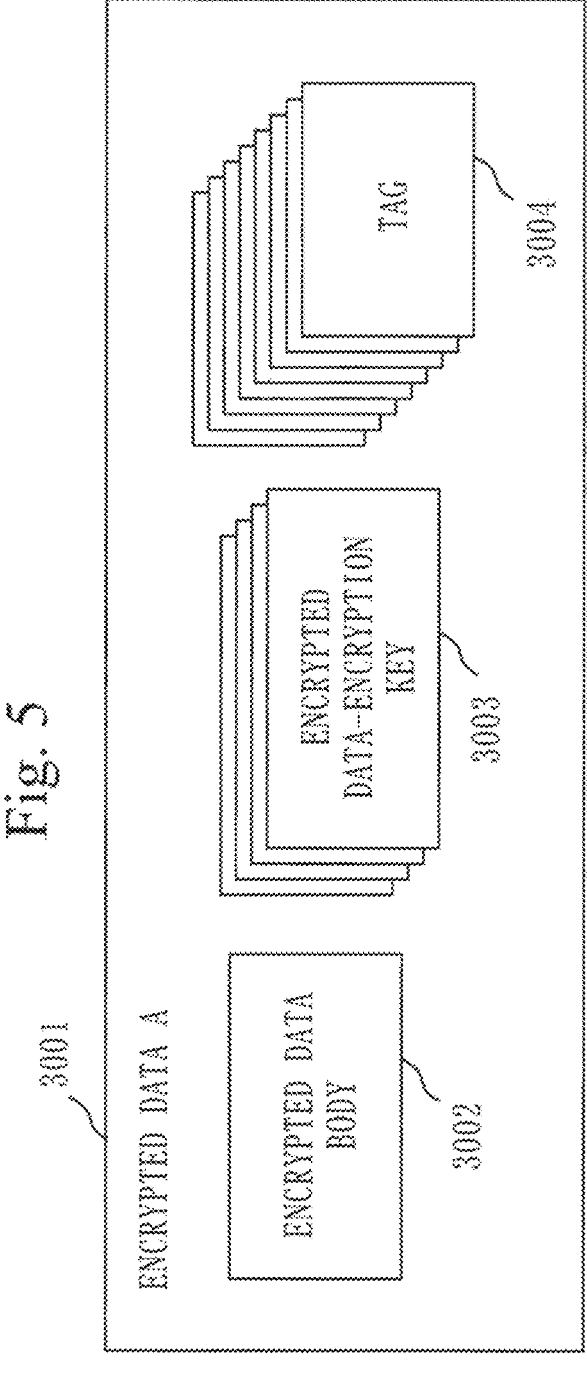
FIG. 5 is a figure illustrating an example of a configuration of encrypted data 3001 using general predicate encryption for inner products.

FIG. 5 is a figure illustrating an example of a configuration of encrypted data 3001.

This example configuration will be referred to as encrypted data A. An encrypted data body 3002 is data encrypted with a data-encryption key, using common key encryption such as Advanced Encryption Standard (AES) or Camellia (registered trademark), for example. An encrypted data-encryption key 3003 is the data-encryption key that is encrypted using an existing encryption scheme (common key encryption such as AES or public key encryption such as RSA encryption or predicate encryption for inner products). A tag 3004 is a tag generated using a keyword contained in the data body and an attribute vector.

Figure 6:
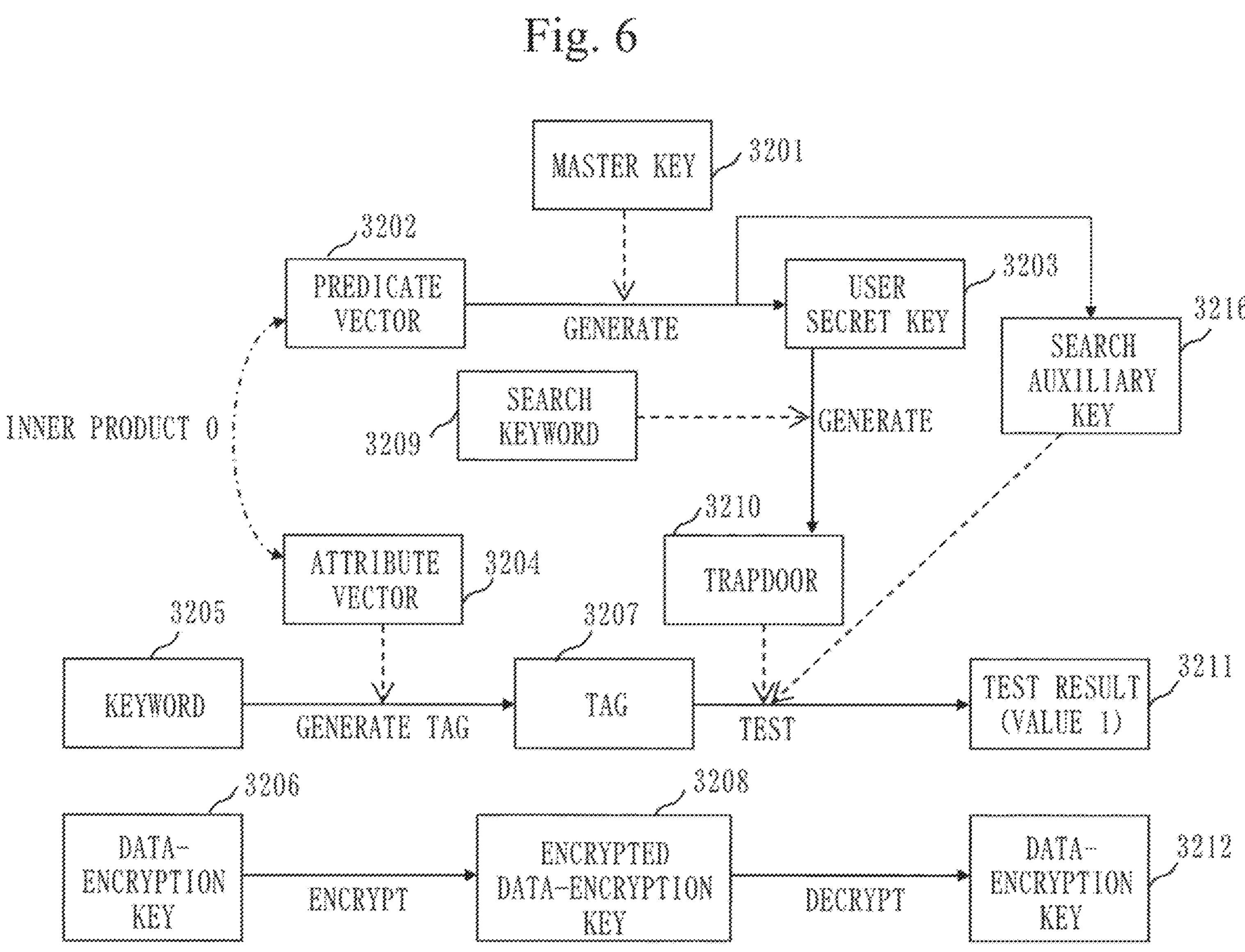
FIG. 6 is a figure illustrating a relationship between each piece of data included in encrypted data A and each piece of presented data.

FIG. 6 is a figure illustrating a relationship among pieces of data included in the encrypted data A and pieces of data presented in the above description.

First, the encoding information generating unit 206 of the key management server 201 generates encoding information based on attributes of a user managed by the user attribute information managing unit 205, and the vector generating unit 207 generates a predicate vector 3202 based on the generated encoding information. Then. the user secret key generating unit 204 generates a user secret key 3203 and a search auxiliary key 3216, using the predicate vector 3202 and a master key 3201. The PKG-side data transmitting and receiving unit 209 delivers the generated user secret key 3203 to the user and delivers the search auxiliary key 3216 to the data center 401 in secure ways, respectively.

The data encrypting unit 309 of the access terminal 301 used by a user who encrypts data encrypts the data with a data-encryption key 3206. The encoding information generating unit 306 generates encoding information that indicates attributes of a user who is allowed retrieval, and the vector generating unit 307 generates an attribute vector 3204 based on the generated encoding information. The tag and encrypted data-encryption key generating unit 308 encrypts the data-encryption key 3206 used to encrypt the data, using an existing encryption method, so as to generate an encrypted data-encryption key 3208. The tag and encrypted data-encryption key generating unit 308 also generates a tag 3207 based on a keyword 3205 contained in the data and the attribute vector 3204, using predicate encryption for inner products supporting revocation. Generally, the key word 3205 and the attribute vector 3204 are a public key, and a tag is generated by encrypting a constant 1 or a random number with this public key. This tag 3207 is created as many as the number of attribute vectors 3204 of users who are allowed retrieval, and each is transmitted to a recipient together with the encrypted data-encryption key and the encrypted data body as the encrypted data A. Even when there are a plurality of users to be transmission destinations, if the attribute vector 3204 can be composed as one vector, only one tag 3207 needs to be created.

The trapdoor generating unit 303 of the access terminal 301 used by a user who searches for data generates a trapdoor 3210, based on the user secret key 3203 stored by the user secret key storage unit 302 and a search keyword 3209 to be searched for. Generally, the trapdoor 3210 is generated by generating a secret key corresponding to a vector obtained by adding the search keyword 3209 to the end of the predicate vector 3202. If the constant 1 or the random number used to generate the tag 3207 can be restored by decrypting the tag 3207 using the trapdoor 3210 and the search auxiliary key 3216, the search request receiving unit 404 of the data center 401 knows that the keyword 3205 is contained. If the constant 1 or the random number cannot be restored, it is known that the keyword 3205 is not contained. This determination requires the search auxiliary key 3216 corresponding to the user secret key 3203, so that by deleting the search auxiliary key 3216 from the data center 401, the search privilege of the corresponding user secret key 3203 can be revoked.

The data-encryption key decrypting unit 305 of the access terminal 301 used by a user who decrypts the data uses an existing encryption method to decrypt the encrypted data-encryption key 3208 and extracts a data-encryption key 3212. The data decrypting unit 310 can acquire the data by decrypting the encrypted data body with the data-encryption key 3212.

3. Methods for Generating an Attribute Vector and a Predicate Vector

The attribute information encoding array 501 will be described.

The attribute information encoding array 501 is an array used to generate encoding information by the encoding information generating unit 206 of the key management server 201 and the encoding information generating unit 306 of the access terminal 301. That is, the attribute information encoding array 501 is used to generate encoding information based on which a predicate vector used to generate a user secret key and an attribute vector used to generate encrypted data are generated. The encoding information generating unit 206 and the encoding information generating unit 306 generate encoding information by setting values in the attribute information encoding array 501 according to the methods described below.

Predicate encryption for inner products (and predicate encryption for inner products supporting revocation) is characterized in that it is possible to determine whether an inner product of an attribute vector and a predicate vector is 0. It is known that this characteristic can be used to realize determinations on AND conditions, OR conditions, and inclusion relations.

The attribute information encoding array 501 is provided to encode attribute information so that the attributes of a user who has a user secret key and the attributes of a user who is allowed to retrieve encrypted data can be compared using AND conditions and OR conditions. Note that the attribute information encoding array 501 is information of a fixed length, and a required number of constituent elements of each encoding array to be described below is information that needs to be determined in advance in using the system. For simplicity, typical examples using AND conditions and OR conditions are presented in this embodiment, but details including inclusion relation conditions are disclosed in Patent Literature 4.

Figure 7:
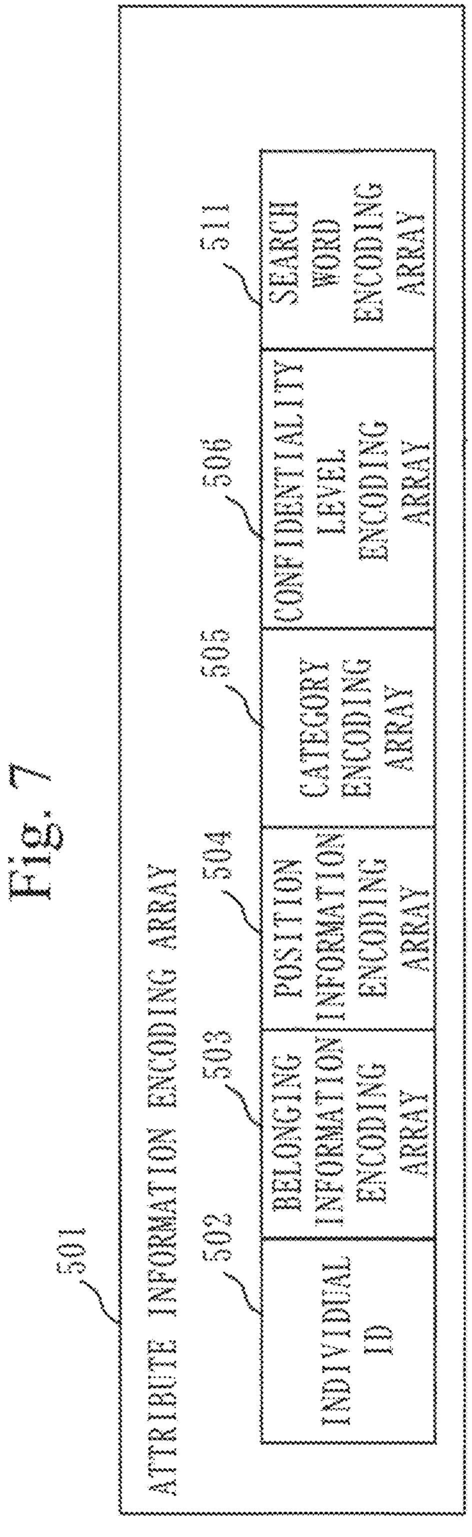
FIG. 7 is a figure illustrating an example of a configuration of an attribute information encoding array 501.

FIG. 7 is a figure illustrating an example of a configuration of the attribute information encoding array 501.

The attribute information encoding array 501 includes an individual identifier (ID) 502, a belonging information encoding array 503, a position information encoding array 504, a category encoding array 505, a confidentiality level encoding array 506, and a search word encoding array 511.

The individual ID 502 identifies a user. The belonging information encoding array 503 indicates where the user belongs to. The position information encoding array 504 indicates a position of the user. The category encoding array 505 indicates a type of documents that can be accessed. The confidentiality level encoding array 506 indicates a confidentiality level of documents that can be accessed. In the search word encoding array 511, a keyword to be searched for is set when a trapdoor is generated.

When used as an attribute to generate a user secret key, an attribute of a user or group that uses the secret key is set in each encoding array in the attribute information encoding array 501. That is, the encoding information generating unit 206 of the key management server 201 generates encoding information by setting the attribute of the user or group that uses the secret key in each encoding array in the attribute information encoding array 501.

When used as an attribute to be set in encrypted data, an attribute of a user who is allowed to retrieve the encrypted data is set in each encoding array in the attribute information encoding array 501. That is, the encoding information generating unit 306 of the access terminal 301 generates the encoding information by setting the attribute of the user who is allowed to retrieve the encrypted data in each encoding array in the attribute information encoding array 501.

As will be described later, for some of the encoding arrays in the attribute information encoding array 501, it is necessary to decide, for each encoding array, whether a comparison is to be performed using which one of an AND test and an OR test. The AND test is a process to determine a match of all the elements constituting the encoding array. The OR test is a process to determine a match of any one of the elements.

That is, one of the AND test and the OR test is used to compare each encoding array of the encoding information based on which the predicate vector set in a user secret key is generated with each encoding array of the encoding information based on which the attribute vector set in a tag or an encrypted data-encryption key is generated. If a result of the test is true for all the encoding arrays, that is, if a result of performing a determination by the AND test is true for all the encoding arrays, retrieval or decryption is possible.

Next, each constituent element of the attribute information encoding array 501 will be described.

In the following description of each constituent element of the attribute information encoding array 501, a case where a user secret key is generated and a case where encrypted data is generated will be described.

The individual ID 502 will be described.

In the individual ID 502, an ID such as an employee number indicating an individual is set. When a user secret key is generated, the individual ID 502 is always set. When encrypted data is generated, the ID of an individual is set if the encrypted data is to be transmitted to that individual. If an individual who is allowed retrieval is not specified in particular, predetermined information "*" that matches all values is set.

With regard to the individual ID 502, a user secret key and encrypted data are compared by the AND test. Note that also in the following description, the symbol "*" is used as a special symbol that matches all values (what is called a wild card).

Figure 8:
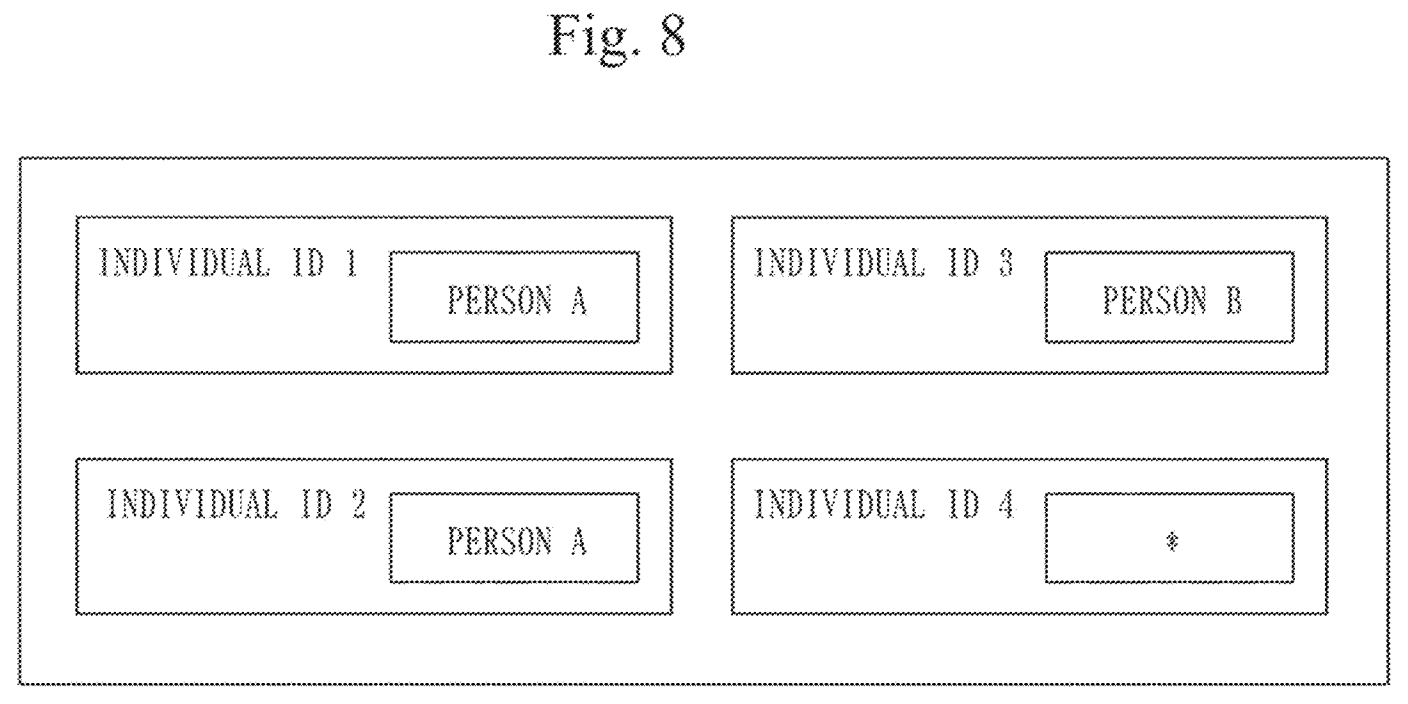

FIG. 8 is a figure illustrating an example of setting of the individual ID 502.

For example, it is assumed that a value indicating "person A" is set in the user secret key like an individual ID 1. If the value indicating "person A" is also set in the encrypted data like an individual ID 2, the values of the user secret key and the encrypted data match, so that retrieval is possible. However, if "person B" is set in the encrypted data like an individual ID 3, the values of the user secret key and the encrypted data are different, so that retrieval cannot be performed.

If "*" is set in the encrypted data like an individual ID 4, with either the user secret key that is set like the individual ID 1 or the user secret key that is set like the individual ID 3, the result of the AND test in true, so that retrieval is possible. The belonging information encoding array 503 will be described.

Figure 9:
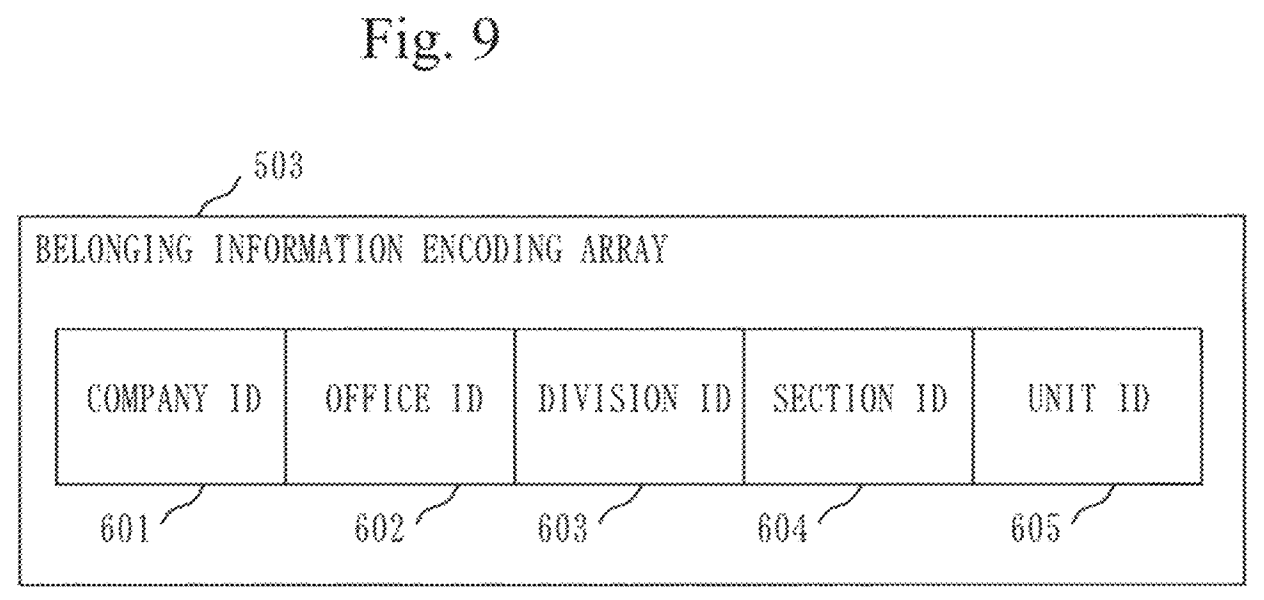

FIG. 9 is a figure illustrating an example of a configuration of the belonging information encoding array 503.

In the belonging information encoding array 503, where the user belongs to is set in descending order of the hierarchy. For example, the following are set in this order: a company ID 601 that indicates which company the user belongs to, an office ID 602 that indicates which office the user belongs to, a division ID 603 that indicates which division the user belongs to, a section ID 604 that indicates which section the user belongs to, and a unit ID 605 that indicates which unit the user belongs to.

With regard to the belonging information encoding array 503, a user secret key and encrypted data are compared by the AND test, which determines whether a match occurs in all elements. If it is true, conditions are considered to be satisfied.

FIG. 10 is a figure illustrating an example of setting of the belonging information encoding array 503.

For example, a belonging information encoding array 1 is an example regarding a user secret key generated for a user who belongs to "Company A/Office B/Department C/Section D/Unit E".

When encrypted data that can be retrieved by any user in Section D is generated. "Company A/Office B/Department C/Section D/*" indicated in a belonging information encoding array 2 is set. In this case, with any user in Section D, a match occurs in all elements when the AND test is performed, so that the result is true and retrieval is possible. To allow any user in Department C to retrieve the encrypted data, an attribute as indicated in a belonging information encoding array 3 is set.

For encrypted data that can be retrieved by members of Section E, an attribute as indicated in a belonging information encoding array 4 is set. In this case, with a user of Section D who has a secret key in which the attribute indicated in the belonging information encoding array 1 is set, there is a difference in information about the section, "Section D" and "Section E", so that the result of the AND test is false and retrieval is not possible.

Similarly, when encrypted data that can be retrieved by a user of Section D who belongs to no unit is generated, a random number R may be set in the unit ID 605, as indicated in a belonging information encoding array 5. With a user who belongs to "Unit E" as indicated in the belonging information encoding array 1, the unit ID 605 is different, so that the result of the AND test is false and retrieval is not possible. In contrast, a user of Section D who belongs to no unit has a user secret key in which the attribute as indicated in the belonging information encoding array 2 is set. Therefore, a match occurs in all elements, so that the result of the AND test is true and retrieval is possible.

In the above, a random number is denoted using the symbol R. In the following, a random number will also be denoted using the symbol R. However, since a random number R indicates a randomly selected value, even if a random number R and a random number R appear in two places in an encoding array, they are mutually different random numbers.

The position information encoding array 504 will be described.

Figure 11:
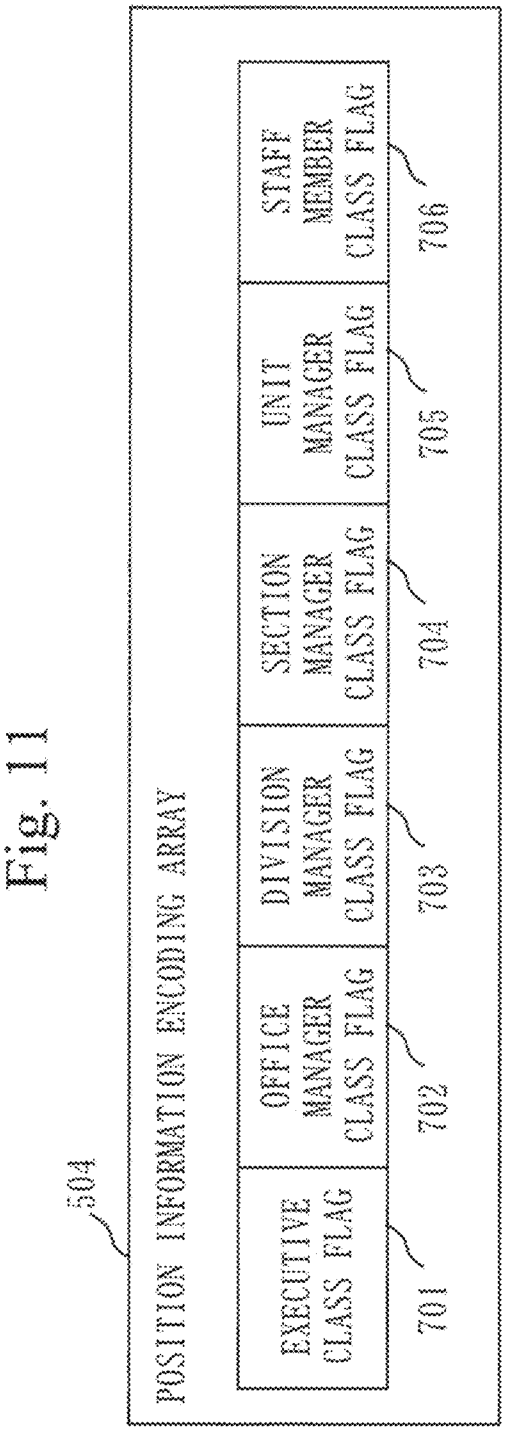
FIG. 11 is a figure illustrating an example of a configuration of a position information encoding array 504.

FIG. 11 is a figure illustrating an example of a configuration of the position information encoding array 504.

In the position information encoding array 504, information on the position held by the user is set.

For example, the position information encoding array 504 is composed of an executive class flag 701 that indicates that the user holds a position in the executive class, an office manager class flag 702 that indicates that the user holds a position in the office manager class, a division manager class flag 703, a section manager class flag 704, and a unit manager class flag 705, which are similar to the above flags, and a staff member class flag 706 that indicates that the user holds no position.

As methods for setting the flags of the position information encoding array 504, two types of examples will be indicated here.

In a first example of setting, when a user secret key is generated, a value "1" is set in the flag of a position held and "*" is set in the flag of a position not held. When encrypted data is generated, a value "1" is set in the flag of a position that is allowed access and random numbers R that are mutually different are set respectively in the flags of positions that are not allowed access. In this case, with regard to the position information encoding array 504, the user secret key and the encrypted data are compared by the AND test, which determines whether a match occurs in all elements. Only if the test result is true, retrieval is possible.

FIG. 12 is a figure illustrating an example of setting of the position information encoding array 504 in the first example of setting.

For example, for a user secret key owned by a section manager, a value "1" is set in the section manager class flag 704 and "*" is set in the other flags, as indicated in a position information encoding array 1. In contrast, for a user secret key owned by a unit manager, a value "1" is set in the unit manager class flag 705 and "*" is set in the other flags, as indicated in a position information encoding array 2.

For encrypted data that can be retrieved by a division manager and a section manager, an attribute like a position information encoding array 3 is set. That is, a value "1" is set in the division manager flag and the section manager flag, and random numbers R that are mutually different are set respectively in the other flags. If this encrypted data and the above user secret key of the section manager are compared, a match occurs in all elements, so that the result of the AND test is true and retrieval can be performed with the user secret key of the section manager. In contrast, with the above user secret key of the unit manager, there is a difference in the values of the unit manager class flag 705, "1" and the random number "R", so that the test result is false and retrieval is not possible.

For encrypted data that can be retrieved by all of a division manager, a section manager, a unit manager, and a staff member, an attribute as indicated in a position information encoding array 4 is set. In this case, with either the above user secret key of the section manager or the above user secret key of the unit manager, a match occurs in all elements, so that the result of the AND test is true and retrieval is possible.

In a second example of setting, when a user secret key is generated, a value "1" is set in the flag of each position held, and random numbers R that are mutually different are set respectively in the flags of positions not held. When encrypted data is generated, a value "1" is set in the flag of each position that is allowed access, and random numbers R that are mutually different are respectively set in the flags of positions that are not allowed access. In this case, with regard to the position information encoding array 504, the user secret key and the encrypted data are compared by the OR test, which requires only one of elements to match, and retrieval is possible only if the test result is true.

FIG. 13 is a figure illustrating an example of setting of the position information encoding array 504 in the second example of setting.

For example, for a user secret key owned by a section manager, a value "1" is set in the section manager class flag 704 and random numbers R that are mutually different are set respectively in the other flags, as indicated in a position information encoding array 5. In contrast, for a user secret key of a user who holds the positions of both a division manager and a section manager, a value "1" is set in the division manager class flag 703 and the section manager class flag 704, and random numbers R that are mutually different are respectively set in the other flags.

For encrypted data that can be retrieved by a section manager, a value "1" is set in the section manager flag and random numbers R that are mutually different are respectively set in the other flags, as indicated in a position information encoding array 7. If this encrypted data and the above user secret key of the section manager are compared, a match occurs in the section manager class flag 704, so that the result of the OR test is true and retrieval can be performed with the user secret key of the section manager. This also applies to the above user secret key of both the division manager and the section manager.

In contrast, for encrypted data that can be retrieved by a division manager, an attribute as indicated in a position information encoding array 8 is set. In this case, with the above user secret key of both the division manager and the section manager, a match of a value "1" occurs in the division manager class flag 703, so that retrieval is possible. In contrast, with the above user secret key of the section manager, a match occurs in none of the elements, so that the result of the OR test is false and retrieval is not possible.

Although all the random numbers in the figure are denoted by R, a different random number is assigned to each of them, so that the probability of a match is extremely small and negligible.

The category encoding array 505 will be described.

Figure 14:
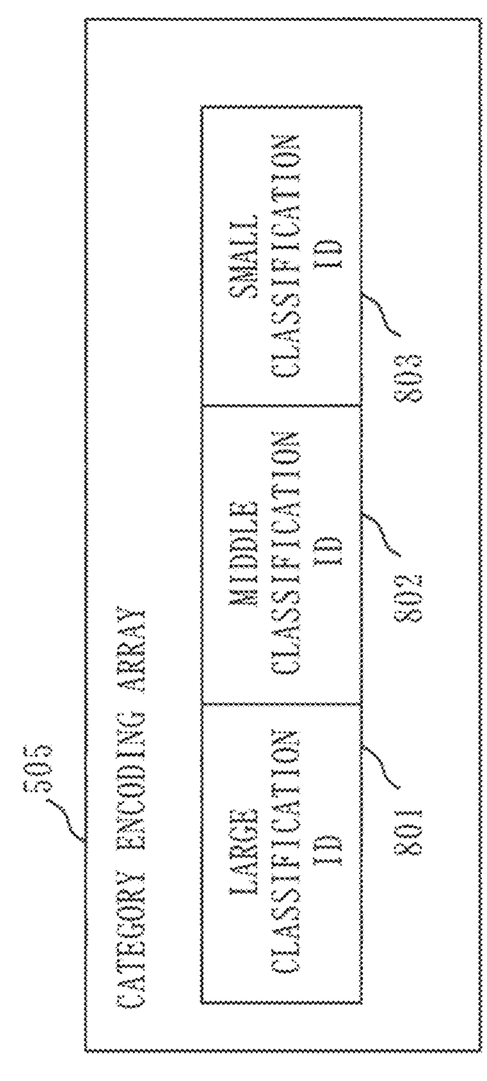
FIG. 14 is a figure illustrating an example of a configuration of a category encoding array 505.

FIG. 14 is a figure illustrating an example of a configuration of the category encoding array 505.

The category encoding array 505 is used to limit the genres of documents that can be retrieved.

For example, the category encoding array 505 is composed of a large classification ID 801 that indicates a large classification, a middle classification ID 802 that indicates a middle classification, and a small classification ID 803 that indicates a small classification.

With regard to the category encoding array 505, a user secret key and encrypted data are compared by the AND test, which checks whether a match occurs in all elements.

FIG. 15 is a figure illustrating an example of setting of the category encoding array 505.

For example, for a user who is allowed to access all pieces of data, "*" is set in all the IDs for a user secret key, as indicated in a category encoding array 1. In contrast, for a user who is allowed to access only data related to Development A, "Development A" is set in the large classification ID 801 for a user secret key, as indicated in a category encoding array 2.

When encrypted data is generated, values are set to specify all the classifications. For example, for external specifications of Development A, the attribute is set for the encrypted data, for example, as indicated in a category encoding array 3. In this case, with either the above user secret key of the category encoding array 1 or the above user secret key of the category encoding array 2, a match occurs in all elements, so that the result of the AND test is true and retrieval is possible. As indicated in a category encoding array 4, if a classification indicating a budget plan for personnel expenses for year 2009 is set, with the user secret key of the category encoding array 1, the result of the AND test is true and retrieval is possible. However, with the user secret key of the category encoding array 2, the value of the large classification is different, so that the result of the AND test is false and retrieval is not possible.

The confidentiality level encoding array 506 will be described.

Figure 16:
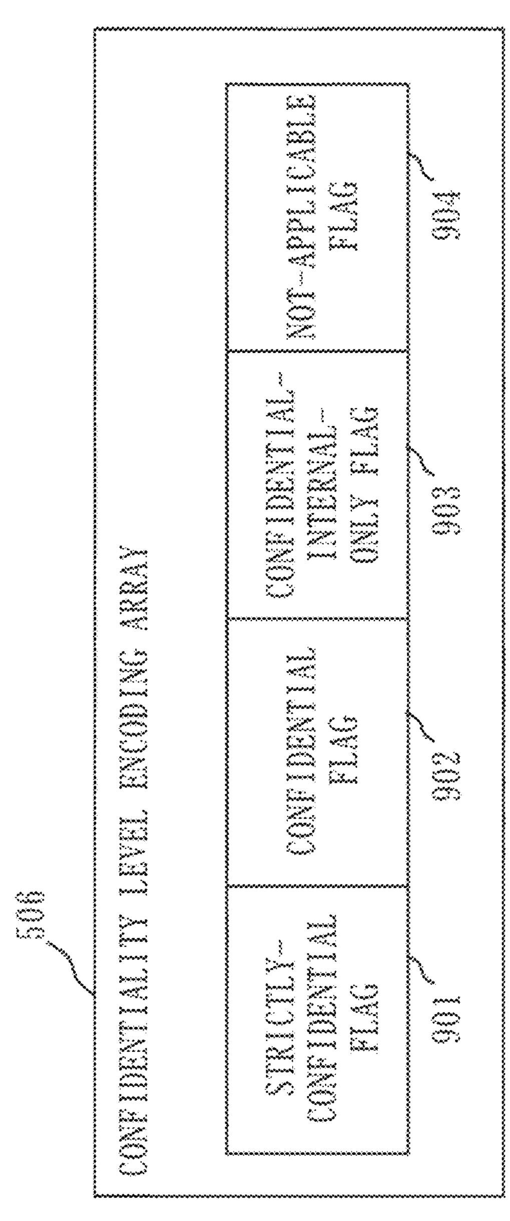
FIG. 16 is a figure illustrating an example of a configuration of a confidentiality level encoding array 506.

FIG. 16 is a figure illustrating an example of a configuration of the confidentiality level encoding array 506.

The confidentiality level encoding array 506 is used to limit the confidentiality level of documents that can be retrieved.

For example, it is composed of a strictly-confidential flag 901 that indicates strictly confidential data, a confidential flag 902 that indicates confidential data, a confidential-internal-only flag 903 that indicates confidential data for internal use only, and a not-applicable flag 904 that indicates that none of the confidentiality levels apply.

As methods for setting the flags of the confidentiality level encoding array 506, two types of examples will be indicated.

In a first example of setting, when a user secret key is generated, a value "1" is set in the flag corresponding to a searchable confidentiality grade, and random numbers R that are mutually different are respectively set in the flags corresponding to non-searchable confidentiality grades. When encrypted data is generated, a value "1" is set in the flag corresponding to the confidentiality grade of the data, and "*" is set in a flag that does not correspond to the confidentiality grade of the data. The user secret key and the encrypted data are compared by the AND test, which determines whether a match occurs in all elements, and retrieval is possible only if the test result is true.

FIG. 17 is a figure illustrating an example of setting of the confidentiality level encoding array 506 in the first example of setting.

For example, for a user secret key that can access data of confidentiality levels lower than strictly confidential, a value "1" is set in the confidential flag 902, the confidential-internal-only flag 903, and the not-applicable flag 904 and a random number R is set in the strictly-confidential flag 901, as indicated in a confidentiality level encoding array 1. In contrast, for a user secret key that can access data of all the confidentiality grades, a value "1" is set in all the flags, as indicated in a confidentiality level encoding array 2.

When encrypted data is generated. "1" is set in the flag corresponding to the confidentiality grade of the data and "*" is set in the other flags. For example, when confidential data is encrypted, a value "1" is set in the confidential flag 902 and "*" is set in the other flags, as indicated in a confidentiality level encoding array 3. In this case, if the AND test is performed with the above user secret key in which the confidentiality level encoding array 1 that allows access to data with a confidentiality level lower than strictly confidential is set, a match occurs in all elements, so that the result is true and retrieval is possible. Similarly, also if the AND test is performed with the above user secret key in which the confidentiality level encoding array 2 that allows access to data of all confidentiality grades is set, a match occurs in all elements, so that the result is true and retrieval is possible.

In contrast, when strictly confidential data is encrypted, a value "1" is set in the strictly-confidential flag 901 and "*" is set in the other flags, as indicated in a confidentiality level encoding array 4. In this case, if the AND test is performed with the above user secret key in which the confidentiality level encoding array 1 that allows access to data of a confidentiality level lower than strictly confidential is set, there is a difference in the value of the strictly-confidential flag 901, so that the result is false and retrieval cannot be performed. However, if the AND test is performed with the above user secret key in which the confidentiality level encoding array 2 that allows access to data of all confidentiality grades is set, a match occurs in all elements, so that the result is true and retrieval is possible.

As a second example of setting, when a user secret key is generated, a value "1" is set in the flag corresponding to a searchable confidentiality grade, and random numbers R that are mutually different are respectively set in the flags corresponding to non-searchable confidentiality grades. When encrypted data is generated, a value "1" is set in the flag corresponding to the confidentiality grade of the data, and random numbers R that are mutually different are set respectively in the flags not corresponding to the confidentiality grade of the data. The user secret key and the encrypted data are compared by the OR test, which requires a match in only one of elements, and retrieval is possible only if the test result is true.

FIG. 18 is a figure illustrating an example of setting of the confidentiality level encoding array 506 in the second example of setting.

An example of setting of the confidentiality level encoding array to be included in a user secret key is substantially the same as the cases indicated in FIG. 17, and thus description will be omitted.

When encrypted data is generated, a value "1" is set in the flag corresponding to the confidentiality grade of the data, and random numbers R that are mutually different are set respectively in the other flags. For example, when confidential data is encrypted, a value "1" is set in the confidential flag 902 and random numbers R that are mutually different are set in the other flags, as indicated in a confidentiality level encoding array 5. In this case, if the OR test is performed with the above user secret key in which the confidentiality level encoding array 1 that allows access to data of a confidentiality level lower than strictly confidential is set, a match occurs in the value of the confidential flag 902, so that the result is true and retrieval is possible. Similarly, also if the OR test is performed with the above user secret key in which the confidentiality level encoding array 2 that allows access to data of all confidentiality grades is set, a match occurs in the value of the confidential flag 902, so that the result is true and retrieval is possible.

When strictly confidential data is encrypted, a value "1" is set in the strictly-confidential flag 901 and random numbers R that are mutually different are set respectively in the other flags, as indicated in a confidentiality level encoding array 6. In this case, if the OR test is performed with the above user secret key in which the confidentiality level encoding array 1 that allows access to data of a confidentiality level lower than strictly confidential is set, there are differences in the values of all flags, so that the result is false and retrieval cannot be performed. However, if the OR test is performed with the above user secret key in which the confidentiality level encoding array 2 that allows access to data of all confidentiality grades is set, a match occurs in the value of the strictly-confidential flag, so that the result is true and retrieval is possible.

The search word encoding array 511 will be described.

The search word encoding array 511 is a field that is set when a search for data is performed, and an appropriate structure needs to be set according to the structure of data managed by the company. For example, if data is managed in a structured manner like a database, the search word encoding array needs also to be structured accordingly in order to verify whether a keyword match occurs for each column. In contrast, if general documents are considered, data is not structured, so that it is necessary to devise an encoding array that has no influence on the order of keywords. For simplicity, an example of setting in a case where data is managed in a structured manner will be described here.

FIG. 19 is a figure illustrating a setting example 1 of the search word encoding array 511. FIG. 19 is an example of setting assuming a case where an AND search of keywords is performed on a database that manages a history of purchasing and disposing of goods.

When data is encrypted, data of each element stored in the database is set in the search word encoding array 511. For example, if data of a case where three PCs were purchased at 100,000 yen per PC on Oct. 5, 2009 is stored in row 1 of the database. in the database search word encoding array 511 each element of the encoding array is set to correspond with each column of the database, as indicated a search word encoding array 1. Similarly, if data of a case where two PCs were purchased at 80,000 yen per PC on Nov. 10, 2009 is stored in row 2 of the database, the encoding array of the search word encoding array 511 is configured as indicated in a search word encoding array 2. Similarly, if data of a case where one PC was disposed of on Jan. 15, 2010 is stored in row 3 of the database, the encoding array of the search word encoding array 511 is configured as indicated in a search word encoding array 3. Note that an element of the database that is empty (not set) is represented as "–", as indicated in column 7 of a search word encoding array 3.

When a user secret key is generated, in order to make every column searchable, "*" is set in each of all elements in the search word encoding array 511 corresponding to each column, as indicated in a search word encoding array 4.

When a trapdoor is generated, if the user specifies, as keywords to be searched for, that a history of purchasing PCs in 2009 is needed, the search word encoding array 511 is set as indicated in a search word encoding array 5. The search word encoding array 5 is generated when a trapdoor is generated based on a user secret key. By performing the AND test on each element of the search word encoding array 5 and each element of each of the search word encoding array 1 and the search word encoding array 2, a match occurs in all elements, so that the test result is true and retrieval is possible. This means that if a search is performed on the encrypted data using the trapdoor, it is found as a hit in the search. In contrast, if the AND test is performed on each element of the search word encoding array 5 and each element of the search word encoding array 3, the elements in column 8 are different, so that the test result is false. This means that if a search is performed on the encrypted data using the trapdoor, it is not found as a hit in the search. That is, a record of disposal of a PC is not retrieved.

As described above, the attribute information encoding array 501 includes various types of encoding arrays.

For example, like the belonging information encoding array 503, there is an encoding array in which each item of the encoding array is assigned an attribute item in which a user attribute is set. In the belonging information encoding array 503, each item of the encoding array is assigned an attribute item such as the company ID 601, the office ID 602, or the like. Then, for example, attribute information indicating a company is set in the company ID 601.

For example, like the position information encoding array 504, there is an encoding array in which each item of the encoding array is assigned a user attribute. In the position information encoding array 504, each item of the encoding array is assigned a user attribute such as the executive class flag 701 that indicates an executive officer, the office manager class flag 702 that indicates an office manager, or the like. Then, in the flag of the position of the user, a value "1" is set to indicate that the flag corresponds to the position of the user.

For example, like the confidentiality level encoding array 506, there is an encoding array in which each item of the encoding array is assigned an attribute of data to be encrypted. In the confidentiality level encoding array 506, an attribute of data such as the strictly-confidential flag 901 that indicates strictly confidential data is assigned. Then, in the flag of the confidentiality level of the data, a value "1" is set to indicate that the flag corresponds to the confidentiality level of the data.

The encoding information generating unit 206 of the key management server 201 and the encoding information generating unit 306 of the access terminal 301 change how to assign codes depending on the type of each encoding array in the attribute information encoding array 501.

For an encoding array in which attribute items are assigned, the encoding information generating unit 206 of the key management server 201 sets, in each item of the encoding array, attribute information that indicates an attribute of the user who uses the user secret key and corresponds to the attribute item assigned to that item. The encoding information generating unit 206 generates encoding information by setting "*" in an item of the encoding array in which attribute information is not set.

In this case, the encoding information generating unit 306 of the access terminal 301 sets, in each item of the encoding array, attribute information that limits users who can retrieve the encrypted data and corresponds to the attribute item assigned to that item. The encoding information generating unit 306 sets "*" in an item of the encoding array in which attribute information is not set.

Then, the user secret key and the encrypted data are compared by the AND test.

For encoding array in which each item of the encoding array is assigned a user attribute, the encoding information generating unit 206 of the key management server 201 sets a correspondence value "1" in an item to which an attribute corresponding to the attribute of the user who uses the user secret key is assigned. If the user secret key and the encrypted data are compared by the AND test, the encoding information generating unit 206 sets "*" in an item of the encoding array in which the correspondence value "1" is not set. If the user secret key and the encrypted data are compared by the OR test, the encoding information generating unit 206 sets a random number R in an item of the encoding array in which the correspondence value "1" is not set.

In this case, the encoding information generating unit 306 of the access terminal 301 sets the correspondence value "1" in each item of the encoding array in which an attribute corresponding to the attribute of the user who is allowed to retrieve the encrypted data is assigned. The encoding information generating unit 306 sets a random number R in an item of the encoding array in which the correspondence value "1" is not set.

For an encoding array in which each item of the encoding array is assigned an attribute of data to be encrypted, the encoding information generating unit 206 of the key management server 201 sets the correspondence value "1" in an item that is assigned an attribute corresponding to the attribute (privilege) of the user who uses the user secret key. The encoding information generating unit 206 sets a random number R in an item of the encoding array in which the correspondence value "1" is not set.

In this case, the encoding information generating unit 306 of the access terminal 301 sets the correspondence value "1" in an item that is assigned an attribute corresponding to the attribute of the data. If the user secret key and the encrypted data are compared by the AND test, the encoding information generating unit 306 sets "*" in an item of the encoding array in which the correspondence value "1" is not set. If the user secret key and the encrypted data are compared by the OR test, the encoding information generating unit 306 sets a random number R in an item of the encoding array in which the correspondence value "1" is not set.

Although not included in the attribute information encoding array 501 described above, there is an encoding array in which each item of the encoding array is assigned an attribute item in which an attribute of data to be encrypted is set. For example, a case is assumed where an ID of the confidentiality level is set in the confidentiality level encoding array 506, instead of a flag being assigned to each confidentiality level.

In this case, the encoding information generating unit 206 of the key management server 201 sets attribute information that indicates an attribute (privilege) of the user who uses the user secret key and corresponds to the attribute item assigned to that item. The encoding information generating unit 206 generates encoding information by setting "*" in an item of the encoding array in which attribute information is not set.

In this case, the encoding information generating unit 306 of the access terminal 301 sets, in each item of the encoding array, attribute information that indicates an attribute of data and corresponds to an attribute item assigned to that item. The encoding information generating unit 306 sets "*" in an item of the encoding array in which attribute information is not set.

Then, the user secret key and the encrypted data are compared by the AND test.

Next, a vectorization method will be described by which encoding information generated using the attribute information encoding array 501 described above is converted to a predicate vector in a user secret key or an attribute vector in encrypted data. That is, a method by which the vector generating unit 207 of the key management server 201 generates a predicate vector based on encoding information will be described, and a method by which the vector generating unit 307 of the access terminal 301 generates an attribute vector or a predicate vector based on encoding information will be described.

A vectorization method will be indicated separately for each of a case where the AND test is performed and a case where the OR test is performed. However, in the actual attribute information encoding array 501, the AND test or the OR test is optionally selected for each encoding array. Therefore, created encoding information may include portions that are compared by the AND test and portions that are compared by the OR test. That is, there may be a case where the test method differs depending on each encoding array in the attribute information encoding array 501. For example the belonging information encoding array 503 may be compared by the AND test, and the position information encoding array 504 may be compared by the OR test. In this case, an attribute vector and a predicate vector may be generated using a vectorization method for comparison by the AND test for a portion of encoding information to be compared by the AND test, and using a vectorization method for comparison by the OR test for a portion to be compared by the OR test.

FIG. 20 is a figure describing a vectorization method for the case where the encoding arrays in the attribute information encoding array 501 are compared by the AND test.

The basic concept will be described based on the following Polynomial 1.

$$r_1(b_1 - a_1) - r_2(b_2 - a_2) + r_3(b_3 - a_3) \quad \text{(Polynomial 1)}$$

Polynomial 1 is a polynomial composed of random numbers $r_1$, $r_2$, and $r_a$ and values $a_1$, $a_2$, $a_3$, $b_1$, $b_2$, and $b_3$. The value of this polynomial is always 0 regardless of the random numbers $r_1$, $r_2$, and $r_3$ if all of $b_1=a_1$, $b_2=a_2$, and $b_3=a_3$ hold. That is, the value of this polynomial is always 0 regardless of the random numbers $r_1$, $r_2$, and $r_3$ if $b_1=a_1$ AND $b_2=a_2$ AND $b_3=a_3$ holds.

The values $a_1$, $a_2$, and $a_3$ are considered as elements of an encoding array in creating encrypted data, and the values $b_1$, $b_2$, and $b_3$ are considered as elements of an encoding array to be included in a secret key. In this case, if an inner product can be used to determine whether the result of evaluating Polynomial 1 is 0, then it can be stated that an inner product can be used to determine whether $b_1=a_1$ AND $b_2=a_2$ AND $b_3=a_3$ holds.

Therefore, an attribute vector is generated based on the values $a_1$, $a_2$, and $a_3$, which are the elements of an encoding array, and a predicate vector is generated based on the values $b_1$, $b_2$, and $b_3$, which are the elements of an encoding array, as described below.

When an attribute vector is created, two elements that are a value "1" and a "$-a_i$" are generated for an i-th element, and a result of sequentially arranging this for all elements is an attribute vector x. That is, the attribute vector x is as indicated in FIG. 20. Note that if the element $a_i$ of the encoding array is a numerical value, it is used directly. However, if the element $a_i$ of the encoding array is a character string, a value obtained by converting it into a numerical value is used. As a special example, if the element $a_i$ of the encoding array is "*", two elements that are 0 and 0 are set in the element of the attribute vector corresponding to the element $a_i$ of the encoding array.

When a predicate vector is created, two elements that are a value "$b_i$" and a value "1" are generated for an i-th element, and a result of sequentially arranging this for all elements is a predicate vector v. That is, the predicate vector v is as indicated in FIG. 20. Note that if the element $b_i$ of the encoding array is a numerical value, it is used directly. However, if the element $b_i$ of the encoding array is a character string, a value obtained by converting it into a numerical value is used. As a special example, if the element bi of the encoding array is "*", two elements that are 0 and 0 are set in the element of the predicate vector corresponding to the element $b_i$ of the encoding array.

That is, the attribute vector $\vec{x}=(1, -a_1, 1, -a_2, 1, -a_3)$, and the predicate vector $\vec{v}=(b_1, 1, b_2, 1, b_3, 1)$.

Note that the negative signs may be interchanged between the element $a_i$ of the attribute vector x and the element $b_i$ of the predicate vector v so that the attribute vector $\vec{x}=(1, a_1, 1, a_2, 1, a_3)$ and the predicate vector $\vec{v}=(-b_1, 1, -b_2, 1, -b_3, 1)$.

The random numbers $r_1$, $r_2$, and $r_3$ are multiplied in Polynomial 1, but no random numbers are multiplied in the above vectorization. This is because random numbers are multiplied in encryption using predicate encryption for inner products supporting revocation, so that random numbers are not required in the vectorization. If random numbers are not multiplied in encryption in predicate encryption for inner products to be used, each element may be multiplied by a random number in the vectorization.

In the case of the AND test, each of elements $a_1$, $a_2$, $a_3$, $b_1$, $b_2$, and $b_3$ can be vectorized as an independent element, so that an attribute ID to be described later is assigned to each element in an AND-test encoding array.

Figure 21:
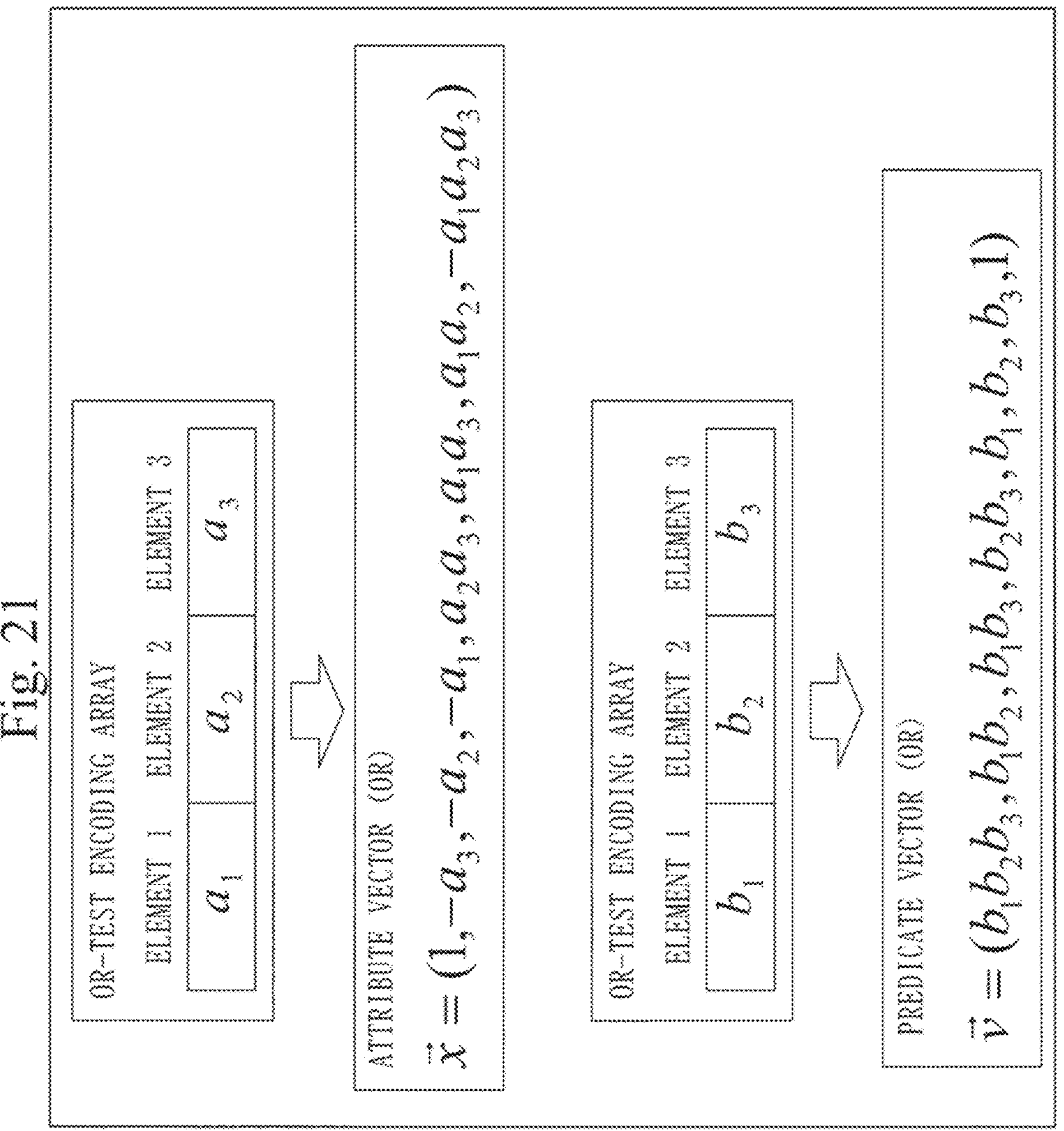
FIG. 21 is a figure describing a vectorization method in a case where encoding arrays in the attribute information encoding array 501 are compared by an OR test.

FIG. 21 is a figure describing a vectorization method for the case where the encoding arrays in the attribute information encoding array 501 are compared by the OR test. FIG. 21 illustrates an example of vectorization where three pairs of elements are compared and only one of the pairs needs to match, in order to prevent the example from becoming complicated. Note that substantially the same procedure can be used also for n pairs of elements in general.

The basic concept will be described based on Polynomial 2 below.

$$(b_1-a_1)(b_2-a_2)(b_3-a_3)=b_1b_2b_3-a_3b_1b_2-a_2b_1b_3-a_1b_2b_3+a_2a_3b_1+a_1a_3b_2+a_1a_2b_3-a_1a_2a_3 \quad \text{(Polynomial 2)}$$

Polynomial 2 is a polynomial with three variables, and the value of this polynomial is 0 if at least one of $b_1=a_1$, $b_2=a_2$, and $b_3=a_3$ holds. That is, the value of this polynomial is 0 if $b_1=a_1$ OR $b_2=a_2$ OR $b_3=a_3$ holds.

The values $a_1$, $a_2$, and $a_3$ are considered as elements of an encoding array in creating encrypted data, and the values $b_1$, $b_2$, and $b_3$ are considered as elements of an encoding array to be included in a secret key. In this case, if an inner product can be used to determine whether the result of evaluating Polynomial 2 is 0, then it can be stated that an inner product can be used to determine whether $b_1=a_1$ OR $b_2=a_2$ OR $b_3=a_3$ holds.

Therefore, an attribute vector is generated based on the values $a_1$, $a_2$, and $a_3$, which are elements of an encoding array, and a predicate vector is generated based on the values $b_1$, $b_2$, and $b_3$, which are elements of an encoding array, as described below.

When an attribute vector is generated, only each term of Polynomial 2 that concerns the values $a_1$, $a_2$, and $a_3$, which are elements of the encoding array in generating encrypted data, are extracted and vectorized. For example, the first term is $b_1b_2b_3$ and includes no information concerning the elements $a_1$, $a_2$, and $a_3$, so that the first element of the vector is set as 1. The second term is $-a_3b_1b_2$, and $-a_s$ is extracted as information concerning the elements $a_1$, $a_2$, and $a_3$ and is set as the second element of the vector. Similarly, by repeating the above operation for all the terms, the attribute vector x indicated in FIG. 21 is obtained. Note that if any element of the encoding array is "*", the OR test will always be true. Therefore, if any element of the encoding array is "*", the attribute vector corresponding to the encoding array is generated as a 0 vector in which all elements are 0.

A predicate vector can also be constructed using substantially the same procedure. However, a difference is that attention is focused on the values $b_1$, $b_2$, and $b_3$ instead of the values $a_1$, $a_2$, and $a_3$. For example, the first term is $b_1b_2b_3$, and $b_1b_2b_3$ is extracted as information concerning the elements $b_1$, $b_2$, and $b_3$ and is set as the first element of the vector. The second term is $-a_3b_1b_2$, and $b_1b_2$ is extracted as information concerning the elements $b_1$, $b_2$, and $b_3$ and is set as the second element of the vector. Note that if negative values are set in generating the attribute vector, positive values are set here. Similarly, by repeating the above operation for all the terms, the predicate vector indicated in FIG. 21 is obtained. Note that if negative values are set in generating the attribute vector, positive values are set here. If any element of the encoding array is "*", the OR test will always be true. Therefore, if any element of the encoding array is "*", the predicate vector corresponding to the encoding array is generated as a 0 vector in which all elements are 0.

In the case of the OR test, the elements $a_1$, $a_2$, $a_3$, $b_1$, $b_2$, and $b_3$ are vectorized by being closely associated with one another, so that one attribute ID to be described later is assigned to an OR-test encoding array on which the OR test is performed. In the above description, separate ideas are presented for the AND test and the OR test. However, a case where the AND test and the OR test are combined can be realized by combining the above methods to create an attribute vector and a predicate vector. For example, if the AND test is performed for the belonging information encoding array 503 and the OR test is performed for the position information encoding array 504, an attribute vector and a predicate vector for the belonging information encoding array 503 may be generated using the above method for the AND test, and an attribute vector and a predicate vector for the position information encoding array 504 may generated using the above method for the OR test.

4. Operation of the Searchable Encryption System 100

The operation of the searchable encryption system 100 will be described.

In the following description, a case will be described where predicate encryption for inner products supporting revocation described above is used as predicate encryption for inner products. The configuration of encrypted data is as indicated in FIG. 5, and the flows of data are as indicated in FIG. 6.

The operation of the searchable encryption system 100 is divided into five sections: (1) system initial setting, (2) user secret key generation. (3) encrypted data generation, (4) keyword search, and (5) search privilege revocation.

(1) system initial setting is a process in which the key management server 201 generates public parameters and a master key. (2) user secret key generation is a process in which the key management server 201 generates a user secret key based on the master key. (3) encrypted data generation is a process in which mainly a user encrypts data using the access terminal 301 and stores it in the data center 401. (4) keyword search is a process in which mainly a user uses the access terminal 301 to search for encrypted data stored in the data center 401 using a keyword to be searched for and obtains data. (5) search privilege revocation is a process in which in order to disable a search using a user secret key to be revoked, the data center 401 deletes a search auxiliary key corresponding to this user secret key.

Each section of the operation will be described below based on flowcharts.

FIG. 22 is a flowchart illustrating a flow of the process of (1) system initial setting.

Figure 23:
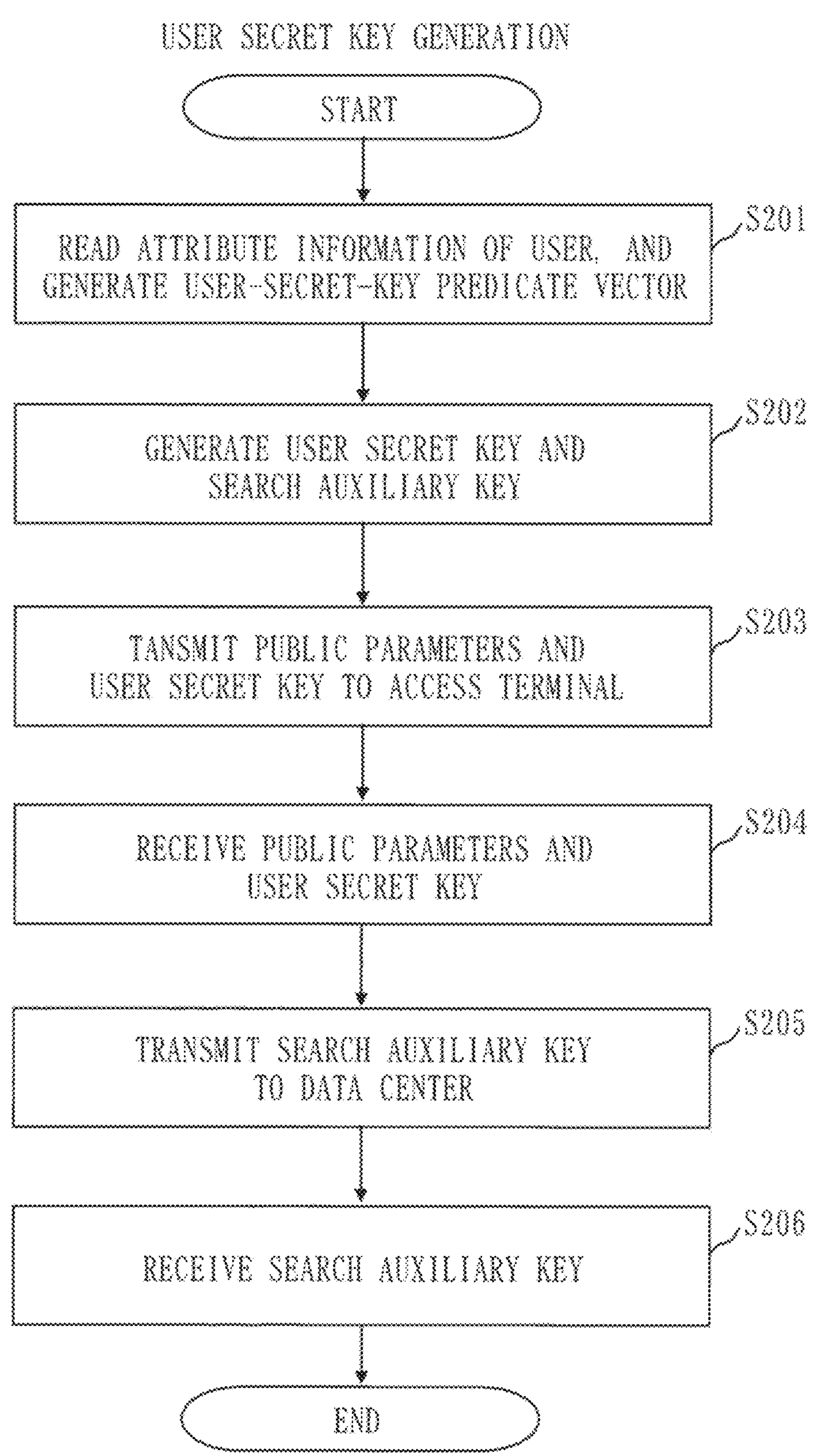
FIG. 23 is a flowchart illustrating a flow of a process of (2) user secret key generation.

FIG. 23 is a flowchart illustrating a flow of the process of (2) user secret key generation.

FIG. 24 is a flowchart illustrating a flow of the process of (3) encrypted data generation.

Figure 25:
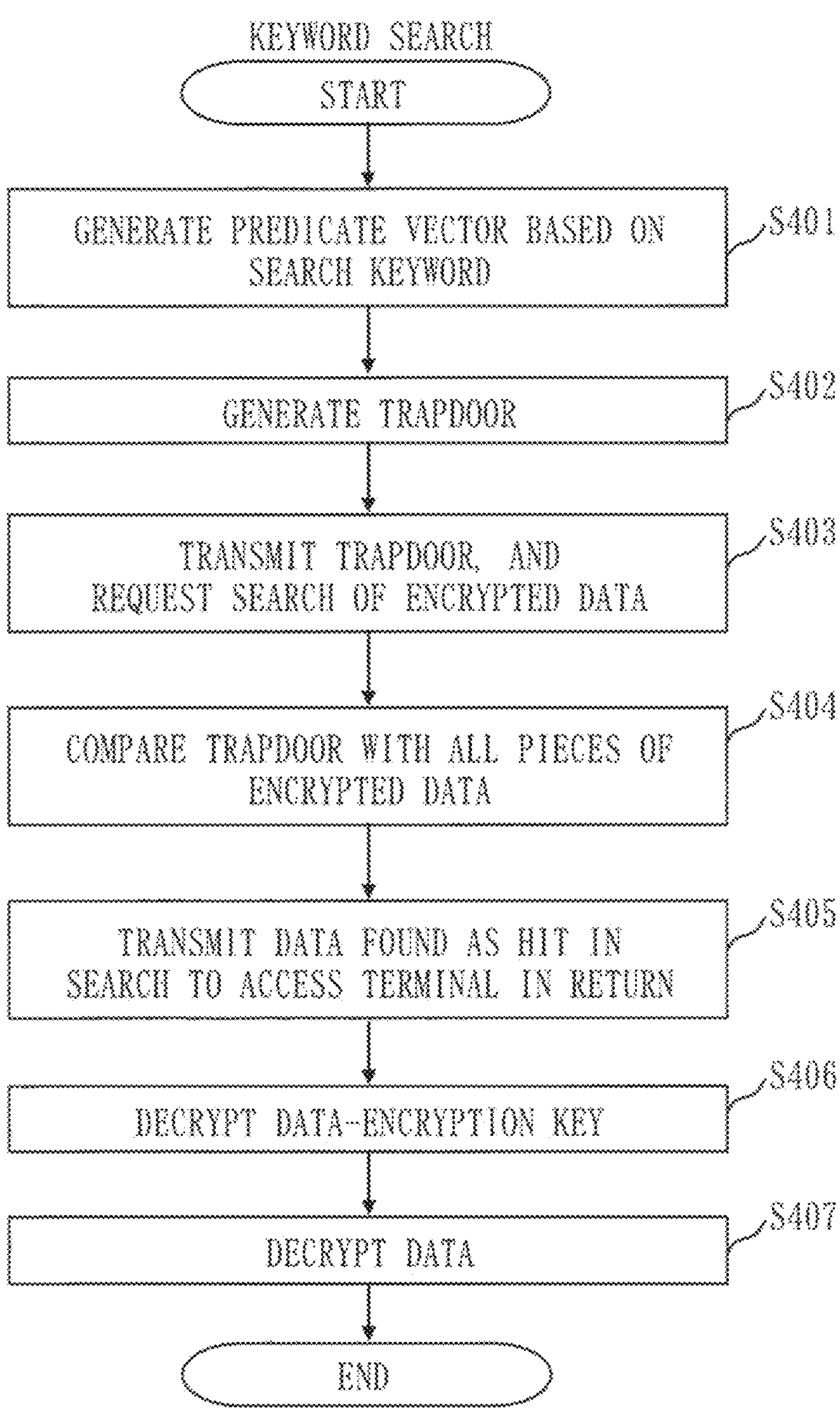
FIG. 25 is a flowchart illustrating a flow of a process of (4) keyword search.

FIG. 25 is a flowchart illustrating a flow of the process of (4) keyword search.

Figure 26:
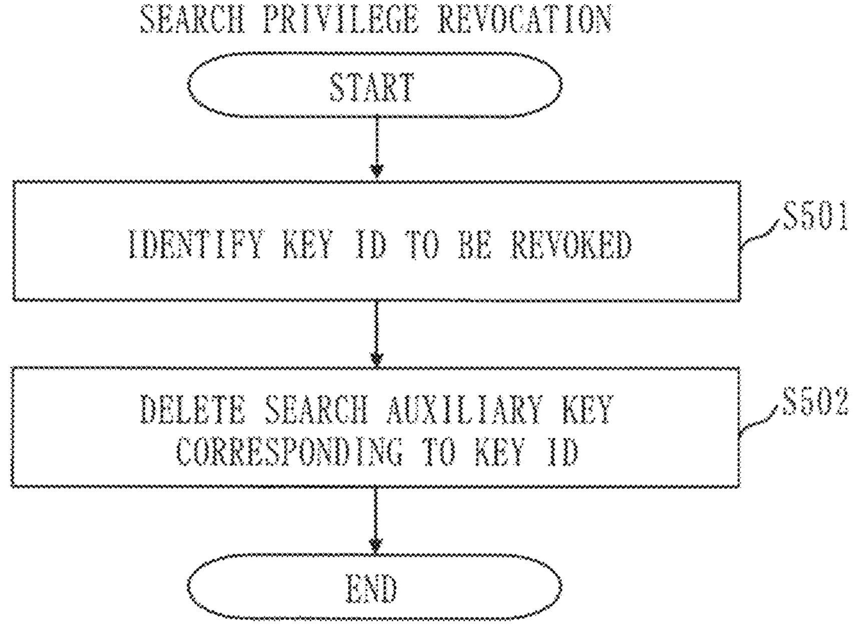
FIG. 26 is a flowchart illustrating a flow of a process of (5) search privilege revocation.

FIG. 26 is a flowchart illustrating a flow of the process of (5) search privilege revocation.

Based on FIG. 22, the process of (1) system initial setting will be described.

(1) system initial setting is the process performed in the key management server 201.

S101

The encoding information generating unit 206 determines a structure of the attribute information encoding array 501 to be used in the system, lengths of encoding arrays that are its elements, rules for values to be stored, a comparison method, and a method for mapping to an attribute vector and a predicate vector. For example, the encoding information generating unit 206 determines the above items by causing an administrator or the like who sets up the key management server 201 to input the above items from an input device.

An example of the configuration of the attribute information encoding array 501 is as described above. However, depending on the application, there may be a case where, for example, control based only on organizational information is sufficient and control based on the position, the type of data, or the like is not necessary. Therefore, the encoding information generating unit 206 determines the attribute information encoding array 501 to be used in the searchable encryption system 100 by causing only necessary items to be selected from, added to, or changed in the attribute information encoding array 501 indicated in FIG. 7, for example.

In this example, it is assumed that the structure of the attribute information encoding array 501 is determined as indicated in a system common attribute encoding array illustrated in FIG. 27.

It is also assumed that the individual ID, the belonging information encoding array, the position information encoding array, the category encoding array, the confidentiality level encoding array, and the search word encoding array are all compared using the AND test.

Furthermore, AID is assigned as an attribute ID to each element of the minimum unit of mapping to an attribute vector and a predicate vector, and BI is assigned as an index number to each corresponding element of the attribute vector and the predicate vector.

How attribute IDs are assigned differs depending on whether the AND test or the OR test is used. How attribute IDs are assigned in each test method is as stated in the description of vectorization for each test method described based on FIGS. 20 and 21. The maximum value of the index number BI is n.

Figure 28:
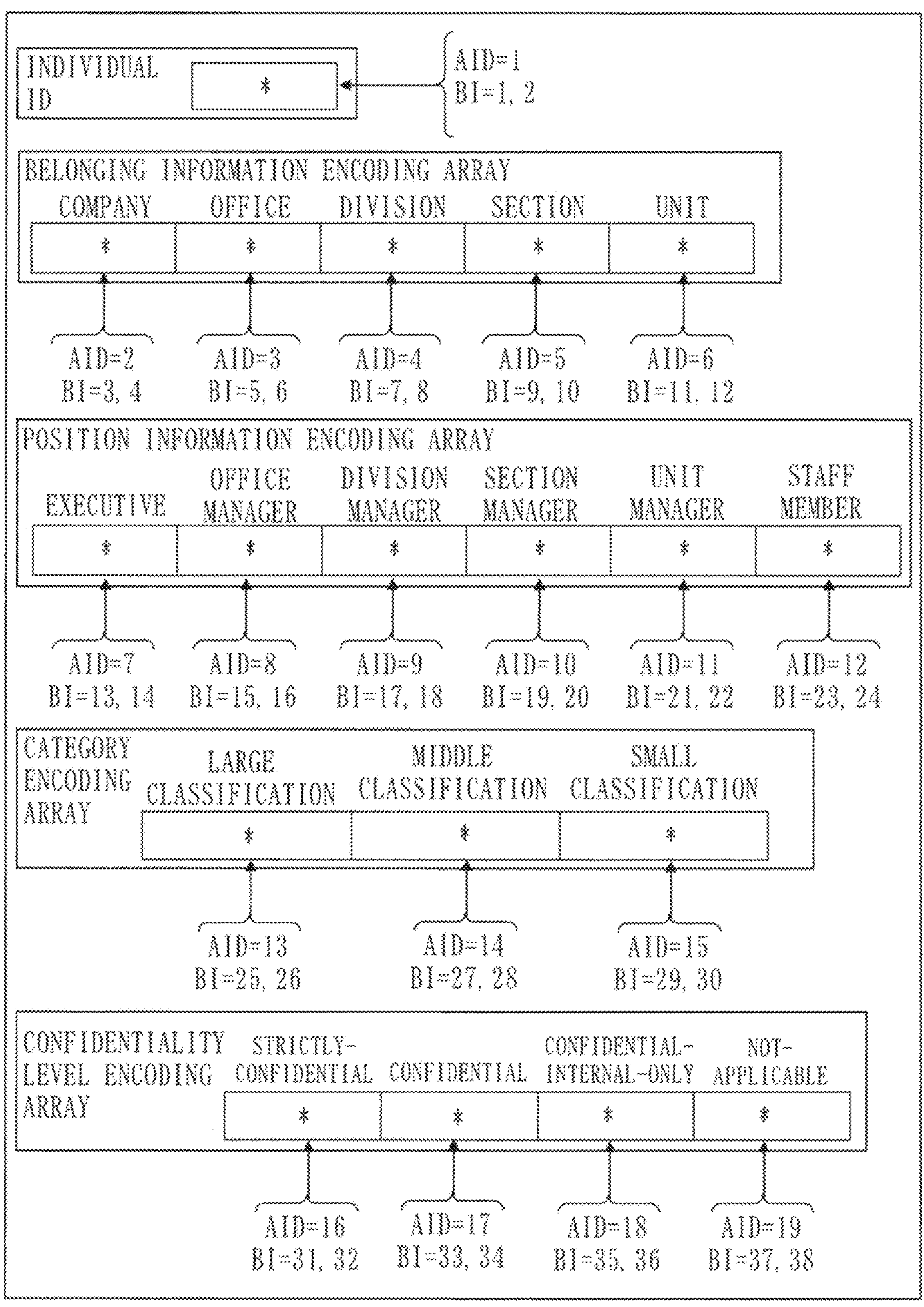
FIG. 28 is a figure illustrating an example of assignment of AIDs, which are attribute IDs for the AND test, and assignment of index number BIs.
Figure 29:
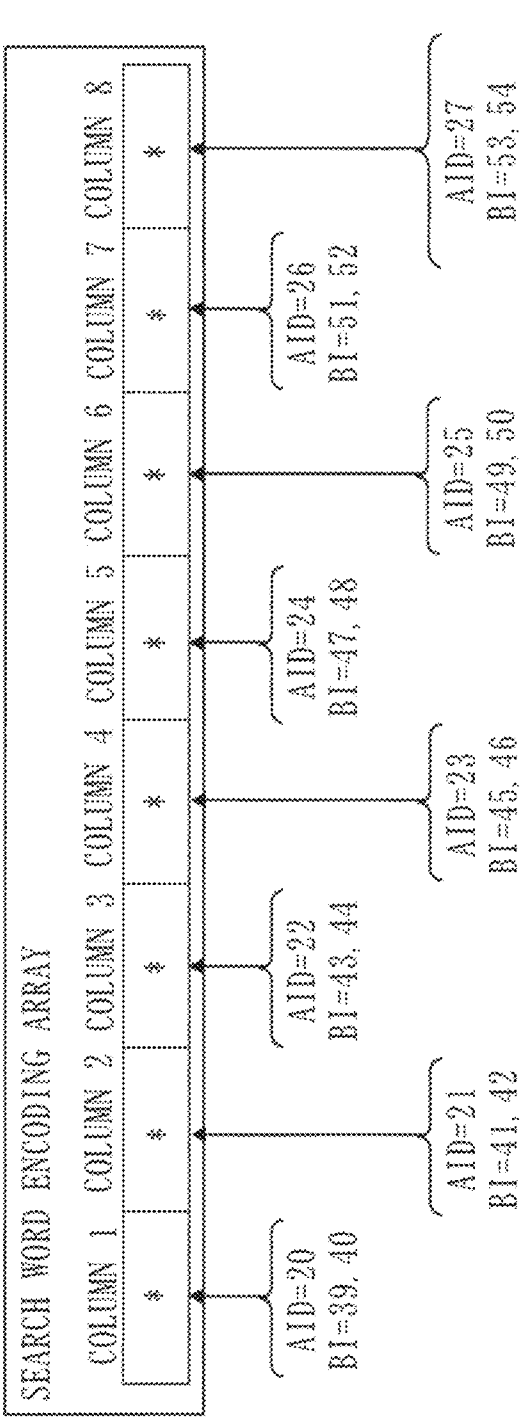
FIG. 29 is a figure illustrating an example of assignment of AIDs, which are attribute IDs for the AND test, and assignment of index number BIs.

FIGS. 28 and 29 are figures illustrating an example of assigning AIDs, which are attribute IDs, and assigning index number BIs. As described above, in order to perform the AND test on all elements, each element of an encoding array has values assigned two vector elements, as indicated in FIG. 20. For example, for the individual ID, the attribute ID is 1 and values are mapped to the first element (BI=1) and the second element (BI=2) of the attribute vector and the predicate vector. For the large classification in the category encoding array, the attribute ID is 13 and values are mapped to the 25th element (BI=25) and the 26th element (BI=26) of the attribute vector and the predicate vector.

If the OR test is performed on each element, it is necessary to map a plurality of elements collectively to the attribute vector and the predicate vector, as indicated in the conversion method of FIG. 21. For example, if the OR test is performed on the position information encoding array, all pieces of position information need to be vectorized collectively. Therefore, as indicated in FIG. 30, one AID is assigned to the position information encoding array, and an index number BI is assigned to each element of the attribute vector and the predicate vector.

S102

The user attribute information managing unit 205 constructs a user attribute information database to store attribute information of users.

The user attribute information database stores information necessary for creating the attribute information encoding array 501. For example, as indicated in FIG. 31, the user attribute information database stores a name, which is an individual ID, belonging information, position information, data categories that can be accessed, confidentiality levels of data that can be accessed, a period in which the user is in the division, section, etc., the position, or the like, and so on. The user attribute information database may store not only the latest status but also all past records.

(S103)

The master key generating unit 202 uses the processing device to generate parameters of predicate encryption for inner products to be used in the system. This parameter generation generates groups, bases, and so on that are used in predicate encryption for inner products supporting revocation described above. Specifically, the master key generating unit 202 first defines group order q, groups G and $G_T$, a generator $g \in G$, and sets a dimension N of a vector space as N=2n+3. The master key generating unit 202 sets the vector space as $V=G\times G\times G$ and defines a canonical basis $A=(a_1, a_2, \ldots, a_N)$. Next, the master key generating unit 202 randomly selects a regular matrix $X=(x_{i,j})$ with N rows and N columns, and calculates a random basis $B=(b_1, b_2, \ldots, b_N)$ and a random basis $B^*=(b^*_1, b^*_2, \ldots, b^*_N)$.

That is, the master key generating unit 202 uses the processing device to execute the Setup algorithm of predicate encryption for inner products supporting revocation so as to calculate the random basis $B=(b_1, b_2, \ldots, b_N)$ and the random basis $B^*=(b^*_1, b^*_2, \ldots, b^*_N)$, and sets $\hat{B}=(b_1, b_2, \ldots, b_n, b_{2n+1}, b_{2n+3})$. Note that predicate encryption for inner products supporting revocation is hierarchical predicate encryption for inner products, and in this embodiment, the number of layers is d=2 and the first layer is used for user attribute information (the individual ID, the belonging information encoding array, the position information encoding array, the category encoding array, the confidentiality level encoding array) and the second layer is used for search information (the search word encoding array). That is, in the Setup algorithm, n=54, d=2, $\mu_1=38$, and $\mu_2=54$ in the above example.

(S104)

The PKG-side data transmitting and receiving unit 209 publishes, as public parameters and via the network, the configuration of the attribute information encoding array 501, the rules for values to be stored, the method for mapping to an attribute vector and a predicate vector that are defined in (S101), and the group order q, the groups G and $G_T$, the group generator $g \in G$, the vector space $V=G\times G\times G$, and the random basis $\hat{B}=(b_1, b_2, \ldots, b_n, b_{2n+1}, b_{2n+3})$ that are created in (S103). It is a matter of course that the public parameters may be published by other methods.

The various keys storage unit 208 stores the public parameters in the storage device.

S105

The various keys storage unit 208 stores the random basis $B^*=(b^*_1, b^*_2, \ldots, b^*_N)$ generated in (S103) in the storage device as a master key.

Note that the contents of the user attribute information database generated in (S102) are updated during system operation every time a user is transferred within the company, joins the company, or leaves the company.

Next, the process of (2) user secret key generation will be described using FIG. 23.

(2) user secret key generation is the process in which the key management server 201 newly generates a user secret key (key vector) and a search auxiliary key corresponding to the user secret key when a user is added or a personnel change occurs, for example.

S201

First, the encoding information generating unit 206 reads the attributes of a user from the user attribute information database according to the attribute information encoding array 501 and so on included in the public parameters, and uses the processing device to generate a user-secret-key attribute information encoding array (encoding information) to be set in a user secret key.

FIG. 32 is a figure illustrating an example of the user-secret-key attribute information encoding array when a user secret key is issued to a person named Tanaka who belongs to the head office/general office division/general office section/welfare unit of Company A. In this case, in the individual ID and the belonging information encoding array, the name and where this person belongs to are set, for example. It is also set that the position is a staff member and the confidentiality levels of data that can be accessed are confidential, confidential-internal-use, and not-applicable.

Next, the vector generating unit 207 uses the processing device to generate a user-secret-key predicate vector v"USER based on the user attribute information database generated by the encoding information generating unit 206. As described above, the first layer of predicate encryption for inner products supporting revocation is used for the user secret key, so that $\vec{v}_{USER}=\vec{v}_1=(v_1, \ldots, v_\mu 1)=(v_1, \ldots, v_{38})$ in the above example. The method for generating a user-secret-key predicate vector based on an encoding array is as described based on FIGS. 20 and 21.

S202

The user secret key generating unit 204 uses the processing device to generate a corresponding user secret key and search auxiliary key, using the user-secret-key predicate vector generated in (S201).

Specifically, the user secret key generating unit 204 uses the processing device to execute the KeyGen algorithm of predicate encryption for inner products supporting revocation so as to generate a user secret key $\vec{k}^*_1$ and a search auxiliary key θ based on the master key. The user secret key generating unit 204 associates the user secret key and the search auxiliary key with the same key ID so that the user secret key and the search auxiliary key can be associated with each other later. Note that the user secret key generating unit 204 manages key IDs by, for example, generating sequential numbers or random numbers so that there are no duplicate key IDs.

S203

The PKG-side data transmitting and receiving unit 209 transmits the public parameters and a set of the user secret key and the key ID to the access terminal by secure means. At this time, the user secret key is transmitted using dedicated hardware such as an integrated circuit (IC) card or a tamper-resistant cryptographic device, or is transmitted using secure means such as a virtual private network (VPN) or an SSL communication protocol.

S204

The terminal-side data transmitting and receiving unit 311 of the access terminal 301 used by the user receives the public parameters and the set of the user secret key and the key ID transmitted in (S203), and the user secret key storage unit 302 stores the received set of the user secret key and the key ID in the storage device.

S205

The PKG-side data transmitting and receiving unit 209 transmits the set of the search auxiliary key and the key ID to the data center 401 by secure means as in (S201).

S206

The center-side data transmitting and receiving unit 402 of the data center 401 receives the set of the search auxiliary key and the key ID transmitted in (S205), and the search auxiliary key managing unit 407 stores the received set of the search auxiliary key and the key ID in the storage device.

Next, using FIG. 24, the process of (3) data encryption will be described.

The process of (3) data encryption is the process in which the access terminal 301 encrypts data for users of an organization registered in the system or for an individual, and registers the encrypted data in the data center 401.

S301

First, the encoding information generating unit 306 of the access terminal 301 determines a user or group that is allowed to retrieve created data. For example, the encoding information generating unit 306 determines the user or group that is allowed retrieval by causing a user who uses the access terminal 301 to input the user or group that is allowed retrieval from the input device.

Then, the encoding information generating unit 306 uses the processing device to generate an encrypted-data attribute information encoding array (encoding information) that can uniquely identify the determined user or group according to the attribute information encoding array 501 and so on included in the public parameters. If the determined user or group cannot be uniquely identified with one encrypted-data attribute information encoding array, a plurality of encrypted-data attribute information encoding arrays may be generated.

FIG. 33 is a figure illustrating an example of the encrypted-data attribute information encoding array.

In the example illustrated in FIG. 33, the data is related to a budget plan for material expenses for year 2009 as indicated in the category encoding array. It is also indicated that the information is confidential for internal use only, as indicated in the confidentiality level encoding array, and the information can be read by a user who belongs to Company A/head office/general office division/general office section, as indicated in the belonging information encoding array. Furthermore, it is set as search words that the data is the 15th piece of data and is information indicating that three PCs were purchased at 100,000 yen on Oct. 5, 2009, as indicated in the search word encoding array.

Next, the vector generating unit 307 uses the processing device to generate an attribute vector $\vec{x}$ corresponding to all the generated encrypted-data attribute information encoding arrays. In the above example, $\vec{x}1=\vec{x}_1, \vec{x}_2)=(x_1, \ldots, x_\mu 2)=(x_1, \ldots, x_{54})$. The method for generating an attribute vector based on an encoding array is as described based on FIGS. 20 and 21.

S302

The tag and encrypted data-encryption key generating unit 308 uses the processing device to generate tags for all the attribute vectors generated in (S301). Specifically, the Enc algorithm of predicate encryption for inner products supporting revocation is executed by the processing device with a plaintext m as a constant 1 or a random number, so as to generate a ciphertext $(c_1, c_2)$, and this is used as a tag.

The tag and encrypted data-encryption key generating unit 308 also generates a data-encryption key K (common key), and sets the data-encryption key K that is encrypted using an existing encryption method as an encrypted data-encryption key.

S303

The data encrypting unit 309 uses the processing device to encrypt a data body with the data-encryption key K (common key) using common key encryption such as AES or Camellia (registered trademark) so as to generate an encrypted data body. Then, the data encrypting unit 309 uses the processing device to generate encrypted data including the generated encrypted data body, tags, and encrypted data-encryption key. That is, the configuration of the encrypted data is the encrypted data A indicated in FIG. 5.

S304

The terminal-side data transmitting and receiving unit 311 transmits the created encrypted data to the data center 401 and requests storage of the encrypted data.

S305

The center-side data transmitting and receiving unit 402 of the data center 401 receives the encrypted data of which storage is requested. Then, the data managing unit 403 stores the received data in the storage device.

Next, the process of (4) keyword search will be described using FIG. 25.

The process of (4) keyword search is the process in which the access terminal 301 searches for encrypted data stored in the data center 401 by specifying a search keyword.

S401

First, the encoding information generating unit 306 of the access terminal 301 receives a search keyword input by the user, and uses the processing device to generate a search word encoding array (encoding information).

FIG. 34 is a figure illustrating an example of the search word encoding array.

The example illustrated in FIG. 34 is an example where the user has specified "year 2009" and "purchase" as search keywords. Therefore, values are set in corresponding column 2 and column 8 in the search word encoding array.

Next, the vector generating unit 307 uses the processing device to generate a search predicate vector $\vec{v}_{SEARCH}$ corresponding to the generated search word encoding array. As described above, the second layer of predicate encryption for inner products supporting revocation is used for searches, so that $\vec{v}_{SEARCH}=\vec{v}_2=(v_{\mu 1+1}, \ldots, v_{\mu 2})=(v_{39}, \ldots, v_{54})$ in the above example. The method for generating a search predicate vector based on an encoding array is as described based on FIGS. 20 and 21.

S402

The trapdoor generating unit 303 uses the processing device to generate a trapdoor, using the search predicate vector generated in (S401). Specifically, the trapdoor generating unit 303 uses the processing device to execute the Delegate algorithm (1=1) of predicate encryption for inner products supporting revocation so as to generate a secret key $\vec{k}^*_2$ of a lower layer based on a user secret key $\vec{k}^*_1$ and the search predicate vector $\vec{v}_2$. The trapdoor generating unit 303 sets an element $k^*_{2,dec}$, which is an element for decryption, of the secret key $\vec{k}^*_2$ of the lower layer as a trapdoor.

S403

The terminal-side data transmitting and receiving unit 311 transmits the trapdoor generated in (S402) and the key ID corresponding to the user secret key used to generate the trapdoor to the data center 401, and requests a search of encrypted data. The search request receiving unit 404 of the data center 401 receives a set of the trapdoor and the key ID and accepts the search of encrypted data.

S404

The search executing unit 405 of the data center 401 uses the processing device to compare each of the tags attached to all pieces of encrypted data stored in the data managing unit 403 with the trapdoor received in (S403). At this time, the search auxiliary key managing unit 407 extracts the search auxiliary key corresponding to the key ID received in (S403), and the search executing unit 405 also uses the extracted search auxiliary key for comparison. If the search auxiliary key corresponding to the key ID cannot be found, it is determined that the search privilege has been revoked and comparison between each of the tags and the trapdoor is not performed (it is determined that the number of hits is zero). By this, the search executing unit 405 determines whether there is encrypted data that contains the search keyword as a search word among the stored encrypted data. If a plurality of tags are added to the encrypted data, the search executing unit 405 compares each of the tags with the received trapdoor.

The search executing unit 405 regards encrypted data in which any one of tags of the encrypted data is determined to contain the keyword, as a hit found in the search.

Note that one tag is compared with the trapdoor by executing the Dec algorithm of predicate encryption for inner products supporting revocation, using as input a tag $(c_1, c_2)$, a trapdoor $k^*_{2dec}$, and a search auxiliary key $\theta$ corresponding to the key ID, so as to decrypt the tag $(c_1,c_2)$. If the calculated result is the constant 1 (or the random number used in the Enc algorithm), the tag contains an attribute corresponding to the attribute set in the user secret key and the tag contains the search keyword as a search word. Otherwise, at least the tag does not contain an attribute corresponding to the attribute set in the user secret key or the tag does not contain the search keyword as a search word. That the tag contains an attribute corresponding to the attribute set in the user secret key means that the user secret key can search for the tag (has a search privilege). That the tag does not contain an attribute corresponding to the attribute set in the user secret key means that the user secret key cannot search for the tag (does not have a search privilege).

S405

The search result transmitting unit 406 extracts every piece of encrypted data determined as a hit in the search in (S404), and transmits it to the access terminal 301 from which the trapdoor has been transmitted. Then, the terminal-side data transmitting and receiving unit 311 of the access terminal 301 receives the encrypted data. If there is no encrypted data to be returned as a search result, the search result transmitting unit 406 transmits information indicating this to the access terminal 301.

S406

The data-encryption key decrypting unit 305 decrypts the encrypted data-encryption key of the received encrypted data using an existing encryption method so as to obtain the data-encryption key K.

S407

The data decrypting unit 310 decrypts the encrypted data body included in the encrypted data with the data-encryption key K obtained in (S406), using AES or Camellia (registered trademark). Note that the algorithm used for decryption needs to be the same as the algorithm used for encryption. Therefore, it is necessary to specify the algorithm to be used in the system in advance, or to make it possible to identify the algorithm by including, in encrypted data, information that indicates what is used for encryption, for example.

Next, using FIG. 26, the process of (5) search privilege revocation will be described.

The process of (5) search privilege revocation is the process in which in order to disable a search using a user secret key to be revoked, the data center 401 deletes the search auxiliary key corresponding to this user secret key. Since the user secret key and the search auxiliary key are associated with each other by the key ID, the key ID is used for the deletion process.

S501

The search auxiliary key managing unit 407 of the data center 401 identifies the key ID corresponding to the user secret key to be revoked. This can be realized by, for example, accepting a request for search privilege revocation from the key management server 201 or the access terminal 301.

S502

The search auxiliary key managing unit 407 of the data center 401 deletes the search auxiliary key corresponding to the key ID identified in (S501) from the storage device. As a result, even if a search using the corresponding user secret key is performed after this point, the search auxiliary key that is required cannot be extracted in (S404), so that the search can be disabled.

Effects of Embodiment 1

As described above, the searchable encryption system 100 generates encoding information by determining and implementing, as described above, the structure, comparison method, and value assignment method of the attribute information encoding array 501 composed of information, such as an individual ID to identify an individual such a name or an employee number, organizational information of a company, an employee position, a category of a document, and a confidentiality level, and keywords contained in the data. Then, an attribute vector or a predicate vector is generated by mapping the generated encoding information to the attribute vector or the predicate vector, as described above. As a result, the searchable encryption system 100 can determine whether an access to the data is allowed by simply calculating an inner product of the attribute vector representing a user who is allowed an access and the predicate vector indicating attributes of a user.

The searchable encryption system 100 uses predicate encryption for inner products so as to use an attribute vector to create encrypted data and use a predicate vector to generate a user secret key. As a result, in the searchable encryption system 100, only a user who is allowed an access can retrieve the encrypted data.

For example, by specifying a division or section in the attribute vector, the searchable encryption system 100 can create encrypted data so that only a user belonging to the division or section is allowed to retrieve the encrypted data.

The searchable encryption system 100 sets a keyword contained in data in an attribute information encoding array that is created when performing encryption, and generates a trapdoor based on a user secret key by additionally adding a search keyword. As a result, in the searchable encryption system 100, only a user who is allowed an access can retrieve data without revealing the search keyword to the data center 401.

In particular, by simply transmitting one trapdoor to the data center 401, it is possible to determine a match or non-match for all pieces of searchable data.

For example, by setting a division or section in the attribute vector, the searchable encryption system 100 can create encrypted data so that only a user who belongs to the division or section can retrieve the data.

The searchable encryption system 100 uses not only a tag and a trapdoor but also a search auxiliary key to perform the comparison process when performing a search. As a result, a search privilege can be revoked simply by deleting a search auxiliary key, so that efficient revocation management can be performed.

The searchable encryption system 100 is realized by adding constituent elements and processes that are necessary for revocation management to the searchable encryption system described in Patent Literature 4. More specifically, in Patent Literature 4, the key management server generates a user secret key, but it is arranged in Embodiment 1 that the key management server 201 generates a user secret key and a search auxiliary key, and both the user secret key and the search auxiliary key are required in a search. It is then arranged that a search privilege can be revoked simply by deleting the search auxiliary key, enabling efficient revocation management.

When the AND test or the OR test is performed on an encoding array, the searchable encryption system 100 maps the encoding array to an attribute vector or a predicate vector by the method described above. As a result, in both cases where the data body has structured data such as in a slip or a database and where the data body is not structured such as in a general word processor document, the searchable encryption system 100 can perform a search while the data remains encrypted.

In the belonging information encoding array illustrated in FIG. 10, when a user secret key is generated, for example, for a user who belongs to Section D but does not belong to any unit. "*" is specified as a unit ID as in the belonging information encoding array 2. In this case, by using this user secret key, all documents for Section D can be read. If it is desired to arrange that only documents for Section D can be read and documents for a unit in Section D cannot be read, a random number R may be set as a unit ID, instead of "*"

This can also be realized with other encoding arrays, such as the position information encoding array. That is, a section manager generally does not belong to any unit. In contrast, a staff member generally belongs to a unit. Thus, by utilizing this characteristic, the position information encoding array may be used to perform control that only a user who belongs to a unit can read a document, or only a user who does not belong to any unit can read a document.

In the above description, examples mainly for in-company systems have been presented, but how an organizational structure or a positional structure is classified is just an example. For example, a country ID may be provided before an office ID, or a project ID may be used in place of a unit ID. A deputy director class flag may be set between a director class flag and a division manager class flag. These encoding arrays are just examples, so that various elements may be added or deleted depending on the situation of the organization.

In the above description, data managed by employees in the in-company system is targeted an example, but it is not necessary to limit the application to in-company systems. For example, it can also be used to manage electronic health records or health insurance claims of patients in a medical information system. In this case, organizational hierarchy or positional information created to suit the in-company system is created to suit the medical information system. For example, instead of organizational hierarchy information, medical institution hierarchy information that can identify a hospital or doctor may be assigned, and instead of position information, roles such as a doctor, a nurse, and a pharmacist may be assigned.

In the above description, it is assumed that the administrator of the system is a company and the access terminals are used by users, but this can be changed flexibly depending on the system to be used. For example, if a system is configured so that a user acts as a key management server and issues user secret keys to other users, the system that enables more flexible access privilege settings than those of this system can be constructed.

In the above description, the access terminal 301 is configured to store user secret keys, and also generate trapdoors and decrypt encrypted data-encryption keys. However, in order to further enhance security, user secret keys may be managed using a device such as an IC card instead of the access terminal 301. In this case, security can be enhanced by performing authentication using a password in order to use the IC card. If user secret keys are distributed from the key management server 201 to the access terminal 301, the user secret keys may be stored in IC cards and the IC cards may be securely distributed to users.

In the above description, the cases where the attribute information encoding array 501 is compared using the AND test are mainly presented, but a comparison can also be performed using the OR test or a comparison may be performed using an inclusion relationship test.

In the above description, the structure of the attribute information encoding array 501 is determined at a system setup, including the search word encoding array to store search keywords. This is because priority is given to ease of description. However, in environments where structured data such as slips and unstructured data such as word processor documents are mixed, it is often difficult to determine the structure of the search word encoding array in advance. Therefore, it may be arranged that instead of determining the structure of the search word encoding array at a system setup, attributes that can be freely used are provided to define the structure of the search word encoding array for each document type or for each content item.

In the above description, the structure of the attribute information encoding array 501 is determined in advance. However, if a company has a wide variety of job types, it may be difficult to determine everything in advance. In such a case, attributes that can be freely used for each office or each job type may be provided for some encoding arrays so as to be freely used by users at the time of use.

In the above description, when an individual ID or a company ID is indicated, a character string such as "Tanaka" or "Company A" is used to represent it. This is because priority is given to ease of description, and in actuality, not only character strings but also numbers may be used as IDs. Similarly, the value to be set in each of various flags is specified as a value "1", but it does not have to be a value "1" and the value may be freely determined.

In the above description, an example using symmetrical pairings is presented, but it can also be implemented based on asymmetrical pairings. In this case. parameters can be set more flexibly, and speed can also be optimized.

In the above description, user secret keys can be stored in the various key storage unit of the key management server. However, since keys can be re-issued, there is no need to store them if not necessary.

In the above description, the number of layers of predicate encryption for inner products supporting revocation is described as d=2, but it may be set as d≥3, and the first to (d−1)-th layers may be used for user attribute information and the d-th layer may be used for search information. However, it should be noted that the Delegate algorithm is used only for generating trapdoors (not used for key delegation as in general hierarchical predicate encryption for inner products).

In the above description, predicate encryption for inner products supporting revocation based on predicate encryption for inner products of Non-Patent Literature 7 is used, but revocation support may be realized based on other types of predicate encryption for inner products, provided that an auxiliary key can be introduced to the KeyGen algorithm and the Dec algorithm.

In the above description, the key management server 201 manages user attribute information, but attribute information may be managed by a different server. For example, if there is already a Lightweight Directory Access Protocol (LDAP) server that manages employee personnel information, the key management server may use the LDAP server instead of managing employee attribute information by itself.

A hardware configuration of the searchable encryption system 100 (the key management server 201, the access terminal 301, the data center 401) in this embodiment will now be described.

Figure 35:
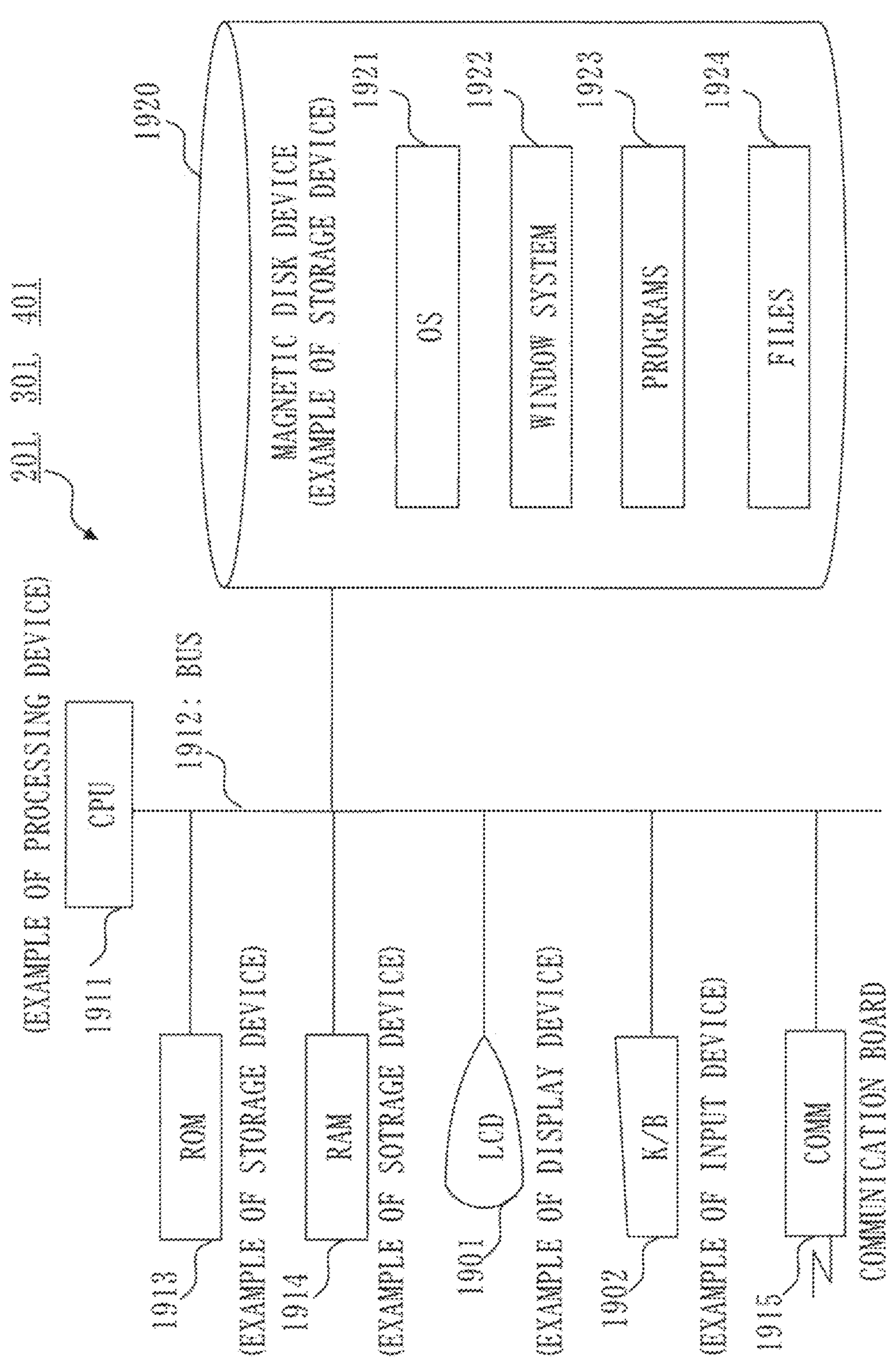
FIG. 35 is a figure illustrating an example of a hardware configuration of each of the key management server 201, the access terminal 301, and the data center 401.

FIG. 35 is a figure illustrating an example of the hardware configuration of each of the key management server 201, the access terminal 301, and the data center 401.

As illustrated in FIG. 35, each of the key management server 201, the access terminal 301, and the data center 401 includes the central processing unit (CPU) 1911 (also called a central processing device, a processing device, an operation device, a microprocessor, a microcomputer, and a processor) that executes programs. The CPU 1911 is connected with the ROM 1913, the RAM 1914, a liquid crystal display (LCD) 1901, the keyboard (K/B) 1902, the communication board 1915, and a magnetic disk device 1920 through a bus 1912, and controls these hardware devices. In place of the magnetic disk device 1920 (fixed disk device), a storage device such as an optical disc device or a memory card read/write device may be used. The magnetic disk device 1920 is connected via a predetermined fixed disk interface.

Each of the ROM 1913 and the magnetic disk device 1920 is an example of a non-volatile memory. The RAM 1914 is an example of a volatile memory. Each of the ROM 1913, the RAM 1914, and the magnetic disk device 1920 is an example of a storage device (memory). Each of the keyboard 1902 and the communication board 1915 is an example of an input device. The communication board 1915 is an example of a communication device (network interface). Furthermore, the LCD 1901 is an example of a display device.

In the magnetic disk device 1920, the ROM 1913, or the like, an operating system (OS) 1921, a window system 1922, programs 1923, and files 1924 are stored.

Each program of the programs 1923 is executed by the CPU 1911, the operating system 1921, or the window system 1922.

The programs 1923 store software and programs that execute the functions described as "the master key generating unit 202", "the user secret key generating unit 204", "the user attribute information managing unit 205", "the encoding information generating unit 206", "the vector generating unit 207", "the various keys storage unit 208", "the PKG-side data transmitting and receiving unit 209", "the user secret key storage unit 302", "the trapdoor generating unit 303", "the data-encryption key decrypting unit 305", "the encoding information generating unit 306", "the vector generating unit 307", "the tag and encrypted data-encryption key generating unit 308", "the data encrypting unit 309", "the data decrypting unit 310", "the terminal-side data transmitting and receiving unit 311", "the center-side data transmitting and receiving unit 402", "the data managing unit 403", "the search request receiving unit 404", "the search executing unit 405", "the search result transmitting unit 406", "the search auxiliary key managing unit 407", and so on in the above description, or other programs. The programs are read and executed the CPU 1911.

The files 1924 stores, as items of "files" or "databases", information such as the "master key", "public parameters", "encrypted data", "user secret keys", "search auxiliary keys", "key IDs" in the above description, data, signal values, variable values, or parameters. The "files" and "databases" are stored in a storage medium such as a disc or a memory. The information, data, signal values, variable values, or parameters stored in the storage medium such as a disc or a memory are read out by the CPU 1911 to a main memory or a cache memory via a read/write circuit, and are used for operation of the CPU 1911 such as extraction, searching, reference, comparison, calculation, computation, processing, output, printing, and display. During operation of the CPU 1911 that is extraction, searching, reference, comparison, calculation, computation. processing, output, printing, and display, information, data, signal values, variable values, or parameters are temporarily stored in the main memory, the cache memory, or a buffer memory.

The arrow parts in the flowcharts in the above description mainly indicate input/output of data or signals, and data or signal values are recorded in the memory of the RAM 1914, other recording media such as an optical disc, or an IC chip. Data or signals are transmitted online by the bus 1912, signal lines, cables, other transmission media, or radio waves.

What is described as "unit" in the above description may be "circuit", "device". "equipment", "means, or "function", and may also be "step". "procedure", or "process". What is described as "device" may be "circuit", "equipment", "means", or function", or may be "step", "procedure", or "process". Furthermore, what is described as "process" may be "step". That is, what is described as "unit" may be realized by firmware stored in the ROM 1913. Alternatively, it may be realized solely by software, solely by hardware such as an element, a device, a substrate, or wiring, by a combination of software and hardware, or a combination further including firmware. Firmware and software are stored as programs in a recording medium such as the ROM 1913. The programs are read by the CPU 1911 and executed by the CPU 1911. That is, the programs cause a computer or the like to function as the "units" described above. Alternatively, the programs cause a computer or the like to execute procedures or methods of the "units" described above.

In the above description, the functional constituent elements are realized by software. However, as a variation, the functional constituent elements may be realized by hardware.

When the functional constituent elements are realized by hardware, the searchable encryption system 100 (the key management server 201, the access terminal 301, the data center 401) includes an electronic circuit in place of the CPU 1911 and the RAM 1914. The electronic circuit is a dedicated circuit that realizes the functions of the functional constituent elements and the RAM 1914.

The electronic circuit is assumed to be a single circuit, a composite circuit, a programmed processor, a parallel-programmed processor, a logic IC, a gate array (GA), an application-specific integrated circuit (ASIC), or a field-programmable gate array (FPGA).

The functional constituent elements may be realized by one electronic circuit. or the functional constituent elements may be distributed among and realized by a plurality of electronic circuits.

Some of the functional constituent elements may be realized by hardware, and the rest of the functional constituent elements may be realized by software.

The CPU 1911, the RAM 1914, and the electronic circuit are referred to as processing circuitry. That is, the functions of the functional constituent elements are realized by the processing circuitry.

REFERENCE SIGNS LIST

100: searchable encryption system, 101: network, 102: company LAN, 201: key management server, 202: master key generating unit, 204: user secret key generating unit, 205: user attribute information managing unit, 206: encoding information generating unit, 207: vector generating unit, 208: various keys storage unit, 209: PKG-side data transmitting and receiving unit, 301: access terminal, 302: user secret key storage unit, 303: trapdoor generating unit, 305: data-encryption key decrypting unit, 306: encoding information generating unit, 307: vector generating unit, 308: tag and encrypted data-encryption key generating unit, 309: data encrypting unit, 310: data decrypting unit, 311: terminal-side data transmitting and receiving unit, 401: data center, 402: center-side data transmitting and receiving unit, 403: data managing unit, 404: search request receiving unit, 405: search executing unit, 406: search result transmitting unit, 407: search auxiliary key managing unit, 501: attribute information encoding array, 502: individual ID, 503: belonging information encoding array, 504: position information encoding array, 505: category encoding array, 506: confidentiality level encoding array, 511: search word encoding array, 601: company ID, 602: office ID, 603: division ID, 604: section ID, 605: unit ID, 701: executive class flag, 702: office manager class flag, 703: division manager class flag, 704: section manager class flag, 705: unit manager class flag, 706: staff member class flag, 801: large classification ID, 802: middle classification ID, 803: small classification ID, 901: strictly-confidential flag, 902: confidential flag, 903: confidential-internal-only flag, 904: not-applicable flag.

The invention claimed is:

1. A search execution device comprising processing circuitry to:

receive a trapdoor generated based on a user secret key in which a search auxiliary key and an attribute of a user are set and a search keyword, together with a key identifier (ID) that identifies the search auxiliary key;

decrypt an encrypted tag in which an attribute of a user who is allowed retrieval and a search word are set, using the received trapdoor and the search auxiliary key indicated by the received key ID, so as to identify a tag that is retrievable for the attribute set in the user secret key and contains a search word corresponding to the search keyword;

delete the search auxiliary key indicated by the key identifier (ID) when the user secret key is revoked; and disable identification of the tag using the user secret key without re-encrypting the encrypted tag, based on the deletion of the search auxiliary key and an association of the search auxiliary key with the user secret key by the key identifier (ID).

2. The search execution device according to claim 1, wherein the trapdoor is an element of a secret key of a lower layer of the user secret key, the secret key of the lower layer being able to decrypt only a tag in which a search word corresponding to the search keyword is set among tags that can be decrypted with the user secret key.

3. The search execution device according to claim 1, wherein the trapdoor is an element of a secret key of a lower layer of the user secret key, the secret key of the lower layer being able to decrypt only a tag in which a search word corresponding to the search keyword is set among tags that can be decrypted with the user secret key.

4. The search execution device according to claim 1, wherein the processing circuitry receives the trapdoor $k^*_{2,dec}$ indicated in Formula 1, and wherein the processing circuitry decrypts a tag $(c_1, c_2)$, as indicated in Formula 2, $$k^*_{i+1,dec} := k^*_{i,dec} + \sum_{t=1}^{i+1} \alpha_{dec,t} k^*_{i,ran,t} + \sigma_{dec}\left(\sum_{i=\mu_i+1}^{\mu_{l+1}} v_i k^*_{l,del,i}\right) \quad \text{[Formula 1]}$$

$$\text{where } k^*_{l,dec} := \sum_{t=1}^{l} \sigma_{dec,t}\left(\sum_{i=\mu_{t-1}+1}^{\mu_t} v_i b^*_i\right) + \theta^{-1} b^*_{2n+1} + \eta_{dec} b^*_{2n+2},$$

$$k^*_{l,ran,j} := \sum_{t=1}^{l} \sigma_{ran,j,t}\left(\sum_{i=\mu_{t-1}+1}^{\mu_t} v_i b^*_i\right) + \eta_{ran,j} b^*_{2n+2} \text{ for } j = 1, \ldots, l+1,$$

$$k^*_{l,del,j} := \sum_{t=1}^{l} \sigma_{del,j,t}\left(\sum_{i=\mu_{t-1}+1}^{\mu_t} v_i b^*_i\right) + \psi b^*_j + \eta_{del,j} b^*_{2n+2}$$

$$\text{for } j = \mu_l + 1, \ldots, n,$$

$$\sigma_{dec}, \sigma_{dec,t}, \eta_{dec}, \sigma_{ran,j,t}, \eta_{ran,j} (j = 1, \ldots, l+1), \sigma_{del,j,t},$$

$$\eta_{del,j} (j = 1, \ldots, n), \psi, \theta \xleftarrow{U} \mathbb{F}_q \text{ for } t = 1, \ldots, l,$$

$((v_1, \ldots, v_{\mu_1}), \ldots, (v_{\mu_{l-1}+1}, \ldots, v_{\mu_l}))$ is an attribute, $\theta$ is a search auxiliary key, and $b^*_1, \ldots, b^*_n, b^*_{2n+1}, b^*_{2n+2}$ are basis vectors $$m' := c_2 / e(c_1, k^*_{l,dec})^{\theta} \quad \text{[Formula 2]}$$

$$\text{where } (\vec{x}_{l+1}, \ldots, \vec{x}_d) \xleftarrow{U} \mathbb{F}_q^{\mu_{l+1}-\mu_l} \times \ldots \times \mathbb{F}_q^{n-\mu_{d-1}}, \delta_1, \ldots, \delta_i, \delta_{2n+3}, \zeta \xleftarrow{U} \mathbb{F}_q,$$

$$c_1 := \sum_{t=1}^{i} \delta_t \left(\sum_{i=\mu_{t-1}+1}^{\mu_t} x_i b_i\right) + \zeta b_{2n+1} + \delta_{2n+3} b_{2n+3},\ c_2 := g_T^{\zeta} m,$$

$b_1, \ldots, b_n, b_{2n+1}, b_{2n+2}$ are basis vectors.

5. The search execution device according to claim 1, wherein the processing circuitry receives the trapdoor $k^*_{2,dec}$ indicated in Formula 3, and wherein the processing circuitry decrypts a tag $(c_1, c_2)$, as indicated in Formula 4, $$k^*_{i+1,dec} := k^*_{i,dec} + \sum_{t=1}^{i+1} \alpha_{dec,t} k^*_{i,ran,t} + \sigma_{dec}\left(\sum_{i=\mu_i+1}^{\mu_{l+1}} v_i k^*_{l,del,i}\right) \quad \text{[Formula 3]}$$

$$\text{where } k^*_{l,dec} := \sum_{t=1}^{l} \sigma_{dec,t}\left(\sum_{i=\mu_{t-1}+1}^{\mu_t} v_i b^*_i\right) + \theta^{-1} b^*_{2n+1} + \eta_{dec} b^*_{2n+2},$$

$$k^*_{l,ran,j} := \sum_{t=1}^{l} \sigma_{ran,j,t}\left(\sum_{i=\mu_{t-1}+1}^{\mu_t} v_i b^*_i\right) + \eta_{ran,j} b^*_{2n+2} \text{ for } j = 1, \ldots, l+1,$$

$$k^*_{l,del,j} := \sum_{t=1}^{l} \sigma_{del,j,t}\left(\sum_{i=\mu_{t-1}+1}^{\mu_t} v_i b^*_i\right) + \psi b^*_j + \eta_{del,j} b^*_{2n+2}$$

$$\text{for } j = \mu_l + 1, \ldots, n,$$

$$\sigma_{dec}, \sigma_{dec,t}, \eta_{dec}, \sigma_{ran,j,t}, \eta_{ran,j} (j = 1, \ldots, l+1), \sigma_{del,j,t},$$

-continued $$\eta_{del,j} (j = 1, \ldots, n), \psi, \theta \xleftarrow{U} \mathbb{F}_q \text{ for } t = 1, \ldots, l,$$

$((v_1, \ldots, v_{\mu_1}), \ldots, (v_{\mu_{l-1}+1}, \ldots, v_{\mu_l}))$ is an attribute, $\theta$ is a search auxiliary key, and $b^*_1, \ldots, b^*_n, b^*_{2n+1}, b^*_{2n+2}$ are basis vectors $$m' := c_2 / e(c_1, k^*_{l,dec})^{\theta} \quad \text{[Formula 4]}$$

$$\text{where } (\vec{x}_{l+1}, \ldots, \vec{x}_d) \xleftarrow{U} \mathbb{F}_q^{\mu_{l+1}-\mu_l} \times \ldots \times \mathbb{F}_q^{n-\mu_{d-1}}, \delta_1, \ldots, \delta_i, \delta_{2n+3}, \zeta \xleftarrow{U} \mathbb{F}_q,$$

$$c_1 := \sum_{t=1}^{i} \delta_t \left(\sum_{i=\mu_{t-1}+1}^{\mu_t} x_i b_i\right) + \zeta b_{2n+1} + \delta_{2n+3} b_{2n+3},\ c_2 := g_T^{\zeta} m,$$

$b_1, \ldots, b_n, b_{2n+1}, b_{2n+2}$ are basis vectors.

6. The search execution device according to claim 2, wherein the processing circuitry receives the trapdoor $k^*_{2,dec}$ indicated in Formula 5, and wherein the processing circuitry decrypts a tag $(c_1, c_2)$, as indicated in Formula 6, $$k^*_{i+1,dec} := k^*_{i,dec} + \sum_{t=1}^{i+1} \alpha_{dec,t} k^*_{i,ran,t} + \sigma_{dec}\left(\sum_{i=\mu_i+1}^{\mu_{l+1}} v_i k^*_{l,del,i}\right) \quad \text{[Formula 5]}$$

$$\text{where } k^*_{l,dec} := \sum_{t=1}^{l} \sigma_{dec,t}\left(\sum_{i=\mu_{t-1}+1}^{\mu_t} v_i b^*_i\right) + \theta^{-1} b^*_{2n+1} + \eta_{dec} b^*_{2n+2},$$

$$k^*_{l,ran,j} := \sum_{t=1}^{l} \sigma_{ran,j,t}\left(\sum_{i=\mu_{t-1}+1}^{\mu_t} v_i b^*_i\right) + \eta_{ran,j} b^*_{2n+2} \text{ for } j = 1, \ldots, l+1,$$

$$k^*_{l,del,j} := \sum_{t=1}^{l} \sigma_{del,j,t}\left(\sum_{i=\mu_{t-1}+1}^{\mu_t} v_i b^*_i\right) + \psi b^*_j + \eta_{del,j} b^*_{2n+2}$$

$$\text{for } j = \mu_l + 1, \ldots, n,$$

$$\sigma_{dec}, \sigma_{dec,t}, \eta_{dec}, \sigma_{ran,j,t}, \eta_{ran,j} (j = 1, \ldots, l+1), \sigma_{del,j,t},$$

$$\eta_{del,j} (j = 1, \ldots, n), \psi, \theta \xleftarrow{U} \mathbb{F}_q \text{ for } t = 1, \ldots, l,$$

$((v_1, \ldots, v_{\mu_1}), \ldots, (v_{\mu_{l-1}+1}, \ldots, v_{\mu_l}))$ is an attribute, $\theta$ is a search auxiliary key, and $b^*_1, \ldots, b^*_n, b^*_{2n+1}, b^*_{2n+2}$ are basis vectors $$m' := c_2 / e(c_1, k^*_{l,dec})^{\theta} \quad \text{[Formula 6]}$$

$$\text{where } (\vec{x}_{l+1}, \ldots, \vec{x}_d) \xleftarrow{U} \mathbb{F}_q^{\mu_{l+1}-\mu_l} \times \ldots \times \mathbb{F}_q^{n-\mu_{d-1}}, \delta_1, \ldots, \delta_i, \delta_{2n+3}, \zeta \xleftarrow{U} \mathbb{F}_q,$$

$$c_1 := \sum_{t=1}^{i} \delta_t \left(\sum_{i=\mu_{t-1}+1}^{\mu_t} x_i b_i\right) + \zeta b_{2n+1} + \delta_{2n+3} b_{2n+3},\ c_2 := g_T^{\zeta} m,$$

$b_1, \ldots, b_n, b_{2n+1}, b_{2n+2}$ are basis vectors.

7. The search execution device according to claim 3, wherein the processing circuitry receives the trapdoor $k^*_{2,dec}$ indicated in Formula 7, and wherein the processing circuitry decrypts a tag $(c_1, C_2)$, as indicated in Formula 8, $$k^*_{i+1,dec} := k^*_{i,dec} + \sum_{t=1}^{i+1} \alpha_{dec,t} k^*_{i,ran,t} + \sigma_{dec}\left(\sum_{i=\mu_i+1}^{\mu_{l+1}} v_i k^*_{l,del,i}\right) \quad \text{[Formula 7]}$$

$$\text{where } k^*_{l,dec} := \sum_{t=1}^{l} \sigma_{dec,t}\left(\sum_{i=\mu_{t-1}+1}^{\mu_t} v_i b^*_i\right) + \theta^{-1} b^*_{2n+1} + \eta_{dec} b^*_{2n+2},$$

$$k^*_{l,ran,j} := \sum_{t=1}^{l} \sigma_{ran,j,t}\left(\sum_{i=\mu_{t-1}+1}^{\mu_t} v_i b^*_i\right) + \eta_{ran,j} b^*_{2n+2} \text{ for } j = 1, \ldots, l+1,$$

$$k^*_{l,del,j} := \sum_{t=1}^{l} \sigma_{del,j,t}\left(\sum_{i=\mu_{t-1}+1}^{\mu_t} v_i b^*_i\right) + \psi b^*_j + \eta_{del,j} b^*_{2n+2}$$

$$\text{for } j = \mu_l + 1, \ldots, n,$$

-continued $$\sigma_{dec}, \sigma_{dec,t}, \eta_{dec}, \sigma_{ran,j,t}, \eta_{ran,j}(j=1, \ldots, l+1), \sigma_{del,j,t},$$

$$\eta_{del,j}(j=1, \ldots, n), \psi, \theta \xleftarrow{U} \mathbb{F}_q \text{ for } t=1, \ldots, l,$$

$$((v_1, \ldots, v_{\mu_1}), \ldots, (v_{\mu_{l-1}+1}, \ldots, v_{\mu_l})) \text{ is an attribute,}$$

$\theta$ is a search auxiliary key, and $b_1^*, \ldots, b_n^*, b_{2n+1}^*, b_{2n+2}^*$ are basis vectors $$m' := c_2/e(c_1, k_{l,dec}^*)^\theta \quad \text{[Formula 8]}$$

where $(\vec{x}_{l+1}, \ldots, \vec{x}_d) \xleftarrow{U} \mathbb{F}_q^{\mu_{l+1}-\mu_l} \times \ldots \times \mathbb{F}_q^{n-\mu_{d-1}}, \delta_1, \ldots, \delta_i, \delta_{2n+3}, \zeta \xleftarrow{U} \mathbb{F}_q,$ $$c_1 := \sum_{t=1}^{i} \delta_t \left( \sum_{i=\mu_{t-1}+1}^{\mu_t} x_i b_i \right) + \zeta b_{2n+1} + \delta_{2n+3} b_{2n+3},\ c_2 := g_T^\zeta m,$$

$b_1, \ldots, b_n, b_{2n+1}, b_{2n+2}$ are basis vectors.

8. A search execution method comprising:

receiving a trapdoor generated based on a user secret key in which a search auxiliary key and an attribute of a user are set and a search keyword, together with a key identifier (ID) that identifies the search auxiliary key;

decrypting an encrypted tag in which an attribute of a user who is allowed retrieval and a search word are set, using the trapdoor and the search auxiliary key indicated by the key ID, so as to identify a tag that is retrievable for the attribute set in the user secret key and contains a search word corresponding to the search keyword;

deleting the search auxiliary key indicated by the key identifier (ID) when the user secret key is revoked; and disabling identification of the tag using the user secret key without re-encrypting the encrypted tag, based on the deletion of the search auxiliary key and an association of the search auxiliary key with the user secret key by the key identifier (ID).

9. A non-transitory computer readable medium storing a search execution program that causes a computer to function as a search execution device to perform:

a search request receiving process of receiving a trapdoor generated based on a user secret key in which a search auxiliary key and an attribute of a user are set and a search keyword, together with a key identifier (ID) that identifies the search auxiliary key;

a search executing process of decrypting an encrypted tag in which an attribute of a user who is allowed retrieval and a search word are set, using the trapdoor received by the search request receiving process and the search auxiliary key indicated by the key ID received by the search request receiving process, so as to identify a tag that is retrievable for the attribute set in the user secret key and contains a search word corresponding to the search keyword; and a search privilege revocation process of:

deleting the search auxiliary key indicated by the key identifier (ID) when the user secret key is revoked, and disabling identification of the tag using the user secret key without re-encrypting the encrypted tag, based on the deletion of the search auxiliary key and an association of the search auxiliary key with the user secret key by the key identifier (ID).

10. A searchable encryption system comprising:

a key generation device comprising processing circuitry to generate a search auxiliary key and a user secret key in which the search auxiliary key and an attribute of a user are set;

an access terminal to generate a trapdoor based on the user secret key generated by the key generation device and a search keyword;

a search execution device comprising processing circuitry to decrypt an encrypted tag in which an attribute of a user who is allowed retrieval and a search word are set, using the trapdoor generated by the access terminal and the search auxiliary key, so as to identify a tag that is retrievable for the attribute set in the user secret key and contains a search word corresponding to the search keyword, wherein the processing circuitry of the search execution device:

deletes the search auxiliary key indicated by a key identifier (ID) when the user secret key is revoked, and disables identification of the tag using the user secret key without re-encrypting the encrypted tag, based on the deletion of the search auxiliary key and an association of the search auxiliary key with the user secret key by the key identifier (ID).

* * * * *